US012693762B2

(12) United States Patent
Luo

(10) Patent No.: US 12,693,762 B2
(45) Date of Patent: Jul. 28, 2026

(54) TOUCH DRIVING CIRCUIT AND DRIVING METHOD THEREFOR, AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventor: Hongqiang Luo, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/859,793

(22) PCT Filed: Jan. 25, 2024

(86) PCT No.: PCT/CN2024/074100
§ 371 (c)(1),
(2) Date: Oct. 24, 2024

(87) PCT Pub. No.: WO2025/156216
PCT Pub. Date: Jul. 31, 2025

(65) Prior Publication Data
US 2026/0029873 A1 Jan. 29, 2026

(51) Int. Cl.
*G06F 3/041* (2006.01)
*G06F 3/044* (2006.01)
(52) U.S. Cl.
CPC ...... *G06F 3/041662* (2019.05); *G06F 3/0412* (2013.01); *G06F 3/04182* (2019.05); *G06F 3/0446* (2019.05)

(58) Field of Classification Search
CPC .......... G06F 3/041662; G06F 3/04182; G06F 3/0446; G06F 3/0412
See application file for complete search history.

(56) References Cited

U.S. PATENT DOCUMENTS 10,372,248 B2 * 8/2019 Endo .................... G06F 3/04184
2018/0107309 A1 * 4/2018 Endo ..................... G06F 3/0416
(Continued)

FOREIGN PATENT DOCUMENTS

CN 112835474 A 5/2021
CN 114385038 A 4/2022
(Continued)

*Primary Examiner* — Peter D Mcloone
(74) *Attorney, Agent, or Firm* — The Webb Law Firm

(57) ABSTRACT

A touch driving circuit includes first touch signal terminals, second touch signal terminals and analog front-end circuits. A number of the first touch signal terminals is greater than a number of the second touch signal terminals, and a number of the analog front-end circuits is equal to the number of the second touch signal terminals. Each analog front-end circuit in at least one analog front-end circuit is connected to at least two first touch signal terminals, and the analog front-end circuit connected to the at least two first touch signal terminals is configured to receive first touch detection signals from the at least two first touch signal terminals in a time-sharing mode. An analog front-end circuit is connected to a second touch signal terminal, and the analog front-end circuit is configured to receive a second touch detection signal from the second touch signal terminal.

19 Claims, 26 Drawing Sheets

(56)                    References Cited

U.S. PATENT DOCUMENTS

| 2021/0200354 | A1 | | 7/2021 | Kang et al. | |
| 2024/0427454 | A1 | * | 12/2024 | Lee | G06F 3/04166 |
| 2025/0138669 | A1 | * | 5/2025 | Kim | G06F 3/0442 |

FOREIGN PATENT DOCUMENTS

| CN | 114647341 | A | 6/2022 |
| CN | 116048300 | A | 5/2023 |
| CN | 116126166 | A | 5/2023 |
| CN | 117389431 | A | 1/2024 |

* cited by examiner

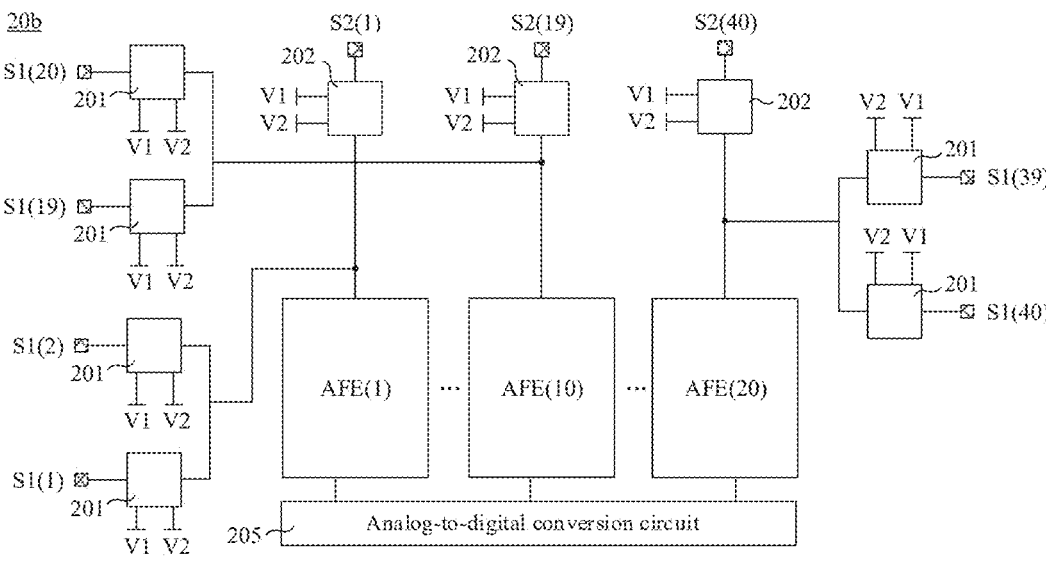
FIG. 3
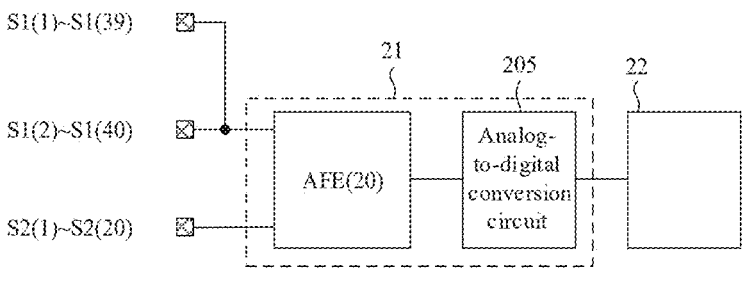
FIG. 4
FIG. 5

TOUCH DRIVING CIRCUIT AND DRIVING METHOD THEREFOR, AND DISPLAY DEVICE

CROSS-REFERENCE TO RELATED APPLICATION

This application is the United States national phase of International Patent Application No. PCT/CN2024/074100, filed Jan. 25, 2024, the disclosure of which is hereby incorporated by reference in its entirety.

BACKGROUND OF THE INVENTION

Field of the Invention

The present disclosure relates to the field of display technologies, and in particular, to touch driving circuits and driving methods therefor, and display devices.

Description of Related Art

With the development of display technologies, prices of display panels continue to drop. In order to improve product competitiveness, reduction of the cost of display panel is one of technological development directions in this field. As one of important components of a touch display panel, a touch integrated circuit (IC) is also an important target for cost reduction.

SUMMARY OF THE INVENTION

In an aspect, a touch driving circuit is provided. The touch driving circuit includes: a plurality of first touch signal terminals, a plurality of second touch signal terminals and a plurality of analog front-end circuits. A number of the first touch signal terminals is greater than a number of the second touch signal terminals, and a number of the analog front-end circuits is equal to the number of the second touch signal terminals. An analog front-end circuit is connected to a second touch signal terminal, and each analog front-end circuit in at least one analog front-end circuit is connected to at least two first touch signal terminals.

In some embodiments, each analog front-end circuit is connected to two first touch signal terminals and one second touch signal terminal.

In some embodiments, the touch driving circuit further includes: a plurality of first output circuits and a plurality of second output circuits. Each first output circuit is connected to a first touch signal terminal, and the first output circuit is configured to output a first driving signal to the corresponding first touch signal terminal. Each second output circuit is connected to a second touch signal terminal, and the second output circuit is configured to output a second driving signal to the corresponding second touch signal terminal.

In some embodiments, a number of the first output circuits is greater than a number of the second output circuits, and the number of the second output circuits is equal to the number of the analog front-end circuits.

In some embodiments, the first touch signal terminal is a touch transmitting signal terminal, and the second touch signal terminal is a touch sensing signal terminal.

In some embodiments, the first touch signal terminal is a touch sensing signal terminal, and the second touch signal terminal is a touch transmitting signal terminal.

In some embodiments, in the first output circuit and the second output circuit, an output circuit connected to the touch transmitting signal terminal includes a first switch and a second switch. A first end of the first switch is connected to a first voltage signal terminal, and a second end of the first switch is connected to the corresponding touch transmitting signal terminal. A first end of the second switch is connected to a second voltage signal terminal, and a second end of the second switch is connected to the corresponding touch transmitting signal terminal.

In some embodiments, in the first output circuit and the second output circuit, the output circuit connected to the touch transmitting signal terminal further includes a third switch. A first end of the third switch is connected to a third voltage signal terminal, and a second end of the third switch is connected to the corresponding touch transmitting signal terminal.

A voltage value of one of a second voltage signal provided by the second voltage signal terminal and a third voltage signal provided by the third voltage signal terminal is greater than a voltage value of a first voltage signal provided by the first voltage signal terminal, and a voltage value of another of the second voltage signal provided by the second voltage signal terminal and the third voltage signal provided by the third voltage signal terminal is less than the voltage value of the first voltage signal.

In some embodiments, in the first output circuit and the second output circuit, an output circuit connected to the touch sensing signal terminal includes a fourth switch and a fifth switch. A first end of the fourth switch is connected to a first voltage signal terminal, and a second end of the fourth switch is connected to the corresponding touch sensing signal terminal. A first end of the fifth switch is connected to a second voltage signal terminal, and a second end of the fifth switch is connected to the corresponding touch sensing signal terminal.

In some embodiments, the touch driving circuit further includes a plurality of first control switches and a plurality of second control switches. The analog front-end circuit connected to the at least two first touch signal terminals is connected to at least two first touch signal terminals by at least two first control switches; and the at least two first control switches connected to the same analog front-end circuit are configured to be turned on in a time-sharing mode to transmit first touch detection signals from the at least two first touch signal terminals to the analog front-end circuit in time-sharing mode. Each analog front-end circuit is connected to a second touch signal terminal by a second control switch.

In some embodiments, the touch driving circuit further includes a plurality of first electrostatic protection units and a plurality of second electrostatic protection units. Each first electrostatic protection unit is connected between a first touch signal terminal and a first control switch. Each second electrostatic protection unit is connected between the second touch signal terminal and the second control switch.

In another aspect, a touch driving circuit is provided. The touch driving circuit includes: a plurality of first touch signal terminals, a plurality of second touch signal terminals and a plurality of analog front-end circuits. A number of the analog front-end circuits being less than a number of the first touch signal terminals and less than a number of the second touch signal terminals. Each analog front-end circuit in at least one analog front-end circuit is connected to at least two first touch signal terminals, and each analog front-end circuit in the at least one analog front-end circuit is connected to at least two second touch signal terminals.

In some embodiments, the number of the first touch signal terminals is equal to the number of the second touch signal terminals. Each analog front-end circuit is connected to at least two first touch signal terminals and at least two second touch signal terminals.

In yet another aspect, a display device is provided. The display device includes: a display panel and a touch driving circuit connected to the display panel. The touch driving circuit is the touch driving circuit provided by any of the above embodiments. The display panel includes: a plurality of first touch channels arranged in parallel and at intervals in a first direction and a plurality of second touch channels arranged in parallel and at intervals in a second direction. The first direction intersects the second direction. Each first touch channel extends in a second direction, and a first touch channel is connected to a first touch signal terminal of the touch driving circuit. Each second touch channel extends in the first direction; and a second touch channel is connected to a second touch signal terminal of the touch driving circuit.

In yet another aspect, a driving method for a touch driving circuit is provided. The driving method for the touch driving circuit may be applied to the touch driving circuit as described in the above embodiments. The touch driving circuit further includes a first output circuit connected to a first touch signal terminal and a second output circuit connected to a second touch signal terminal. In the touch driving circuit, the first touch signal terminal is a touch transmitting signal terminal, and the second touch signal terminal is a touch sensing signal terminal. The driving method for the touch driving circuit includes a self-capacitance detection phase, and the self-capacitance detection phase includes the following driving process.

The first output circuit applies a first driving signal to the first touch signal terminal; and at least two first touch signal terminals connected to a same analog front-end circuit transmit first touch detection signals to the corresponding analog front-end circuit in a time-sharing mode based on a capacitance change of a touch structure in a display panel.

The second output circuit applies a second driving signal to the second touch signal terminal; and the second touch signal terminal transmits a second touch detection signal to an analog front-end circuit connected to the second touch signal terminal based on the capacitance change of the touch structure in the display panel.

In some embodiments, the driving method further includes a mutual capacitance detection phase, and the mutual capacitance detection phase includes the following driving process.

The first output circuit applies the first driving signal to the first touch signal terminal; and the second touch signal terminal transmits the second touch detection signal to the analog front-end circuit connected to the second touch signal terminal based on the capacitance change of the touch structure in the display panel.

In yet another aspect, a driving method for a touch driving circuit is provided. The driving method for the touch driving circuit may be applied to the touch driving circuit as described in the above embodiments. The touch driving circuit further includes a second output circuit connected to a second touch signal terminal. In the touch driving circuit, a first touch signal terminal is a touch sensing signal terminal, and the second touch signal terminal is a touch transmitting signal terminal. The driving method for the touch driving circuit includes a mutual capacitance detection phase, and the mutual capacitance detection phase includes the following driving process.

The second output circuit applies a second driving signal to the second touch signal terminal; and at least two first touch signal terminals connected to a same analog front-end circuit transmit first touch detection signals to the analog front-end circuit connected to the at least two first touch signal terminals in a time-sharing mode based on a capacitance change of a touch structure in a display panel.

In some embodiments, the touch driving circuit further includes a first output circuit connected to a first touch signal terminal. The driving method further includes a self-capacitance detection phase, and the self-capacitance detection phase includes the following driving process.

The first output circuit applies a first driving signal to the first touch signal terminal; and the at least two first touch signal terminals connected to the same analog front-end circuit transmit the first touch detection signals to the analog front-end circuit connected to the at least two first touch signal terminals in a time-sharing mode based on the capacitance change of the touch structure in the display panel.

The second output circuit applies a second driving signal to the second touch signal terminal; and the second touch signal terminal transmits a second touch detection signal to an analog front-end circuit connected to the second touch signal terminal based on the capacitance change of the touch structure in the display panel.

In yet another aspect, a driving method for a touch driving circuit is provided. The driving method for the touch driving circuit may be applied to the touch driving circuit as described in the above embodiments. The touch driving circuit further includes a first output circuit connected to a first touch signal terminal. In the touch driving circuit, the first touch signal terminal is a touch transmitting signal terminal, and a second touch signal terminal is a touch sensing signal terminal. The driving method includes a mutual capacitance detection phase, and the mutual capacitance detection phase includes the following driving process.

The first output circuit applies a first driving signal to the first touch signal terminal; and at least two second touch signal terminals connected to a same analog front-end circuit transmit second touch detection signals to the analog front-end circuit connected to the at least two second touch signal terminals in a time-sharing mode based on a capacitance change of a touch structure in a display panel.

In some embodiments, the touch driving circuit further includes a second output circuit connected to a second touch signal terminal. The driving method further includes a self-capacitance detection phase, and the self-capacitance detection phase includes the following driving process.

The first output circuit applies the first driving signal to the first touch signal terminal; and at least two first touch signal terminals connected to a same analog front-end circuit transmit first touch detection signals to the corresponding analog front-end circuit in a time-sharing mode based on the capacitance change of the touch structure in the display panel.

The second output circuit applies a second driving signal to the second touch signal terminal; and the at least two second touch signal terminals connected to the same analog front-end circuit transmit the second touch detection signals to the corresponding analog front-end circuit in a time-sharing mode based on the capacitance change of the touch structure in the display panel.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal to which the embodiments of the present disclosure relate.

FIG. 3 is an equivalent circuit diagram of a touch driving circuit, in accordance with some embodiments;

FIG. 4 is a structural block diagram of a touch driving circuit, in accordance with some embodiments;

FIG. 5 is an equivalent circuit diagram of another touch driving circuit, in accordance with some embodiments;

DESCRIPTION OF THE INVENTION

Figure 1:
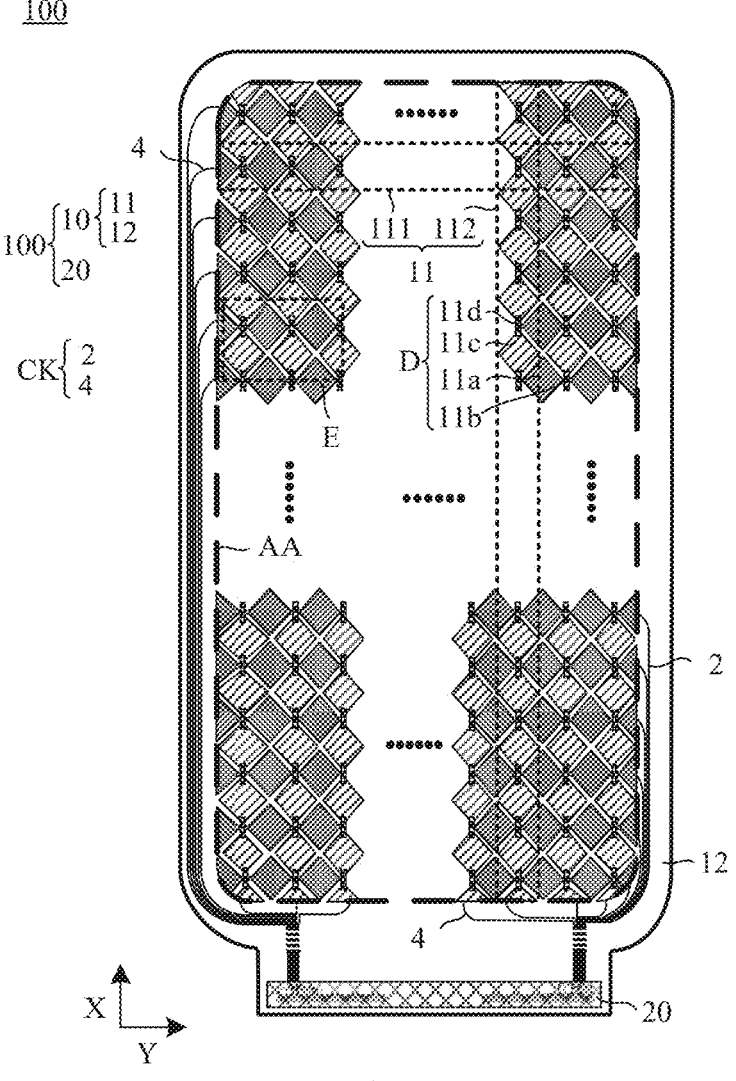
FIG. 1 is a plan structural diagram of a display device, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled" and "connected" and derivatives thereof may be used. The term "connection" should be understood in a broad sense. For example, the "connection" may be a fixed connection, a detachable connection, or of an integrated structure; it may be a direct connection, or an indirect connection by an intermediate medium. For example, the term "coupled" may indicate that two or more components are in direct physical or electrical contact. The term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The phrase "applicable to" or "configured to" as used herein indicates an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art in view of measurement in question and errors associated with the measurement of a particular quantity (i.e., limitations of the measurement system). For example, the term "parallel" includes absolute parallelism and approximate parallelism, and an acceptable range of deviation of the approximate parallelism may be a deviation within 5°; the term "perpendicular" includes absolute perpendicularity and approximate perpendicularity, and an acceptable range of deviation of the approximate perpendicularity may also be a deviation within 5°; and the term "equal" includes absolute equality and approximate equality, and an acceptable range of deviation of the approximate equality may be a difference between two equals being less than or equal to 5% of either of the two equals.

It will be understood that when a layer or element is referred to as being on another layer or substrate, the layer or element may be directly on the another layer or substrate, or there may be intermediate layer(s) between the layer or element and the another layer or substrate.

Exemplary embodiments are described herein with reference to sectional views and/or plane views as idealized exemplary drawings. In the accompanying drawings, thicknesses of layers and sizes of areas/regions are enlarged for clarity. Variations in shapes relative to the accompanying drawings due to, for example, manufacturing technologies and/or tolerances may be envisaged. Therefore, the exemplary embodiments should not be construed to be limited to the shapes of areas/regions shown herein, but to include deviations in the shapes due to, for example, manufacturing. For example, an etched area/region shown in a rectangular shape generally has a feature of being curved. Therefore, the areas/regions shown in the accompanying drawings are schematic in nature, and their shapes are not intended to show actual shapes of the areas/regions in a device, and are not intended to limit the scope of the exemplary embodiments.

Embodiments of the present disclosure provide a display device 100. As shown in FIG. 1, the display device 100 includes a display panel 10 and a touch driving circuit 20 connected to the display panel 10. The display panel 10 includes a touch structure 11. The touch structure 11 is connected to the touch driving circuit 20. The touch structure 11 is connected to the touch driving circuit 20 to obtain a touch driving signal, thereby realizing a touch function of the display panel 10.

For example, the display device 100 includes, but is not limited to, any product or component having a display function such as a mobile phone, a wearable device (e.g., a portable computer watch), a personal digital assistant (PDA), a navigator, a hand-held or portable computer (e.g., a tablet computer or a notebook computer), a GPS receiver/navigator, a camera, an MP4 video player, a video camera, a game console, a flat panel display, a computer monitor, an automobile display (e.g., an odometer display), a navigator, a cockpit controller and/or display and a display of camera views (e.g., a display of a rear-view camera in a vehicle).

In some embodiments, as shown in FIG. 1, the display device 100 includes the display panel 10, and the display device 100 is, for example, a touch display device. Based on this, the display panel 10 may be a display panel that only achieves the display function, the display panel is used to display an image to achieve the display function, and the display device 100 implements touch operation through a touch panel provided additionally to achieve the touch function. Alternatively, the display panel is a touch display panel, and the touch function and the display function may be achieved through a single display panel.

By taking an example of the display panel 10 being a touch display panel, the display panel 10 needs to be connected to an external driver structure (e.g., a display driving chip and a touch driving chip) to obtain a driving signal (e.g., a display driving signal and a touch driving signal), thereby realizing the display function and touch function of the display panel 10.

In some embodiments, the display device 100 further includes a display driving circuit and a touch driving circuit 20. The display driving circuit is connected to the display panel 10 and configured to drive the display panel 10 to achieve the display function. The touch driving circuit 20 is connected to the display panel 10 and configured to drive the display panel 10 to achieve the touch function.

Based on this, as shown in FIG. 1, the display driving circuit and the touch driving circuit may be provided on the same chip structure, that is, the display panel 10 is connected to a touch and display driver integration integrated chip (TDDI IC), and the display device 100 may achieve the display function and the touch function under control of a single chip. Alternatively, the display driving circuit and the touch driving circuit may be respectively provided on different chip structures, that is, the display panel 10 is connected to a display integrated circuit chip (DIC) and a touch integrated circuit chip (TIC), and the display device 100 achieves the display function and the touch function under control of two chips.

In some embodiments, as shown in FIG. 1, the touch structure 11 includes a plurality of first touch channels 111 arranged in parallel and at intervals in a first direction X, and a plurality of second touch channels 112 arranged in parallel and at intervals in a second direction Y. The first direction X and the second direction Y intersect. Each first touch channel 111 extends in the second direction Y, and a first touch channel 111 is connected to a first touch signal terminal S1 (referring to FIG. 3) of the touch driving circuit 20. Each second touch channel 112 extends in the first direction X, and a second touch channel 112 is connected to a second touch signal terminal S2 (referring to FIG. 3) of the touch driving circuit 20.

In some embodiments, as shown in FIG. 1, the display device 100 has a display area AA (also called an active area). The touch structure 11 includes a plurality of touch electrodes D disposed in the display area AA. The plurality of touch electrodes D include a plurality of first touch electrodes 11a and a plurality of second touch electrodes 11c, and the first touch electrodes 11a and the second touch electrodes 11c are electrically insulated.

Figure 2:
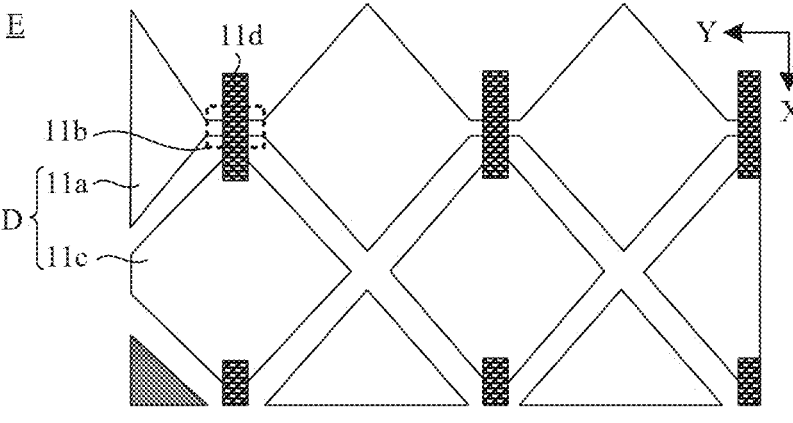
FIG. 2 is an enlarged structural view of a region E in FIG. 1.

For convenience of clearly describing details of the touch structure 11, an enlarged structural view of a region E shown in FIG. 2 only shows the touch structure 11. It can be understood that the region E of the display panel 10 may further include other structures in addition to the structure shown in the figure.

For example, as shown in FIGS. 1 and 2, multiple first touch electrodes 11a are arranged at intervals in the second direction Y, and any two adjacent first touch electrodes 11a are connected, for example, by a first connecting portion 11b. The multiple first touch electrodes 11a and multiple first connecting portions 11b arranged alternately in the second direction Y form a first touch channel 111.

For example, as shown in FIGS. 1 and 2, multiple second touch electrodes 11c are arranged at intervals in the first direction X, and any two adjacent second touch electrodes 11c are connected, for example, by a second connecting portion 11d. The multiple second touch electrodes 11c and multiple second connecting portions 11d arranged alternately in the first direction X form a second touch channel 112.

In some embodiments, as shown in FIG. 1, the display panel 10 further includes a plurality of touch leads CK. Each first touch channel 111 is connected to a first touch signal terminal S1 of the touch driving circuit 20 by a touch lead CK (e.g., a first touch lead 2 shown in FIG. 1). Each second touch channel 112 is connected to a second touch signal terminal S2 of the touch driving circuit 20 by a touch lead CK (e.g., a second touch lead 4 shown in FIG. 1).

In some embodiments, the touch structure 11 may achieve the touch function through mutual capacitance driving. The first touch signal terminal S1 is, for example, a touch transmitting signal terminal, and accordingly, the second touch signal terminal S2 is, for example, a touch sensing signal terminal.

Based on this, in a touch detection cycle Tc, the first touch signal terminal S1 of the touch driving circuit 20 applies a first driving signal to the corresponding first touch channel 111, and a basic capacitance is generated between the touch electrodes D (e.g., a first touch electrode 11a and a second touch electrode 11c that are adjacent) in the display panel 10.

When no touch action occurs, only a basic capacitance is generated in the touch structure 11. When a touch action occurs, during a finger touching the display panel 10, a value of the mutual capacitance between the touch electrodes D at the touch position changes, and the second touch channel 112 transmits a sensing signal to the second touch signal terminal S2. The touch driving circuit 20 identifies the touch position of the finger according to the sensing signal, thereby achieving the touch function of the display panel 10.

In some embodiments, the touch driving circuit includes a plurality of first touch signal terminals S1, a plurality of second touch signal terminals S2, and a plurality of analog front-end circuits AFE.

For example, in the touch driving circuit, in a case where the number of the first touch signal terminals S1 is greater than the number of the second touch signal terminals S2, the number of the analog front-end circuits AFE is the same as the number of the first touch signal terminals S1. In the touch driving circuit, each analog front-end circuit AFE is connected to a first touch signal terminal S1; and in the touch driving circuit, each analog front-end circuit AFE in part of the analog front-end circuits AFE is connected to a second touch signal terminal S2, and the remaining part of the analog front-end circuits AFE are not connected to the second touch signal terminals S2.

For example, the touch driving circuit includes 76 first touch signal terminals S1, 51 second touch signal terminals S2, and 76 analog front-end circuits AFE. Each analog front-end circuit AFE in 51 analog front-end circuits AFE is connected to a first touch signal terminal S1 and a second touch signal terminal S2, and each analog front-end circuit AFE in the other 25 analog front-end circuits AFE is connected to a first touch signal terminal S1 and not connected to a second touch signal terminal S2.

For example, in the touch driving circuit, in a case where the number of the first touch signal terminals S1 is the same as the number of the second touch signal terminals S2, the number of the analog front-end circuits AFE is also the same as the number of the first touch signal terminals S1. In the touch driving circuit, an analog front-end circuit AFE is connected to a first touch signal terminal S1 and to a second touch signal terminal S2.

For example, the touch driving circuit includes 40 first touch signal terminals S1 and 40 second touch signal terminals S2, and the touch driving circuit further includes 40 analog front-end circuits AFE. Each analog front-end circuit AFE is connected to a first touch signal terminal S1 and a second touch signal terminal S2.

In some application scenarios, the touch driving circuit may be encapsulated on a substrate to form a touch driving chip, and the touch driving chip is correspondingly connected to the display panel 10. Based on this, the more the numbers of first touch channels 111 and the second touch channels 112 in the display panel 10, the more the numbers of the first touch signal terminals S1 and the second touch signal terminals S2 in the touch driving circuit, and accordingly, the more the number of the analog front-end circuits AFE.

The analog front-end circuit AFE has a relatively large area ratio (a ratio of an area of the analog front-end circuit AFE to an area of the touch driving circuit). Thus, the touch driving circuit will have a relatively large overall size, and accordingly, the touch chip will have a relatively large size. Moreover, an increase in the number of the analog front-end circuits AFE will also lead to an increase of the cost of the touch driving circuit increase.

In light of this, embodiments of the present disclosure provide a touch driving circuit 20b. As shown in FIG. 3, the touch driving circuit 20b includes a plurality of first touch signal terminals S1, a plurality of second touch signal terminals S2, and a plurality of analog front-end circuits AFE. The number of the first touch signal terminals S1 is greater than the number of the second touch signal terminals S2, and the number of the analog front-end circuits AFE is equal to the number of the second touch signal terminals S2.

For example, the first touch signal terminal S1 is a touch transmitting signal terminal, and the second touch signal terminal is a touch sensing signal terminal, Based on this, in the touch structure 11, the first touch electrode 11a is a touch driving electrode Tx, and the second touch electrode 11c is a touch sensing electrode Rx. In the mutual capacitance detection phase, the first touch signal terminal S1 sends a touch driving signal to a first touch channel 111 of the touch structure 11, and the second touch channel 112 transmits a touch sensing signal to a second touch signal terminal S2 based on a capacitance change of the touch structure 11, so as to detect the touch position.

Alternatively, the first touch signal terminal S1 is a touch sensing signal terminal, and the second touch signal terminal is a touch transmitting signal terminal. Based on this, in the touch structure 11, the first touch electrode 11a is a touch sensing electrode Rx, and the second touch electrode 11c is a touch driving electrode Tx. In the mutual capacitance detection phase, the second touch signal terminal S2 sends a touch driving signal to a second touch channel 112 of the touch structure 11, and the first touch channel 111 transmits a touch sensing signal to a first touch signal terminal S1 based on a capacitance change of the touch structure 11, so as to detect the touch position.

In some embodiments, in the touch driving circuit 20b, each analog front-end circuit AFE in at least one analog front-end circuit AFE is connected to at least two first touch signal terminals S1. For example, during touch driving, self-capacitance detection may be performed using the first touch channel 111 of the touch structure 11. In the self-capacitance detection phase, after a first driving signal is applied to the first touch channel 111 in the display panel 10 through the first touch signal terminal S1, the first touch channel 111 sends a first touch detection signal to the corresponding first touch signal terminal S1 based on the capacitance change of the touch structure 11. Next, the first touch signal terminal S1 sends the received first touch detection signal to the corresponding analog front-end circuit AFE.

In a case where an analog front-end circuit AFE is connected to a first touch signal terminal S1, the first touch signal terminal S1 sends the first touch detection signal to the analog front-end circuit AFE.

In a case where an analog front-end circuit AFE is connected to a plurality of (two or more) first touch signal terminals S1, the plurality of first touch signal terminals S1 are connected to the analog front-end circuit AFE in a time-sharing mode, and the analog front-end circuit AFE receives first touch detection signals from all first touch signal terminals S1 connected thereto in a time-sharing mode.

In the touch driving circuit 20b, an analog front-end circuit AFE is connected to a second touch signal terminal S2. In some embodiments, self-capacitance detection may be performed using the second touch channel 112 of the touch structure 11. In the self-capacitance detection phase, after a second driving signal is applied to the second touch channel 112 in the display panel 10 through the second touch signal terminal S2, the second touch channel 112 sends a second touch detection signal to the corresponding second touch signal terminal S2 based on the capacitance change of the touch structure 11. The analog front-end circuit AFE receives the second touch detection signal from the second touch signal terminal S2.

In some embodiments, the touch driving circuit 20b includes m first touch signal terminals S1 and n second touch signal terminals S2, where m and n are positive integers, and m is greater than n and n is greater than or equal to 1 (m>n≥1). Some embodiments of the present disclosure will be described below by taking an example where m is less than or equal to 2n (m≤2n).

The touch driving circuit 20b may include n analog front-end circuits AFE. Each analog front-end circuit AFE is connected to a respective second touch signal terminal S2; each analog front-end circuit AFE in (2n−m) analog front-end circuits AFE is connected to a respective first touch signal terminal S1, and each analog front-end circuit AFE in the remaining (m−n) analog front-end circuits AFE is connected to two first touch signal terminals S1.

For example, as shown in FIG. 3, the touch driving circuit 20b includes 40 first touch signal terminals S1 and 20 second touch signal terminals S2. Then, the touch driving circuit 20b further includes 20 analog front-end circuits AFE. Each analog front-end circuit AFE is connected to a second touch signal terminal S2 and two first touch signal terminals S1.

As another example, the touch driving circuit 20b includes 76 first touch signal terminals S1 and 51 second touch signal terminals S2. Then, the touch driving circuit 20b may include 51 analog front-end circuits AFE. Each analog front-end circuit AFE is connected to a second touch signal terminal S2; each analog front-end circuit AFE in 26 analog front-end circuits AFE is connected to a first touch signal terminal S1, and each analog front-end circuit AFE in the remaining 25 analog front-end circuits AFE is connected to two first touch signal terminals S1.

By using the technical solution provided in the above embodiments, in a case where the numbers of the first touch signal terminals S1 and the second touch signal terminals S2 in the touch driving circuit 20b are different, the number of the analog front-end circuits AFE is the same as the number of one of the first touch signal terminals S1 and the second touch signal terminals S2 with a smaller number.

In a case where the number of the first touch signal terminals S1 is greater than the number of the second touch signal terminals S2, each analog front-end circuit AFE in the touch driving circuit 20b may be connected to multiple (two or more) first touch signal terminals S1; alternatively, in the touch driving circuit 20b, each analog front-end circuit AFE in part of the analog front-end circuits AFE is connected to a first touch signal terminal S1, and each analog front-end circuit AFE in the remaining part of the analog front-end circuits AFE is connected to multiple first touch signal terminals S1.

In this way, in the touch driving circuit 20b, at least part of analog front-end circuits AFE in the plurality of analog front-end circuits AFE are multiplexed. As a result, in a case where the numbers of the first touch signal terminals S1 and the second touch signal terminals S2 remain unchanged, the number of the analog front-end circuits AFE in the touch driving circuit 20b may be reduced, thereby reducing the size of the touch driving circuit 20b and reducing the size and the cost of the touch chip.

It will be noted that in the touch driving circuit 20b, an analog front-end circuit AFE may be connected to three or more first touch signal terminals S1, and adaptive design may be made specifically as required.

In some embodiments, as shown in FIG. 4, the touch driving circuit 20 (e.g., the touch driving circuit 20b, a touch driving circuit 20c and a touch driving circuit 20d) includes an analog circuit module 21 and a digital circuit module 22, and the analog circuit module 21 and the digital circuit module 22 are connected. The analog circuit module 21 includes an analog front-end circuit AFE, and the analog front-end circuit AFE is configured to perform amplification and noise reduction processing on a received analog signal (e.g., the first touch detection signal and the second touch detection signal).

The analog circuit module 21 further includes an analog-to-digital conversion circuit 205, and the analog-to-digital conversion circuit 205 is connected to the analog front-end circuit AFE and the digital circuit module 22. The analog front-end circuit AFE is further configured to send a processed analog signal to the analog-to-digital conversion circuit 205.

For example, as shown in FIGS. 3 and 4, the analog front-end circuit AFE receives a sensing signal (a first touch detection signal or a second touch detection signal) transmitted by a corresponding touch signal terminal (a first touch signal terminal S1 or a second touch signal terminal S2), and performs amplification and noise reduction processing on the sensing signal. Next, the analog front-end circuit AFE sends the processed sensing signal to the analog-to-digital conversion circuit 205. The analog-to-digital conversion circuit 205 may be an analog-to-digital converter (ADC).

For example, the digital circuit module 22 includes a microcontroller unit (MCU), and the analog-to-digital conversion circuit 205 is also connected to the MCU. The analog-to-digital conversion circuit 205 converts the sensing signal from an analog signal into a digital signal and transmits the digital signal to the MCU. The MCU analyzes the digital signal to determine the touch position in the display panel 10.

In some embodiments, as shown in FIG. 3, each analog front-end circuit AFE is connected to two first touch signal terminals S1 and a second touch signal terminal S2. Each analog front-end circuit AFE is configured to receive first touch detection signals from the corresponding two first touch signal terminals S1 in a time-sharing mode. Each analog front-end circuit AFE is further configured to receive a second touch detection signal from the corresponding second touch signal terminal S2.

For example, as shown in FIG. 3, the touch driving circuit 20b includes m first touch signal terminals S1 and n second touch signal terminals S2, where m is equal to 2n (m=2n). Then, the touch driving circuit 20b may include n analog front-end circuits AFE. Each analog front-end circuit AFE is connected to a second touch signal terminal S2 and two first touch signal terminals S1.

For example, the touch driving circuit 20b includes 40 first touch signal terminals S1 and 20 second touch signal terminals S2. Thus, the touch driving circuit 20b further includes 20 analog front-end circuits AFE. Each analog front-end circuit AFE is connected to a second touch signal terminal S2 and two first touch signal terminals S1.

In this case, the number of the first touch signal terminals S1 is twice the number of the second touch signal terminals S2, and accordingly, the number of the analog front-end circuits AFE is the same as the number of the second touch signal terminals S2, and the number of the first touch signal terminals S1 is also twice the number of the analog front-end circuits AFE.

Compared with the touch driving circuit provided by some of the above embodiments, the touch driving circuit 20b provided in the present embodiments may effectively reduce the number of the analog front-end circuits AFE. For example, in a case where the number of the first touch signal terminals S1 is twice the number of the second touch signal terminals S2, the number of the analog front-end circuits AFE may be reduced by half using the touch driving circuit 20b provided in the present embodiments compared with the touch driving circuit provided by some of the above embodiments. Therefore, the cost of the touch driving circuit 20b is lower, and the size of the touch driving chip is smaller when applied to a touch driving chip, while the touch driving circuit 20b may be ensured to normally achieve driving control.

It will be noted that in the touch driving circuit 20b, an analog front-end circuit AFE may be connected to three or more first touch signal terminals S1, and adaptive design may be made specifically as required.

Some embodiments of the present disclosure will be described below by taking an example where the touch driving circuit 20b includes 40 first touch signal terminals S1, 20 second touch signal terminals S2 and 20 analog front-end circuits AFE.

As shown in FIG. 3, for convenience of describing the specific structure of the touch driving circuit 20b and connection relationship between various parts of the touch driving circuit 20b, the 40 first touch signal terminals S1 are numbered sequentially as a first touch signal terminal S1(1), a first touch signal terminal S1(2), . . . , and a first touch signal terminal S1(40); the 20 second touch signal terminals S2 are numbered sequentially as a second touch signal terminal S2(1), a second touch signal terminal S2(2), . . . , and a second touch signal terminal S2(20); and the 20 analog front-end circuits AFE are numbered sequentially as an analog front-end circuit AFE(1), an analog front-end circuit AFE(2), . . . , and an analog front-end circuit AFE(20).

Two first touch signal terminals S1 with adjacent numbers are connected to the same analog front-end circuit AFE. For example, the first touch signal terminal S1(1) and the first touch signal terminal S1(2) are connected to the analog front-end circuit AFE(1), the first touch signal terminal S1(3) and the first touch signal terminal S1(4) are connected to the analog front-end circuit AFE(2), . . . , and the first touch signal terminal S1(39) and the first touch signal terminal S1(40) are connected to the analog front-end circuit AFE(20).

Two second touch signal terminal S2 and the analog front-end circuit AFE with the same numbers are connected. The second touch signal terminal S2(1) is connected to the analog front-end circuit AFE(1), the second touch signal terminal S2(2) is connected to the analog front-end circuit AFE(2), . . . , and the second touch signal terminal S2(20) is connected to the analog front-end circuit AFE(20).

In some embodiments, as shown in FIG. 5, the touch driving circuit 20*b* further includes a plurality of first control switches G1. An analog front-end circuit AFE connected to at least two first touch signal terminals S1 is connected to the at least two first touch signal terminals S1 by at least two first control switches G1. The at least two first control switches G1 are configured to be turned on in a time-sharing mode to transmit first touch detection signals from the at least two first touch signal terminals S1 to the analog front-end circuit AFE in a time-sharing mode.

For example, as shown in FIG. 5, an analog front-end circuit AFE is connected to two first touch signal terminals S1, and each first touch signal terminal S1 in the two first touch signal terminals S1 is connected to the same analog front-end circuit AFE by a first control switch G1.

By providing the first control switch G1, the on-off connection of the first touch signal terminal S1 and the corresponding analog front-end circuit AFE may be controlled, so that the first touch signal terminal S1 and the corresponding analog front-end circuit AFE may be controlled to be on only when the sensing signal need to be transmitted and to be off at other times, thereby avoiding signal mistransmission.

In a case where an analog front-end circuit AFE is connected to multiple (two or more) first touch signal terminals S1, when multiple first touch signal terminals connected to the same analog front-end circuit AFE all need to transmit first touch detection signals to the corresponding analog front-end circuit AFE, multiple first control switches G1 connected to the same analog front-end circuit AFE are controlled to be turned on in a time-sharing mode, so that the multiple first touch signal terminals S1 may transmit the first touch detection signals to the same analog front-end circuit AFE in a time-sharing mode.

Compared with the touch driving circuits provided in some of the aforementioned embodiments, in the touch driving circuit 20*b* of the present embodiments an analog front-end circuit AFE may be connected to two or more first touch signal terminals S1, so as to achieve time-division multiplexing of the analog front-end circuit AFE. In this way, in a case where the number of the first touch signal terminals S1 and the number of the second touch signal terminals S2 are the same, the analog front-end circuits AFE in the touch driving circuit 20*b* provided in the present embodiments have rather small number, thereby being conducive to reducing the size of the touch driving circuit 20*b* and further reducing the size of the touch driving chip.

Furthermore, the first control switches G1 are provided to control the multiple first touch signal terminals S1 to be conductive to the same analog front-end circuit AFE in a time-sharing mode. Therefore, the circuit structure is simple, and an effect of reducing the area of the touch chip may be conducive to realization.

In some embodiments, as shown in FIG. 5, the touch driving circuit 20*b* further includes a plurality of second switches G2. Each analog front-end circuit AFE is connected to a second touch signal terminal S2 by a second control switch G2.

By providing the plurality of second control switches G2, the on-off connection of the second touch signal terminal S2 and the corresponding analog front-end circuit AFE may be controlled, so that the second touch signal terminal S2 and the corresponding analog front-end circuit AFE may be controlled to be on only when the sensing signal need to be transmitted and to be off at other times, thereby avoiding signal mistransmission.

Furthermore, the second control switches G2 are provided to control the on and off of the second touch signal terminal S2 and the analog front-end circuit AFE. Therefore, the circuit structure is simple, and an effect of reducing the area of the touch chip may be conducive to realization.

Figure 6:
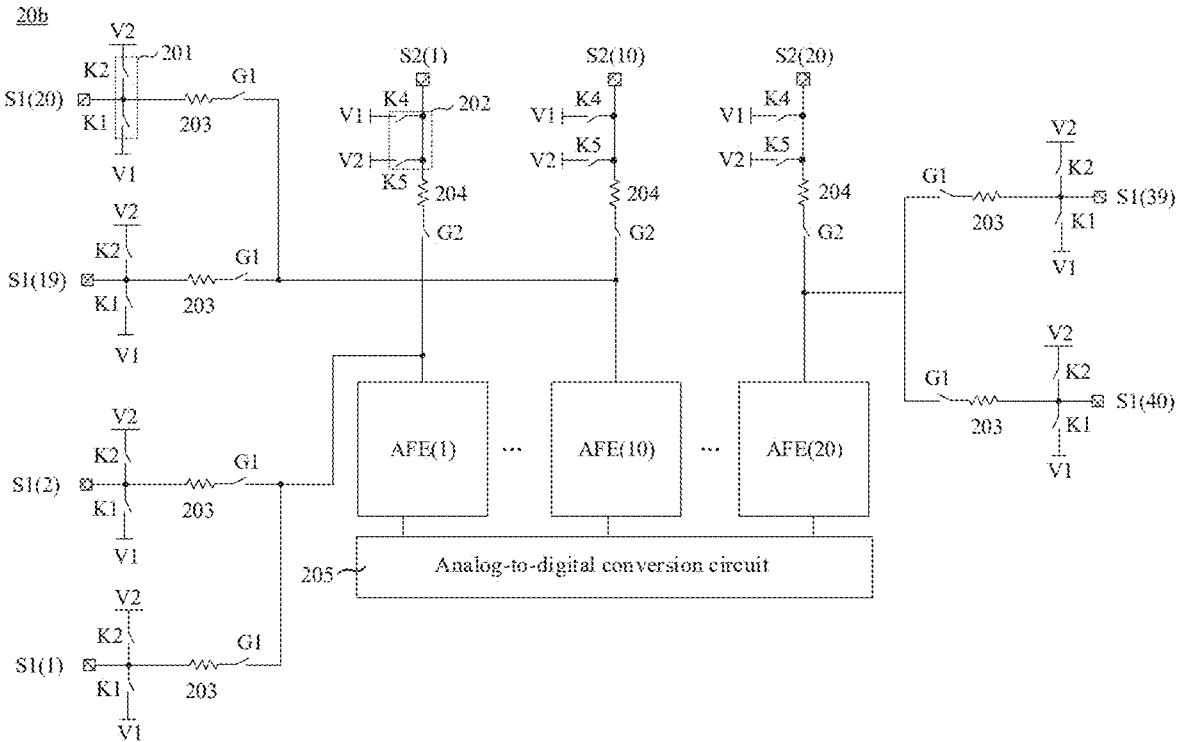
FIG. 6 is an equivalent circuit diagram of another touch driving circuit, in accordance with some embodiments.
Figure 7:
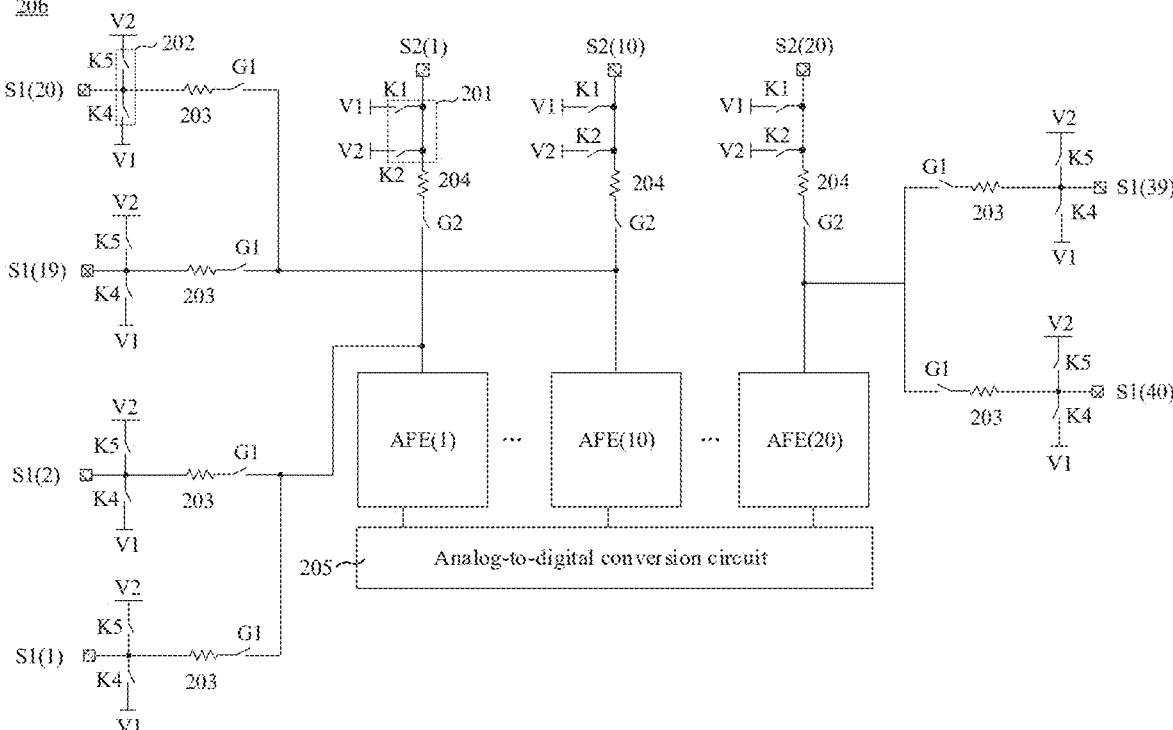
FIG. 7 is an equivalent circuit diagram of another touch driving circuit, in accordance with some embodiments.

In some embodiments, as shown in FIGS. 5, 6 and 7, the touch driving circuit 20*b* further includes a plurality of first electrostatic protection units 203 and a plurality of second electrostatic protection units 204. Each first electrostatic protection unit 203 is disposed between a first touch signal terminal S1 and a corresponding analog front-end circuit AFE, and each second electrostatic protection unit 204 is disposed between a second touch signal terminal S2 and a corresponding analog front-end circuit AFE.

For example, as shown in FIG. 5, each first electrostatic protection unit 203 is connected between a first control switch G1 and the corresponding first touch signal terminal S1, and each second electrostatic protection unit 204 is connected between a second control switch G2 and the corresponding analog front-end circuit AFE.

Alternatively, each first electrostatic protection unit 203 is connected between a first control switch G1 and the corresponding analog front-end circuit AFE, and each second electrostatic protection unit 204 is connected between a second control switch G2 and the corresponding second touch signal terminal S2.

As another example, as shown in FIG. 6, each first electrostatic protection unit 203 is connected between a first touch signal terminal S1 and a first control switch G1, and each second electrostatic protection unit 204 is connected between a second touch signal terminal S2 and a second control switch G2.

As another example, each first electrostatic protection unit 203 is connected between a first control switch G1 and the corresponding first touch signal terminal S1, and each second electrostatic protection unit 204 is connected between a second control switch G2 and the corresponding second touch signal terminal S2.

The connection manner between the first electrostatic protection unit 203 and the corresponding first control switch G1 and analog front-end circuit AFE, and the connection manner between the second electrostatic protection unit 204 and the corresponding second control switch G2 and analog front-end circuit AFE are not limited to the above examples.

For example, the first electrostatic protection unit 203 and the second electrostatic protection unit 204 each include at least one of a resistor and a diode. Of course, the first electrostatic protection unit 203 and the second electrostatic protection unit 204 may also include other electronic components, or adopt other circuit structures that can achieve an anti-static effect. The content here is merely an exemplary description of some possible implementations and is not intended to limit the present disclosure.

In a case where the first electrostatic protection unit 203 includes a resistor, the first electrostatic protection unit 203 is configured to reduce a current between the first touch signal terminal S1 and the corresponding analog front-end circuit AFE. In a case where the second electrostatic protection unit 204 includes a resistor, the second electrostatic protection unit 204 is configured to reduce a current between the second touch signal terminal S2 and the corresponding analog front-end circuit AFE.

In a case where the first control switch G1 is turned on, the first touch signal terminal S1 is conductive to the analog front-end circuit AFE; alternatively, in a case where the second control switch G2 is turned on, the second touch signal terminal S2 is conductive to the analog front-end circuit AFE.

By providing electrostatic protection units (the first electrostatic protection unit 203 and the second electrostatic protection unit 204), the current transmitted between the first touch signal terminal S1 and the analog front-end circuit AFE or between the second touch signal terminal S2 and the analog front-end circuit AFE may be reduced when the first control switch G1 or the second control switch G2 is turned on, so as to avoid damage to the touch driving circuit 20b or the display panel 10 caused by static electricity being transmitted to the analog front-end circuit AFE or the display panel 10 through the first control switch G1 or the second control switch G2 when the first control switch G1 or the second control switch G2 is turned on, thereby ensuring the safety of the circuit.

In a case where the first electrostatic protection unit 203 includes a diode, the first electrostatic protection unit 203 is configured to unidirectionally conduct the first touch signal terminal S1 and the corresponding analog front-end circuit AFE, so that an electrical signal (e.g., the first touch detection signal) may be transmitted only unidirectionally from the first touch signal terminal S1 to the corresponding analog front-end circuit AFE. In a case where the second electrostatic protection unit 204 includes a diode, the second electrostatic protection unit 204 is configured to unidirectionally conduct the second touch signal terminal S2 and the corresponding analog front-end circuit AFE, so that an electrical signal (e.g., the second touch detection signal) may be transmitted only unidirectionally from the second touch signal terminal S2 to the corresponding analog front-end circuit AFE.

By providing the electrostatic protection units and using the unidirectional conductivity of the diode, when the first control switch G1 or the second control switch G2 is turned on, it is ensured that only the electrical signal (the first touch detection signal or the second touch detection signal) transmitted from the first touch signal terminal S1 to the analog front-end circuit AFE or from the second touch signal terminal S2 to the analog front-end circuit AFE exists in the circuit, so as to avoid interference of the static electricity on the touch detection signal, thereby ensuring the accuracy of touch detection.

In some embodiments, as shown in FIGS. 3 and 5, the touch driving circuit 20b further includes a plurality of first output circuits 201 and a plurality of second output circuits 202.

Each first output circuit 201 is connected to a first touch signal terminal S1. In the mutual capacitance detection phase, or when self-capacitance detection is performed through the first touch channel 111 of the touch structure 11, the first output circuit 201 outputs a first driving signal to the corresponding first touch signal terminal S1, so as to change a driving voltage applied to the corresponding first touch channel 111 by the first touch signal terminal S1, thereby forming a basic capacitance in the touch structure 11.

Each second output circuit 202 is connected to a second touch signal terminal S2. In the mutual capacitance detection phase, or when self-capacitance detection is performed through the second touch channel 112 of the touch structure 11, the second output circuit 202 outputs a second driving signal to the corresponding second touch signal terminal S2, so as to change a driving voltage applied to the corresponding second touch channel 112 by the second touch signal terminal S2, thereby forming a basic capacitance in the touch structure 11.

For example, each first output circuit 201 is further connected to a first voltage signal terminal V1 and a second voltage signal terminal V2, and each second output circuit 202 is further connected to the first voltage signal terminal V1 and the second voltage signal terminal V2.

The first output circuit 201 is configured to output a first voltage signal provided by the first voltage signal terminal V1 or a second voltage signal provided by the second voltage signal terminal V2 to the corresponding first touch signal terminal S1. In the mutual capacitance detection phase or the self-capacitance detection phase, the first output circuit 201 outputs the first voltage signal or the second voltage signal to the corresponding first touch signal terminal S1. Thus, a voltage from the first touch signal terminal S1 to the corresponding first touch channel 111 is a first voltage or a second voltage, thereby forming a basic capacitance between the first touch channel 111 and the second touch channel 112 or between the first touch channel 111 and the ground in the touch structure 11.

The second output circuit 202 is configured to output a first voltage signal provided by the first voltage signal terminal V1 or a second voltage signal provided by the second voltage signal terminal V2 to the corresponding second touch signal terminal S2. In the mutual capacitance detection phase or the self-capacitance detection phase, the second output circuit 202 outputs the first voltage signal or the second voltage signal to the corresponding second touch signal terminal S2. Thus, a voltage from the second touch signal terminal S2 to the corresponding second touch channel 112 is a first voltage or a second voltage, thereby forming a basic capacitance between the second touch channel 112 and the first touch channel 111 or between the second touch channel 112 and the ground in the touch structure 11.

By providing the first output circuit 201 and the second output circuit 202, in a driving process of the touch driving circuit, a driving signal is sent to the first touch signal terminal S1 and the second touch signal terminal S2 based on a received control signal (the control signal may be a mutual capacitance driving command signal or a self-capacitance driving command signal), thereby adjusting voltage values of the first touch signal terminal S1 and the second touch signal terminal S2, and further adjusting the basic capacitance in the touch structure 11.

In some embodiments, as shown in FIGS. 3 and 5, the number of the first output circuits 201 is greater than the number of the second output circuits 202, and the number of the second output circuits 202 is equal to the number of the analog front-end circuits AFE.

Each first touch signal terminal S1 is connected to a first output circuit 201, and each second touch signal terminal S2 is connected to a second output circuit 202. In a case where the number of the first touch signal terminals S1 is greater than the number of the second touch signal terminals S2, the number of the first output circuits 201 is greater than the number of the second output circuits 202. Based on this, in a case where the number of the analog front-end circuits AFE in the touch driving circuit 20b is the same as the number of the second touch signal terminals S2 in the touch driving circuit 20b, the number of the second output circuits 202 is equal to the number of the analog front-end circuits AFE.

In some embodiments, as shown in FIGS. 6 and 7, in the first output circuit 201 and the second output circuit 202, an output circuit connected to the touch transmitting signal terminal includes a first switch K1 and a second switch K2. A first end of the first switch K1 is connected to the first voltage signal terminal V1, and a second end of the first switch K1 is connected to the corresponding touch transmitting signal terminal; a first end of the second switch K2 is connected to the second voltage signal terminal V2, and a second end of the second switch K2 is connected to the corresponding touch transmitting signal terminal.

For example, as shown in FIG. 6, the first touch signal terminal S1 is a touch transmitting signal terminal. The first touch signal terminal S1 is connected to the first voltage signal terminal V1 through the first switch K1, and the first touch signal terminal S1 is connected to the second voltage signal terminal V2 through the second switch K2. Alternatively, as shown in FIG. 7, the second touch signal terminal S2 is a touch transmitting signal terminal, and the first touch signal terminal S1 is a touch sensing signal terminal. The second touch signal terminal S2 is connected to the first voltage signal terminal V1 through the first switch K1, and the second touch signal terminal S2 is connected to the second voltage signal terminal V2 through the second switch K2.

By providing the first switch K1 and the second switch K2, the on-off connection of the touch transmitting signal terminal and the first voltage signal terminal V1 and the on-off connection of the touch transmitting signal terminal and the second voltage signal terminal V2 are independently controlled. The voltage control on the touch transmitting signal terminal may be achieved, the circuit structure is simple, and an effect of reducing the area of the touch chip may be conducive to realization.

In a driving process of the touch driving circuit 20b, within a touch detection cycle, the first output circuit 201 transmits the first voltage signal provided by the first voltage signal terminal V1 or the second voltage signal provided by the second voltage signal terminal V2 to the first touch signal terminal S1. In this case, in the display panel 10, a basic capacitance generated between the first touch electrode 11a and the second touch electrode 11c that are adjacent, and the same basic capacitance (mutual capacitance between the first touch electrode 11a and the second touch electrode 11c) is generated at each position in the touch structure 11. When a finger touches the display panel 10, the mutual capacitance of the touch structure 11 at the touch position of the finger will change. Each second touch electrode 11c in the display panel 10 transmits a second touch detection signal to a corresponding analog front-end circuit AFE, so as to determine the touch position.

Within a touch detection cycle, the first switch K1 and the second switch K2 are turned on in a time-sharing mode to transmit a first power signal or a second power signal to the touch transmitting signal terminal in a time-sharing mode, so as to change a voltage at the touch transmitting signal terminal, thereby generating different basic capacitances in the touch structure 11.

In a case where the basic capacitances in the touch structure 11 are different, based on the same touch operation, the capacitance change in the touch structure 11 may vary with the different basic capacitances. In this way, within the touch detection cycle, corresponding sensing signals may be detected based on different basic capacitances, thereby improving the accuracy of touch position detection.

For example, a voltage value provided by the first voltage signal terminal V1 is different from a voltage value provided by the second voltage signal terminal V2. For example, the first voltage signal terminal V1 is a ground signal terminal GND, the second voltage signal terminal V2 is a first power terminal Hvdd, a voltage provided by the first power terminal Hvdd is a high voltage, and the high voltage is greater than a ground voltage provided by the ground signal terminal GND.

Figure 8:
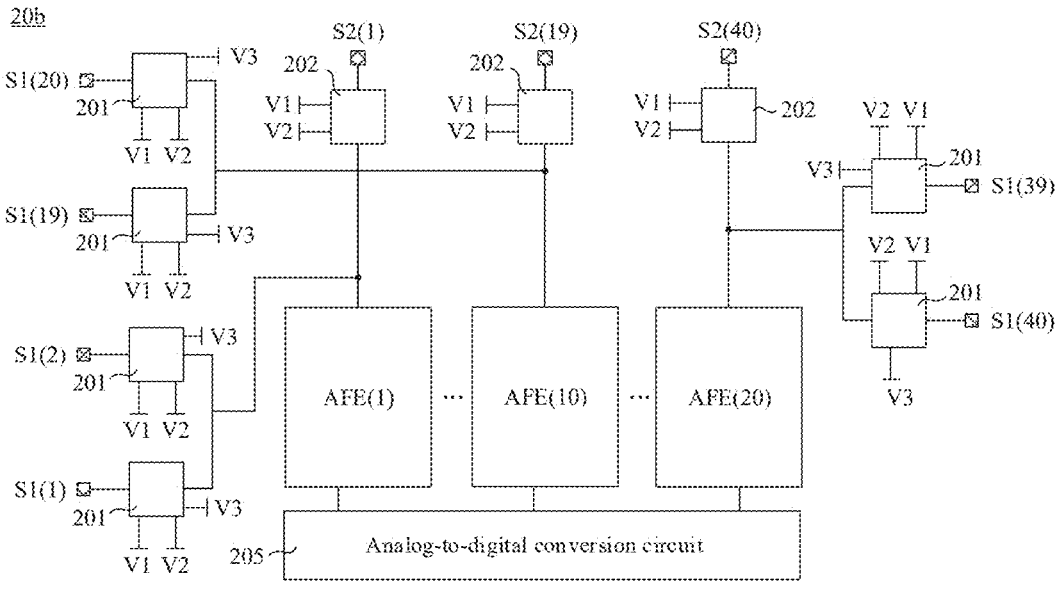
FIG. 8 is an equivalent circuit diagram of another touch driving circuit, in accordance with some embodiments.
Figure 9:
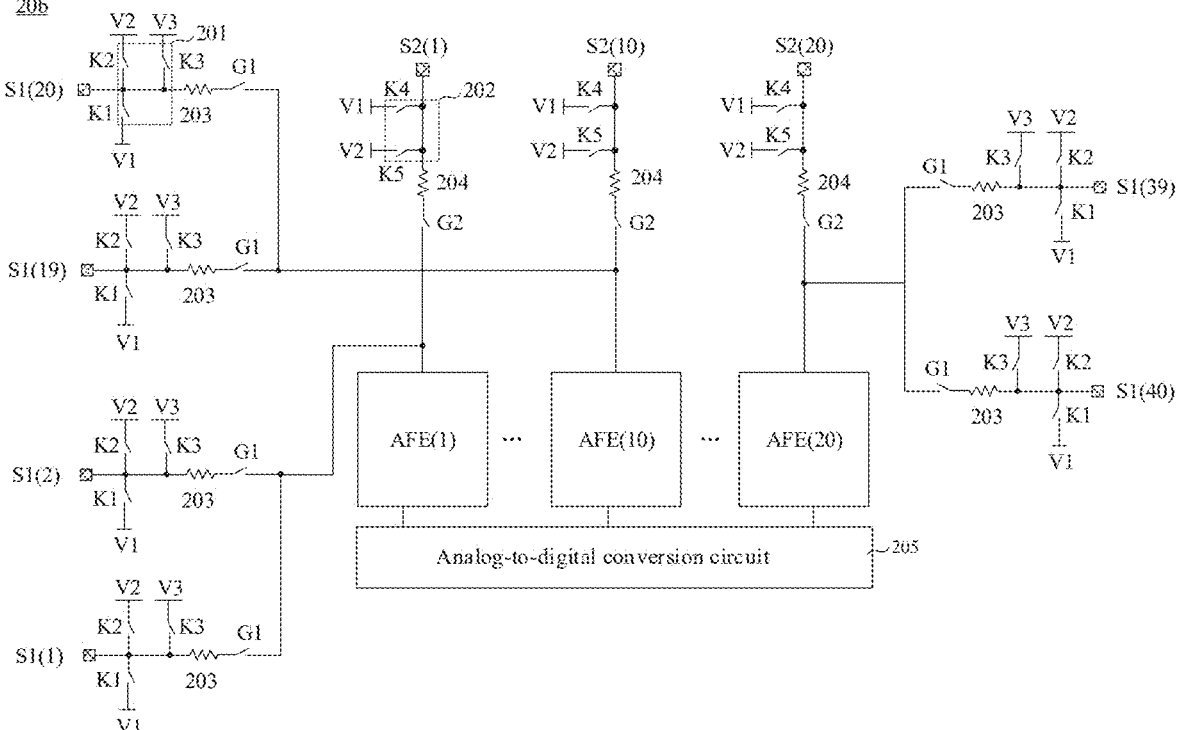
FIG. 9 is an equivalent circuit diagram of another touch driving circuit, in accordance with some embodiments.

In some embodiments, as shown in FIGS. 8 and 9, in the first output circuit 201 and the second output circuit 202, the output circuit connected to the touch transmitting signal terminal is further connected to a third voltage signal terminal V3. Based on this, in the first output circuit 201 and the second output circuit 202, the output circuit connected to the touch transmitting signal terminal further includes a third switch K3. A first end of the third switch K3 is connected to the third voltage signal terminal V3, and a second end of the third switch K3 is connected to the corresponding touch transmitting signal terminal.

Figure 48A:
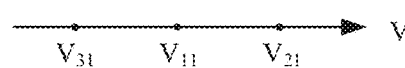
FIG. 48A is a diagram showing relationships of voltages of a first voltage signal provided by a first voltage signal terminal, a second voltage signal provided by a second voltage signal terminal and a third voltage signal provided by a third voltage signal terminal in FIG. 8.
Figure 48B:
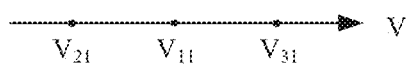
FIG. 48B is another diagram showing relationships of voltages of a first voltage signal provided by a first voltage signal terminal, a second voltage signal provided by a second voltage signal terminal and a third voltage signal provided by a third voltage signal terminal in FIG. 8.

As shown in FIGS. 48A-48B, a voltage value of one of a second voltage signal $V_{21}$ provided by the second voltage signal terminal V2 and a third voltage signal $V_{31}$ provided by the third voltage signal terminal V3 is greater than a voltage value of a first voltage signal $V_{11}$ provided by the first voltage signal terminal V1, and a voltage value of another of the second voltage signal $V_{21}$ provided by the second voltage signal terminal V2 and the third voltage signal $V_{31}$ provided by the third voltage signal terminal V3 is less than the voltage value of the first voltage signal $V_{11}$.

For example, as shown in FIGS. 8 and 9, the first touch signal terminal S1 is a touch transmitting signal terminal. In this case, the first output circuit 201 is further connected to the third voltage signal terminal V3. A first touch signal terminal S1 is connected to the third voltage signal terminal V3 through a third switch K3.

Alternatively, the second touch signal terminal S2 is a touch transmitting signal terminal. In this case, the second output circuit 202 is further connected to the third voltage signal terminal V3. A second touch signal terminal S2 is connected to the third voltage signal terminal V3 through a third switch K3.

By providing the third switch K3, the on-off connection of the touch transmitting signal terminal and the third voltage signal terminal V3 may be independently controlled. The voltage control on the touch transmitting signal terminal may be achieved, the circuit structure is simple, and an effect of reducing the area of the touch chip may be conducive to realization.

For example, a voltage value provided by the third voltage signal terminal V3 is different from a voltage value provided by the first voltage signal terminal V1 and a voltage value provided by the second voltage signal terminal V2. For example, the third voltage signal terminal V3 is a second power terminal Lvdd, a voltage provided by the second power terminal Lvdd is a low voltage, and the low voltage is less than a ground voltage provided by the ground signal terminal GND.

In a driving process of the touch driving circuit 20*b*, within a touch detection cycle, the first switch K1, the second switch K2 and the third switch K3 are turned on in a time-sharing mode to transmit a first power signal, a second power signal or a third power signal to the touch transmitting signal terminal in a time-sharing mode, so as to change a voltage at the touch transmitting signal terminal, thereby generating different basic capacitances in the touch structure 11.

In a case where the basic capacitances in the touch structure 11 are different, based on the same touch operation, the capacitance change in the touch structure 11 may vary with the different basic capacitances. By adding the third voltage signal terminal V3 and the third switch K3, within the touch detection cycle, corresponding sensing signals may be detected based on multiple different basic capacitances, thereby improving the accuracy of touch position detection.

In some embodiments, as shown in FIGS. 6 and 7, in the first output circuit 201 and the second output circuit 202, the output circuit connected to the touch sensing signal terminal includes a fourth switch K4 and a fifth switch K5. A first end of the fourth switch K4 is connected to the first voltage signal terminal V1, and a second end of the fourth switch K4 is connected to the corresponding touch sensing signal terminal; a first end of the fifth switch K5 is connected to the second voltage signal terminal V2, and a second end of the fifth switch K5 is connected to the corresponding touch sensing signal terminal.

For example, as shown in FIG. 6, the second touch signal terminal S2 is a touch sensing signal terminal. The second touch signal terminal S2 is connected to the first voltage signal terminal V1 through the fourth switch K4, and is connected to the second voltage signal terminal V2 through the fifth switch K5. Alternatively, as shown in FIG. 7, the first touch signal terminal S1 is a touch sensing signal terminal. The first touch signal terminal S1 is connected to the first voltage signal terminal V1 through the fourth switch K4, and is connected to the second voltage signal terminal V2 through the fifth switch K5.

By providing the fourth switch K4 and the fifth switch K5, the on-off connection of the touch sensing signal terminal and the first voltage signal terminal V1 and the on-off connection of the touch sensing signal terminal and the second voltage signal terminal V2 are independently controlled. The voltage control on the touch transmitting signal terminal may be achieved, the circuit structure is simple, and an effect of reducing the area of the touch chip may be conducive to realization.

In some embodiments of the present disclosure, the first touch signal terminal S1 is a touch transmitting signal terminal, and the second touch signal terminal S2 is a touch sensing signal terminal. Alternatively, the first touch signal terminal S1 is a touch sensing signal terminal, and the second touch signal terminal S2 is a touch transmitting signal terminal. Adaptive design may be made specifically as actual required, which is not limited in the present disclosure.

Accordingly, some embodiments of the present disclosure provide a display device 100. As shown in FIG. 1, in the display device 100, a touch driving circuit 20 connected to the display panel 10 may be the touch driving circuit 20*b* provided in any of the above embodiments.

The display device 100 equipped with the touch driving circuit 20*b* has corresponding beneficial technical effects as the touch driving circuit 20*b*, and details are not repeated here.

Figure 10:
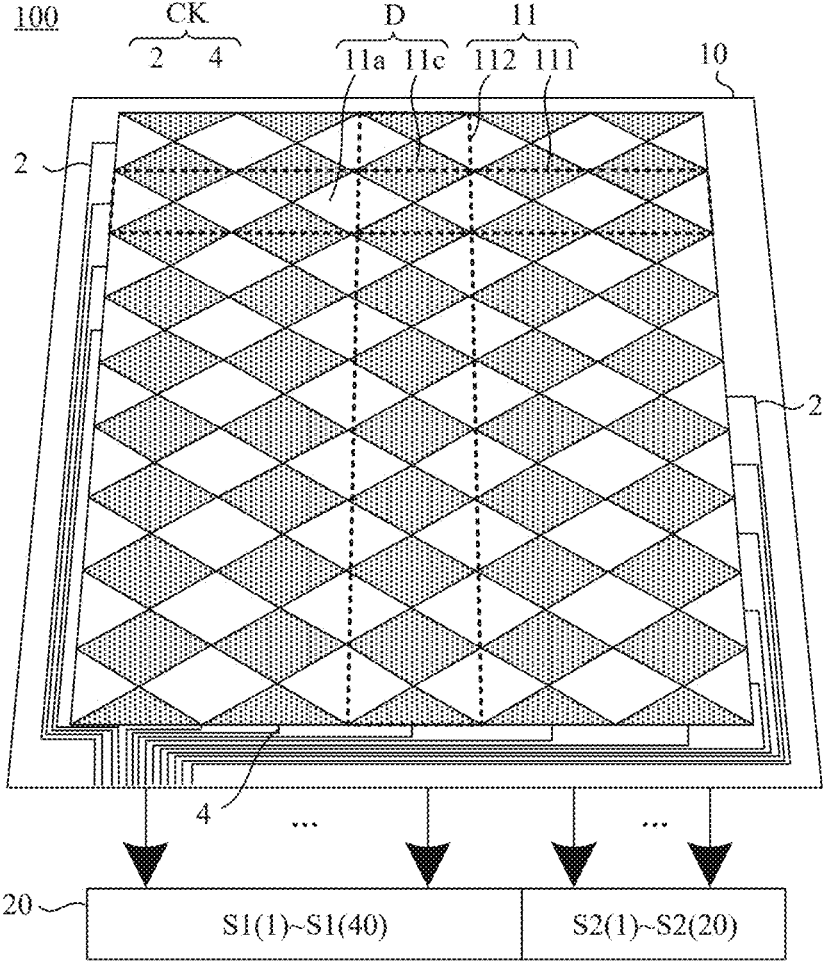
FIG. 10 is a plan structural diagram of a display device, in accordance with some embodiments.

FIG. 10 is a plan structural diagram of a display device in accordance with some embodiments. To facilitate clear description of some embodiments of the present disclosure, FIG. 10 only shows the touch structure 11 and part of touch leads CK, and the display device 100 further includes other structures.

Figure 11:
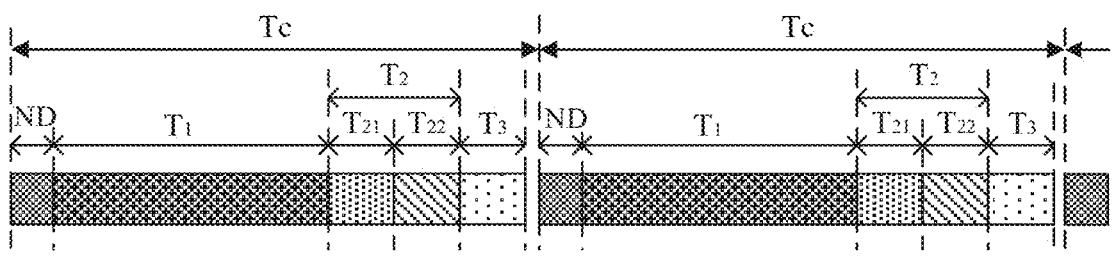
FIG. 11 is a driving timing diagram of a touch driving circuit, in accordance with some embodiments.

FIG. 11 is a touch driving timing diagram in accordance with some embodiments. The duration of each phase in the figure is only for schematic illustration but is not intended to limit the driving duration of each phase in the actual driving process.

Embodiments of the present disclosure provide a driving method of a touch driving circuit. The driving method of the touch driving circuit may be applied to the touch driving circuit 20*b* provided in any of the aforementioned embodiments. In a case where the first touch signal terminal S1 in the touch driving circuit 20*b* is a touch transmitting signal terminal and the second touch signal terminal S2 in the touch driving circuit 20*b* is a touch sensing signal terminal, in the display panel 10, the first touch electrode 11*a* is a touch driving electrode Tx and the second touch electrode 11*c* is a touch sensing electrode Rx.

As shown in FIGS. 10 and 11, when the touch driving circuit 20*b* performs touch driving on the display panel 10, within the touch detection cycle Tc, the touch driving circuit 20*b* applies a first driving signal to the corresponding touch driving electrode (i.e., the first touch electrode 11*a*) through the touch transmitting signal terminal, and detects the touch position based on the capacitance change of the touch structure 11 in the display panel 10.

For example, as shown in FIG. 11, the touch detection cycle Tc includes a mutual capacitance detection phase $T_1$. The driving method of the touch driving circuit 20*b* includes the mutual capacitance detection phase $T_1$, and the mutual capacitance detection phase $T_1$ includes the following driving process.

In S1, as shown in FIGS. 9, 10, 12 and 13, in the mutual capacitance detection phase $T_1$, the first output circuit 201 applies a first driving signal to the first touch signal terminal S1, and the second touch signal terminal S2 transmits a second touch detection signal to the connected analog front-end circuit AFE based on the capacitance change of the touch structure 11 in the display panel 10.

Figure 12:
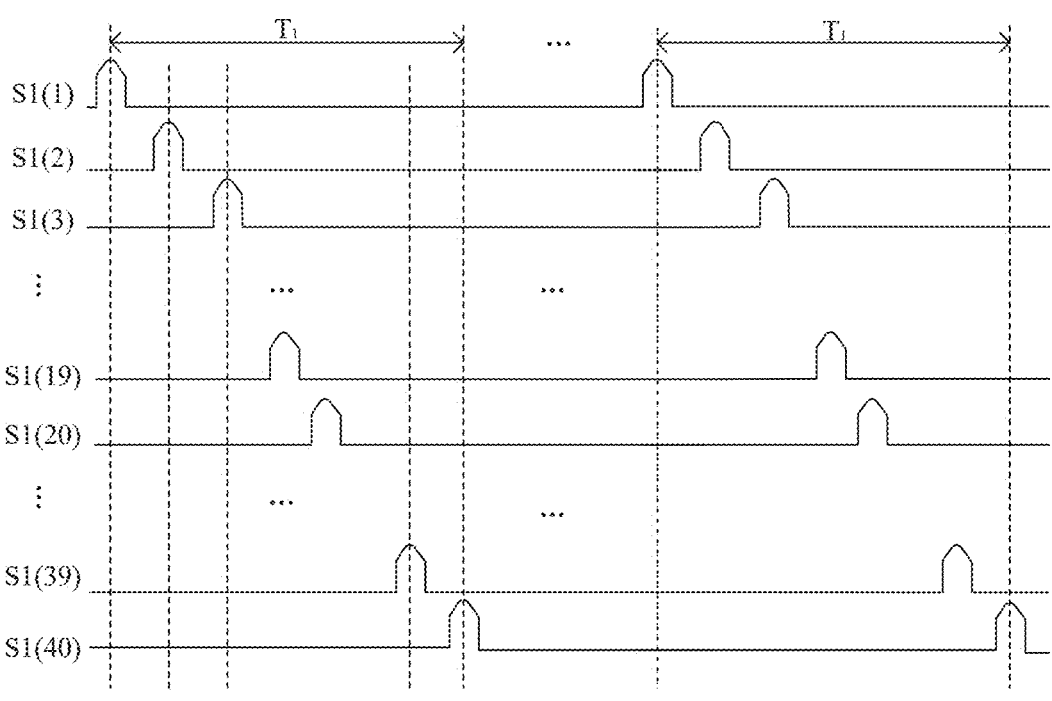
FIG. 12 is a timing diagram of a first touch signal terminal of a touch driving circuit, in accordance with some embodiments.
Figure 13:
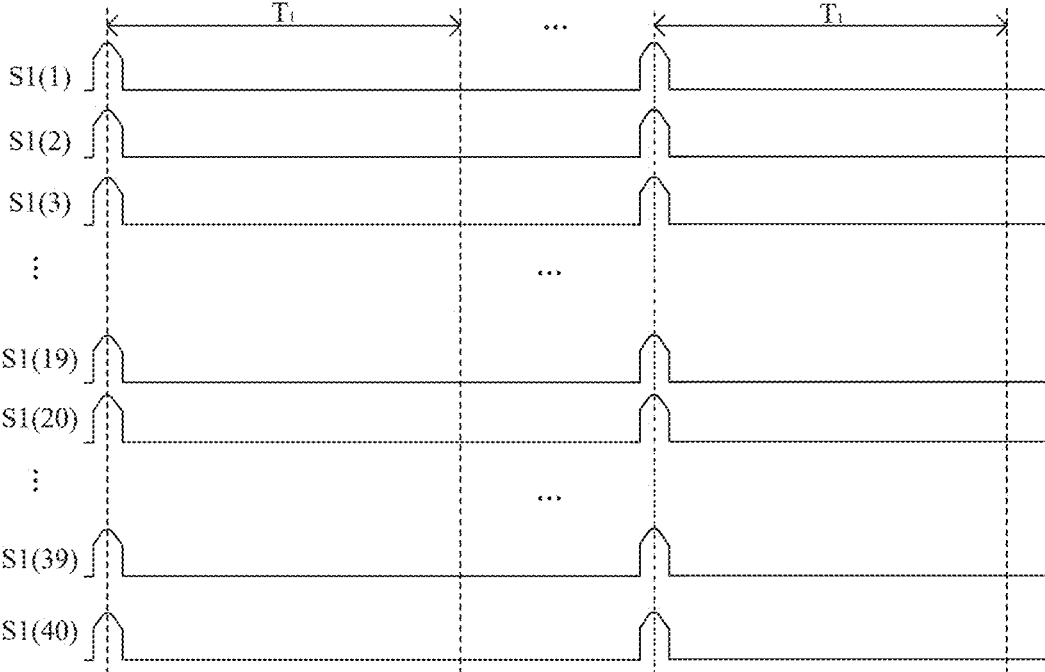
FIG. 13 is a timing diagram of a first touch signal terminal of another touch driving circuit, in accordance with some embodiments.

For example, as shown in FIG. 12, in the mutual capacitance detection phase $T_1$, a plurality of first output circuits 201 may apply first driving signals to the corresponding first touch signal terminals S1 sequentially; alternatively, as shown in FIG. 13, in the mutual capacitance detection phase $T_1$, the plurality of first output circuits 201 may apply first driving signals to the corresponding first touch signal terminals S1 simultaneously.

Based on this, no matter the plurality of first output circuits 201 apply the first driving signals to the corresponding first touch signal terminals S1 sequentially or simultaneously, the duration of the mutual capacitance detection phase $T_1$ may be the same. The adaptive design may be made specifically as actual required. The content here is merely an illustrative description of some possible implementations and is not intended to limit the present disclosure.

In some embodiments, as shown in FIG. 11, a noise detection phase ND (Noise Detect) is further included before the mutual capacitance detection phase $T_1$.

Before the mutual capacitance detection phase $T_1$ starts, the first output circuit 201 does not transmit a voltage signal to the first touch signal terminal S1. In this case, the first touch signal terminal S1 does not send out the first driving signal. At the same time, the second control switch G2 is turned on, the second touch signal terminal S2 is conductive to the corresponding analog front-end circuit AFE, and the second touch channel 112 in the display panel 10 transmits a voltage of each second touch electrode 11c to the corresponding analog front-end circuit AFE through the second touch signal terminal S2, and detects a frequency of the interference noise in the display panel 10 and the touch driving circuit 20b. In a case where the frequency of the interference noise is the same as or close to the frequency of the touch driving signal (e.g., the first driving signal), a frequency-hopped process is performed on the touch driving signal to adjust the frequency of the touch driving signal to a frequency different from that of the noise, so as to avoid interference of the noise on the touch signal and ensure the reliability of the touch driving process.

In this way, the interference noise is detected before the mutual capacitance detection phase $T_1$ starts. Then, in the mutual capacitance detection phase $T_1$, the received touch driving signal may be corrected based on the detected interference noise (the frequency of the touch driving signal is corrected to be significantly different from the frequency of the interference noise), thereby reducing an influence of the interference noise on the accuracy of touch position detection.

The specific driving process of the touch driving circuit 20b in the mutual capacitance detection phase $T_1$ will be illustrated below by taking an example in which the touch driving circuit 20b includes 40 first touch signal terminals S1, 20 second touch signal terminals S2 and 20 analog front-end circuits AFE, and the first output circuit 201 is connected to the first voltage signal terminal V1, the second voltage signal terminal V2 and the third voltage signal terminal V3.

The 40 first touch signal terminals S1 are sequentially a first touch signal terminal S1(1) to a first touch signal terminal S1(40), the 20 second touch signal terminals S2 are sequentially a second touch signal terminal S2(1) to a second touch signal terminal S2(20), and the 20 analog front-end circuits AFE are sequentially an analog front-end circuit AFE(1) to an analog front-end circuit AFE(20).

Figures 14, 15:
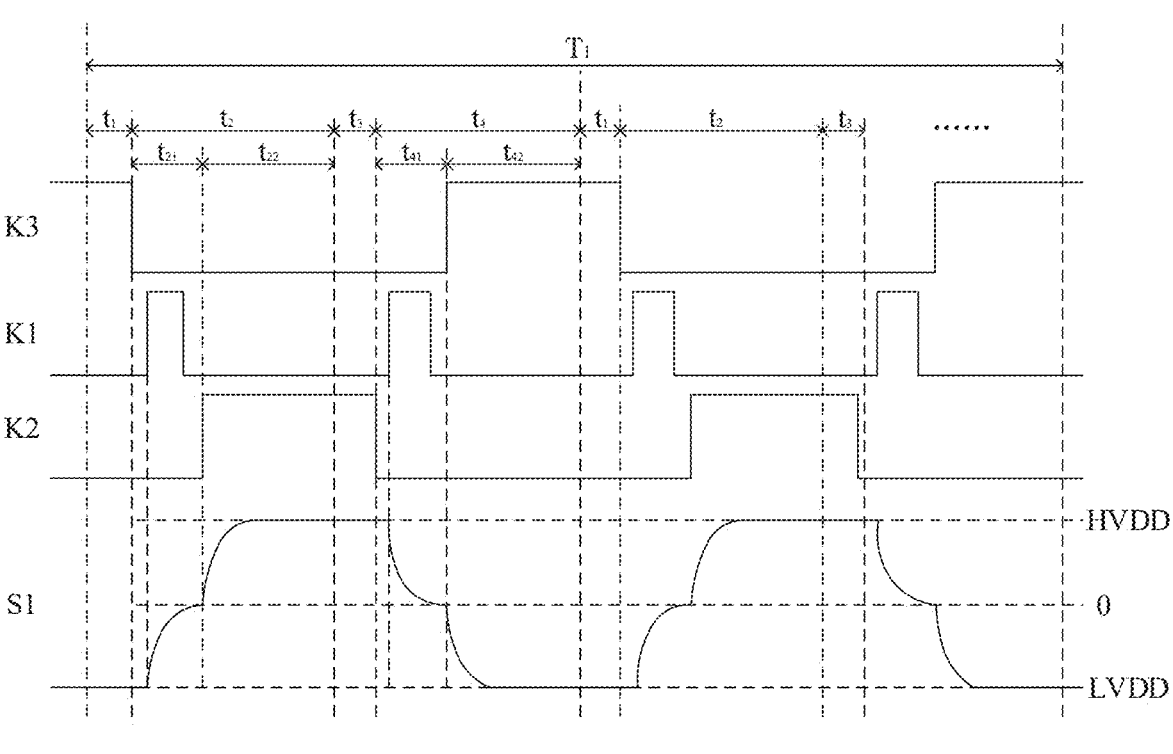
FIG. 14 is a timing diagram of a touch driving circuit, in accordance with some embodiments.
FIG. 15 is an equivalent circuit diagram of a touch driving circuit in a mutual capacitance detection phase, in accordance with some embodiments.

As shown in FIG. 14, the mutual capacitance detection phase $T_1$ includes the following phases $t_1$ to $t_4$.

In the phase $t_1$, the first output circuit 201 resets a potential at the first touch signal terminal S1, and the second output circuit 202 resets a potential at the second touch signal terminal S2.

For example, as shown in FIGS. 14 and 15, in the phase $t_1$, the first switch K1 and the second switch K2 in the first output circuit 201 are turned off, and the third switch K3 is turned on. The third voltage provided by the third voltage signal terminal V3 is transmitted to the corresponding first touch signal terminal S1 through the third switch K3, so that the voltage at the first touch signal terminal S1 is stably maintained at the third voltage. The first control switch G1 is turned off, and the first touch signal terminal S1 is disconnected from the corresponding analog front-end circuit AFE.

As shown in FIGS. 14 and 15, in the phase $t_1$ and in the second output circuit 202, the fifth switch K5 is turned off, the fourth switch K4 is turned on, and the first voltage provided by the first voltage signal terminal V1 is transmitted to the corresponding second touch signal terminal S2 through the fourth switch K4, so that the voltage at the second touch signal terminal S2 is stabilized at the first voltage. The second control switch G2 is turned off, and the second touch signal terminal S2 is disconnected from the corresponding analog front-end circuit AFE.

The first voltage may be a ground voltage. In the phase $t_1$, the voltage at the second touch signal terminal S2 is stabilized at the first voltage to reset the second touch signal terminal S2. In this case, the voltage on the corresponding second touch channel 112 of the touch structure 11 in the display panel 10 is reset to 0 V.

Correspondingly, in the phase $t_1$, in the display panel 10, a voltage of each first touch electrode 11a in the first touch channel 111 connected to the first touch signal terminal S1 is stably maintained at the third voltage. A voltage of each second touch electrode 11c in the second touch channel 112 connected to the second touch signal terminal S2 is stably maintained at the first voltage. The value of the basic capacitance (mutual capacitance) generated in the touch structure 11 (between the first touch electrodes 11a and the second touch electrodes 11c that are adjacent) in the display panel 10 is an absolute value of a difference between the first voltage and the third voltage.

As shown in FIG. 14, the first voltage signal terminal V1 may be a ground signal terminal GND, and the first voltage is 0 V; the second voltage signal terminal V2 may be a first power terminal Hvdd, and the second voltage is HVDD; and the third voltage signal terminal V3 may be a second power terminal Lvdd, and the third voltage is LVDD. In the phase $t_1$, the value of the basic capacitance generated in the touch structure 11 in the display panel 10 is |LVDD|.

The content here is merely an illustrative description of some possible implementations in the present disclosure. The first voltage signal terminal V1, the second voltage signal terminal V2 and the third voltage signal terminal V3 may be adaptively designed depending on actual needs, and limitation is not made in the present disclosure.

In the phase $t_2$, the second touch signal terminal S2 transmits a second touch detection signal to the connected analog front-end circuit AFE based on the capacitance change of the touch structure 11 in the display panel 10. For example, as shown in FIG. 14, the phase $t_2$ includes a first driving phase $t_{21}$ and a second driving phase $t_{22}$.

Figure 16:
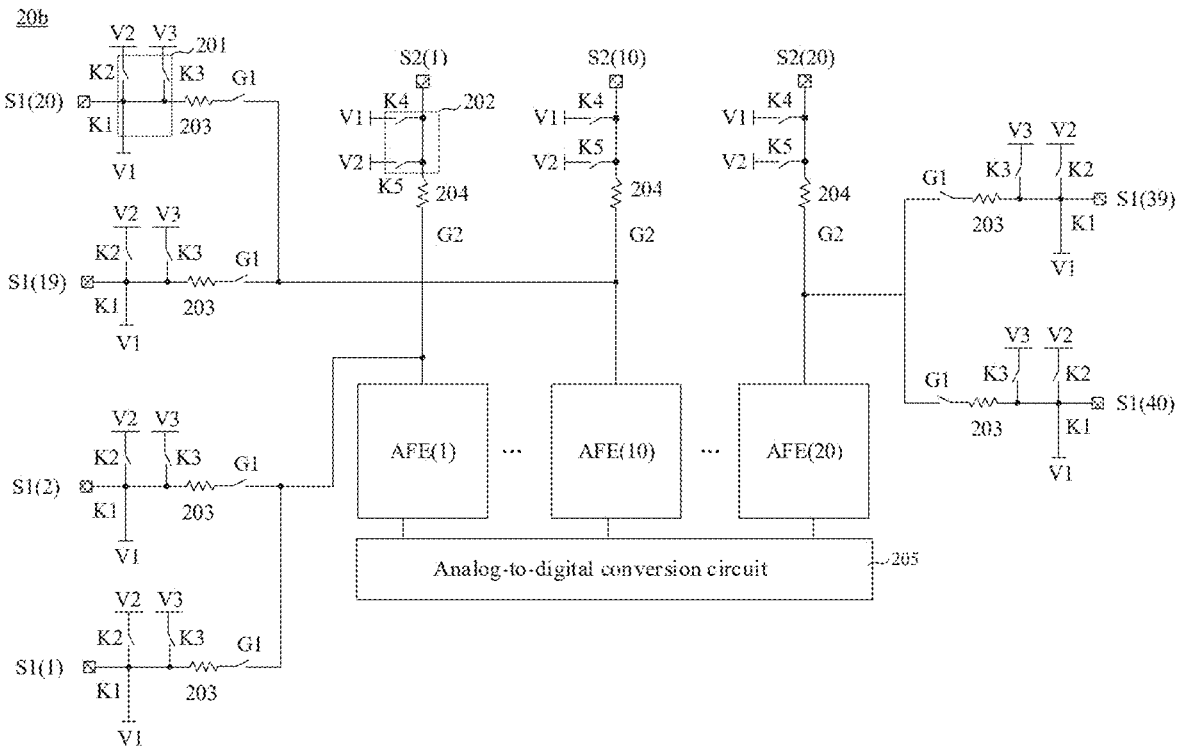
FIG. 16 is another equivalent circuit diagram of a touch driving circuit in a mutual capacitance detection phase, in accordance with some embodiments.

As shown in FIGS. 14 and 16, in the first driving phase $t_{21}$, in the first output circuit 201, the second switch K2 and the third switch K3 are turned off, the first switch K1 is turned on, and the first voltage provided by the first voltage signal terminal V1 is transmitted to the corresponding first touch signal terminal S1 through the first switch K1, so that the voltage at the first touch signal terminal S1 jumps from the third voltage to the first voltage. The first control switch G1 is turned off, and the first touch signal terminal S1 is disconnected from the corresponding analog front-end circuit AFE.

As shown in FIGS. 14 and 16, in the first driving phase $t_{21}$, in the second output circuit 202, the fourth switch K4 and the fifth switch K5 are turned off, and the second output circuit 202 does not transmit a voltage signal to the second touch signal terminal S2. The second control switch G2 is turned on, and the second touch signal terminal S2 is conductive to the corresponding analog front-end circuit AFE to transmit a charge signal of the second touch electrode 11$c$ received by the second touch signal terminal S2 to the corresponding analog front-end circuit AFE.

Correspondingly, in the first driving phase $t_{21}$, a voltage of each first touch electrode 11$a$ in the first touch channel 111 in the display panel 10 jumps from the third voltage to the first voltage. When the voltage of the first touch electrode 11$a$ jumps, the voltage of the second touch electrode 11$c$ also jumps accordingly. In the process, an electrical signal corresponding to a voltage value of each second touch electrode 11$c$ in the second touch channel 112 is transmitted to the corresponding analog front-end circuit AFE through the second touch signal terminal S2, so as to determine the touch position based on the second touch detection signal. The second touch detection signal includes an electrical signal corresponding to a voltage value of the second touch electrode 11$c$.

For example, as shown in FIG. 14, in the first driving phase $t_{21}$, the voltage at the first touch signal terminal S1 jumps from LVDD to 0, and accordingly, the voltage of the first touch electrode 11$a$ in the display panel 10 jumps from LVDD to 0. The second output circuit 202 does not transmit a voltage signal to the second touch signal terminal S2, and thus the second touch signal terminal S2 does not transmit a voltage signal to the connected second touch channel 112.

Based on this, in the first driving phase $t_{21}$, when there is no touch operation, the voltage of the second touch electrode 11$c$ jumps from 0 to −LVDD, and the value of the basic capacitance generated in the touch structure 11 in the display panel 10 remains at |LVDD|. When a touch operation is performed, during touching the display panel 10, the value of the mutual capacitance generated by the touch structure 11 at the touch position will change, and the voltage of the second touch electrode 11$c$ corresponding to the touch position will deviate from −LVDD.

The second touch channels 112 in the display panel 10 transmit electrical signals corresponding to voltage values of all the second touch electrodes 11$c$ to the corresponding analog front-end circuits AFE, thereby determining the touch position based on the detected voltage values of all the second touch electrodes 11$c$ in the display panel 10.

Figure 17:
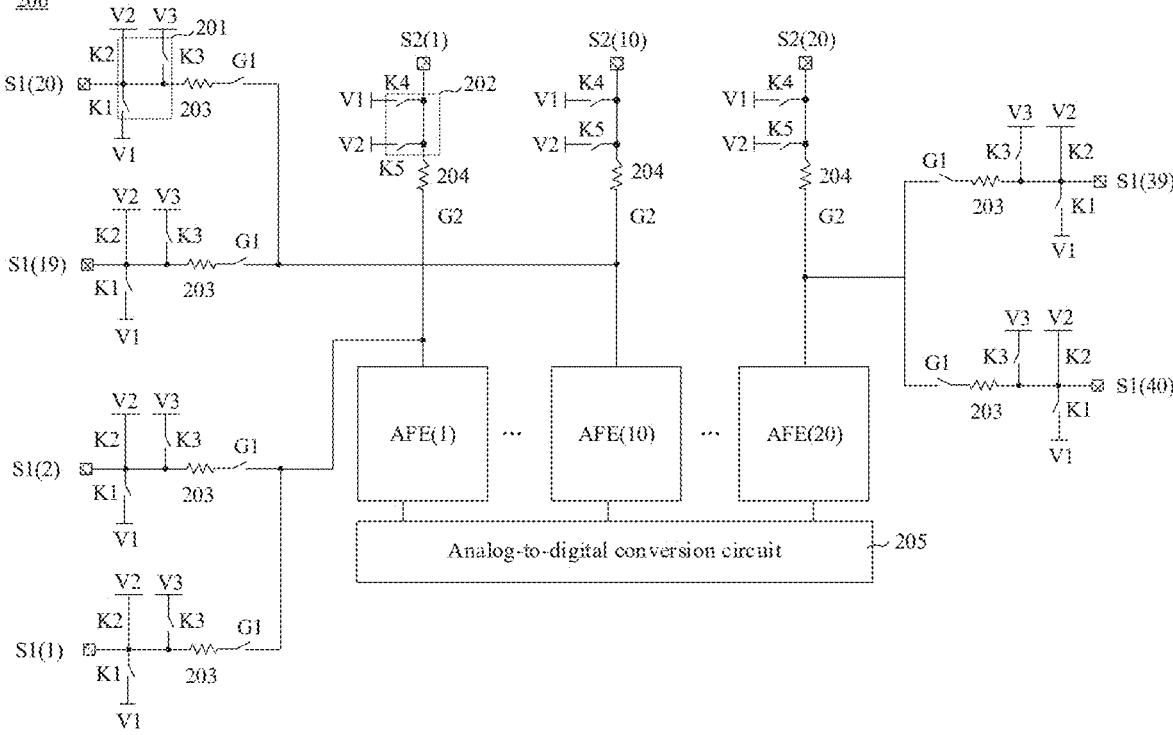
FIG. 17 is another equivalent circuit diagram of a touch driving circuit in a mutual capacitance detection phase, in accordance with some embodiments.

As shown in FIGS. 14 and 17, in the second driving phase $t_{22}$, in the first output circuit 201, the first switch K1 and the third switch K3 are turned off, the second switch K2 is turned on, and the second voltage provided by the second voltage signal terminal V2 is transmitted to the corresponding first touch signal terminal S1 through the second switch K2, so that the voltage at the first touch signal terminal S1 jumps from the first voltage to the second voltage. The first control switch G1 is turned off, and the first touch signal terminal S1 is disconnected from the corresponding analog front-end circuit AFE.

As shown in FIGS. 14 and 17, in the second driving phase $t_{22}$, in the second output circuit 202, the fourth switch K4 and the fifth switch K5 are turned off, and the second output circuit 202 does not transmit a voltage signal to the second touch signal terminal S2. The second control switch G2 is turned on, the second touch signal terminal S2 is conductive to the corresponding analog front-end circuit AFE to transmit a charge signal of the second touch electrode 11$c$ received by the second touch signal terminal S2 to the corresponding analog front-end circuit AFE.

Correspondingly, in the second driving phase $t_{22}$, a voltage of each first touch electrode 11$a$ in the first touch channel 111 in the display panel 10 jumps from the first voltage to the second voltage. When the voltage of the first touch electrode 11$a$ jumps, the voltage of the second touch electrode 11$c$ also jumps accordingly. In the process, an electrical signal corresponding to a voltage value of each second touch electrode 11$c$ in the second touch channel 112 is transmitted to the corresponding analog front-end circuit AFE through the second touch signal terminal S2, so as to determine the touch position based on the second touch detection signal.

For example, as shown in FIG. 14, in the second driving phase $t_{22}$, the voltage at the first touch signal terminal S1 jumps from 0 to HVDD, and accordingly, the voltage of the first touch electrode 11$a$ in the display panel 10 jumps from 0 to HVDD. The second output circuit 202 does not transmit a voltage signal to the second touch signal terminal S2, and thus the second touch signal terminal S2 does not transmit a voltage signal to the connected second touch channel 112. Based on this, when there is no touch operation, the voltage of the second touch electrode 11$c$ jumps from −LVDD to (−LVDD+HVDD), and the value of the basic capacitance generated in the touch structure 11 in the display panel 10 remains at |LVDD|.

Based on this, in the second driving phase $t_{22}$, when there is no touch operation, the voltage of the second touch electrode 11$c$ jumps from −LVDD to (−LVDD+HVDD), and the value of the basic capacitance generated in the touch structure 11 in the display panel 10 remains at |LVDD|. When a touch operation is performed, during touching the display panel 10, the value of the mutual capacitance generated by the touch structure 11 at the touch position will change, and the voltage of the second touch electrode 11$c$ corresponding to the touch position will deviate from (−LVDD+HVDD).

The second touch channels 112 in the display panel 10 transmit electrical signals corresponding to voltage values of all the second touch electrodes 11$c$ to the corresponding analog front-end circuits AFE, thereby determining the touch position based on the detected voltage values of all the second touch electrodes 11$c$ in the display panel 10.

In the phase $t_3$, the first output circuit 201 resets a potential at the first touch signal terminal S1, and the second output circuit 202 resets a potential at the second touch signal terminal S2.

Figure 18:
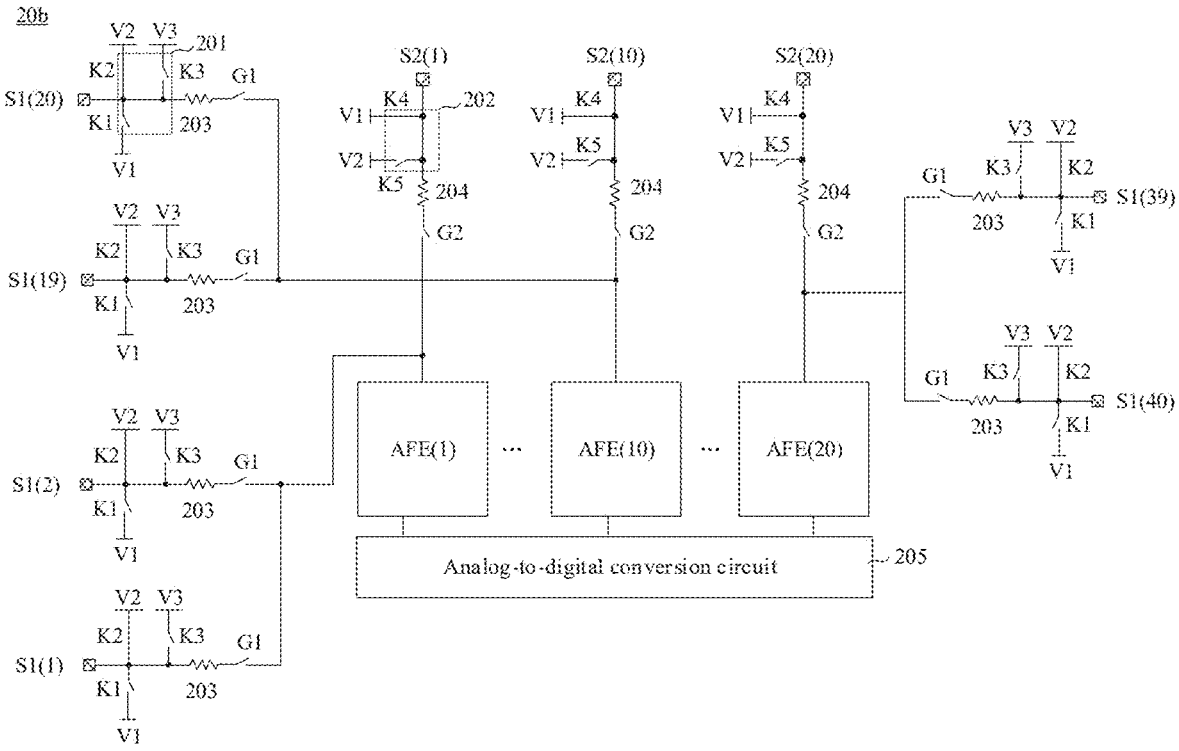
FIG. 18 is another equivalent circuit diagram of a touch driving circuit in a mutual capacitance detection phase, in accordance with some embodiments.

For example, as shown in FIGS. 14 and 18, in the $t_3$ phase, in the first output circuit 201, the first switch K1 and the third switch K3 are turned off, the second switch K2 is turned on, and the second voltage provided by the second voltage signal terminal V2 is transmitted to the corresponding first touch signal terminal S1 through the second switch K2, so that the voltage at the first touch signal terminal S1 is stably maintained at the second voltage. The first control switch G1 is turned off, and the first touch signal terminal S1 is disconnected from the corresponding analog front-end circuit AFE.

As shown in FIGS. 14 and 18, in the $t_3$ phase and in the second output circuit 202, the fifth switch K5 is turned off, the fourth switch K4 is turned on, and the first voltage provided by the first voltage signal terminal V1 is transmitted to the corresponding second touch signal terminal S2 through the fourth switch K4, so that the voltage at the second touch signal terminal S2 is stabilized at the first voltage. The second control switch G2 is turned off, and the second touch signal terminal S2 is disconnected from the corresponding analog front-end circuit AFE.

The first voltage may be a ground voltage. In the phase $t_3$, the voltage at the second touch signal terminal S2 is stabilized at the first voltage to reset the second touch signal terminal S2. In this case, the voltage on the corresponding second touch channel 112 of the touch structure 11 in the display panel 10 is reset to 0 V.

Correspondingly, in the phase $t_3$, in the display panel 10, a voltage of each first touch electrode 11$a$ in the first touch channel 111 connected to the first touch signal terminal S1 is stably maintained at the second voltage. A voltage of each second touch electrode 11$c$ in the second touch channel 112 connected to the second touch signal terminal S2 is stably maintained at the first voltage. The value of the basic capacitance (mutual capacitance) generated in the touch structure 11 (between the first touch electrodes 11$a$ and the second touch electrodes 11$c$ that are adjacent) in the display panel 10 is an absolute value of a difference between the first voltage and the second voltage.

In the phase $t_4$, the second touch signal terminal S2 transmits a second touch detection signal to the connected analog front-end circuit AFE based on the capacitance change of the touch structure 11 in the display panel 10.

For example, as shown in FIG. 14, the phase $t_4$ includes a third driving phase $t_{41}$ and a fourth driving phase $t_{42}$.

Figure 19:
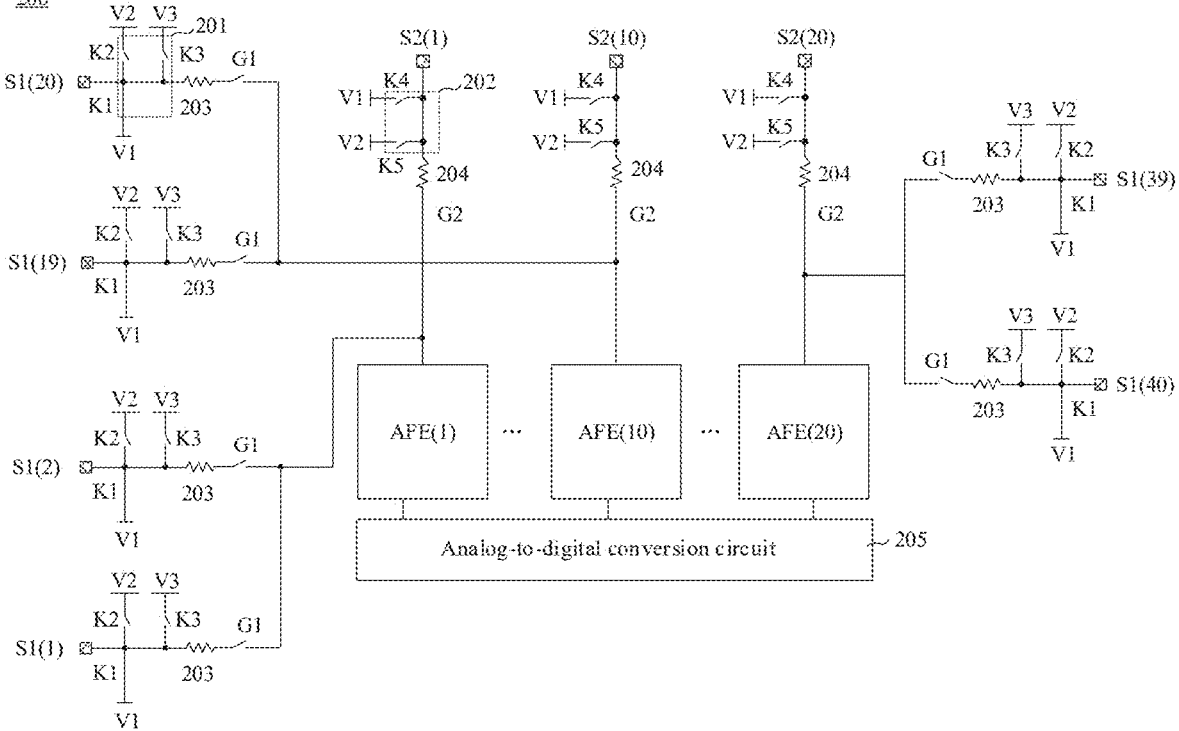
FIG. 19 is another equivalent circuit diagram of a touch driving circuit in a mutual capacitance detection phase, in accordance with some embodiments.

As shown in FIGS. 14 and 19, in the third driving phase $t_{41}$, in the first output circuit 201, the second switch K2 and the third switch K3 are turned off, the first switch K1 is turned on, and the first voltage provided by the first voltage signal terminal V1 is transmitted to the corresponding first touch signal terminal S1 through the first switch K1, so that the voltage at the first touch signal terminal S1 jumps from the second voltage to the first voltage. The first control switch G1 is turned off, and the first touch signal terminal S1 is disconnected from the corresponding analog front-end circuit AFE.

As shown in FIGS. 14 and 19, in the third driving phase $t_{41}$, in the second output circuit 202, the fourth switch K4 and the fifth switch K5 are turned off, and the second output circuit 202 does not transmit a voltage signal to the second touch signal terminal S2. The second control switch G2 is turned on, and the second touch signal terminal S2 is conductive to the corresponding analog front-end circuit AFE to transmit a charge signal of the second touch electrode 11$c$ received by the second touch signal terminal S2 to the corresponding analog front-end circuit AFE.

Correspondingly, in the third driving phase $t_{41}$, a voltage of each first touch electrode 11$a$ in the first touch channel 111 in the display panel 10 jumps from the second voltage to the first voltage. When the voltage of the first touch electrode 11$a$ jumps, the voltage of the second touch electrode 11$c$ also jumps accordingly. In the process, an electrical signal corresponding to a voltage value of each second touch electrode 11$c$ in the second touch channel 112 is transmitted to the corresponding analog front-end circuit AFE through the second touch signal terminal S2, so as to determine the touch position based on the second touch detection signal.

For example, as shown in FIG. 14, in the third driving phase $t_{41}$, the voltage at the first touch signal terminal S1 jumps from HVDD to 0, and accordingly, the voltage of the first touch electrode 11$a$ in the display panel 10 jumps from HVDD to 0. The second output circuit 202 does not transmit a voltage signal to the second touch signal terminal S2, and thus the second touch signal terminal S2 does not transmit a voltage signal to the connected second touch channel 112.

Based on this, in the third driving phase $t_{41}$, when there is no touch operation, the voltage of the second touch electrode 11$c$ jumps from 0 to −HVDD, and the value of the basic capacitance generated in the touch structure 11 in the display panel 10 remains at [HVDD]. When a touch operation is performed, during touching the display panel 10, the value of the mutual capacitance generated by the touch structure 11 at the touch position will change, and the voltage of the second touch electrode 11$c$ corresponding to the touch position will deviate from −HVDD.

The second touch channels 112 in the display panel 10 transmit electrical signals corresponding to voltage values of all the second touch electrodes 11$c$ to the corresponding analog front-end circuits AFE, thereby determining the touch position based on the detected voltage values of all the second touch electrodes 11$c$ in the display panel 10.

Figure 20:
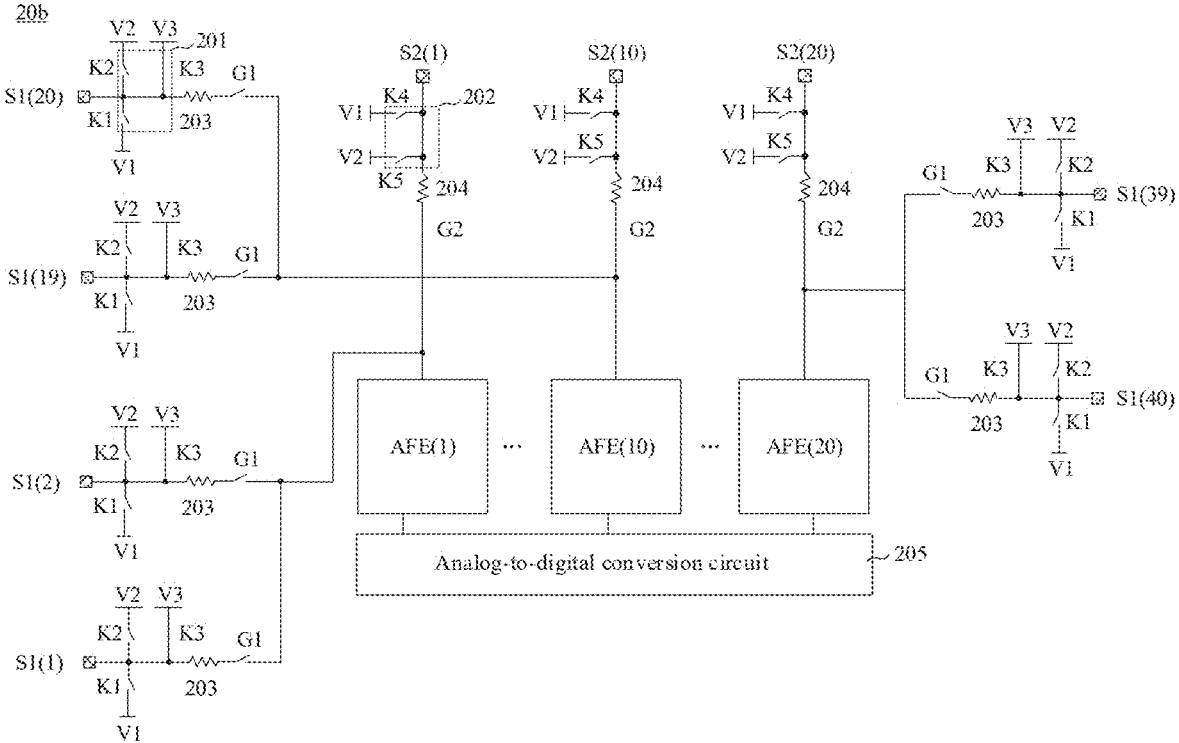
FIG. 20 is another equivalent circuit diagram of a touch driving circuit in a mutual capacitance detection phase, in accordance with some embodiments.
Figure 21:
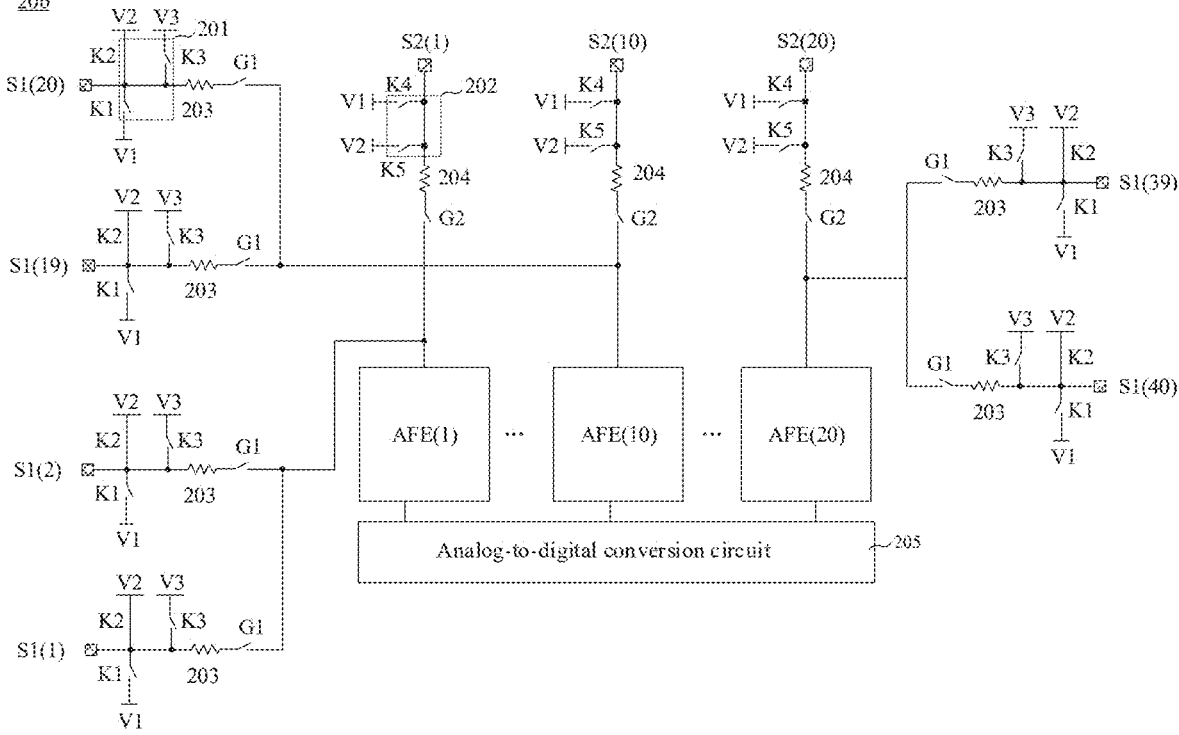
FIG. 21 is another equivalent circuit diagram of a touch driving circuit in a mutual capacitance detection phase, in accordance with some embodiments.
Figure 22:
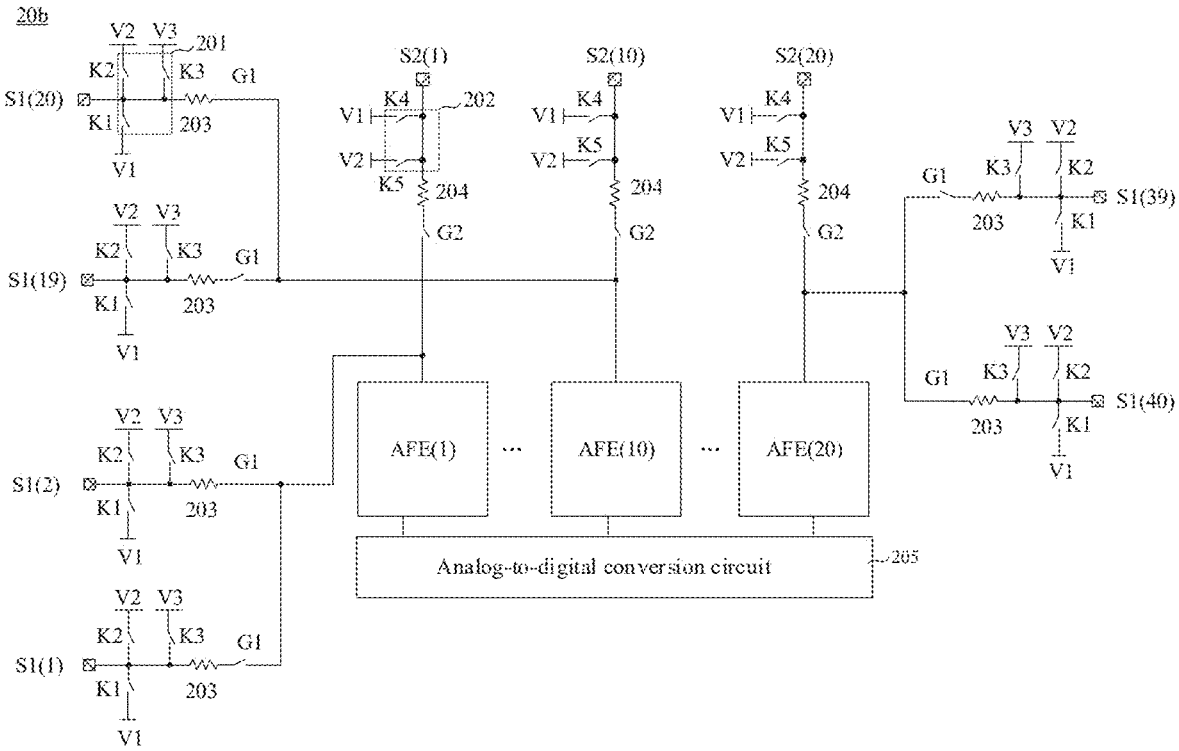
FIG. 22 is another equivalent circuit diagram of a touch driving circuit in a mutual capacitance detection phase, in accordance with some embodiments.
Figure 23:
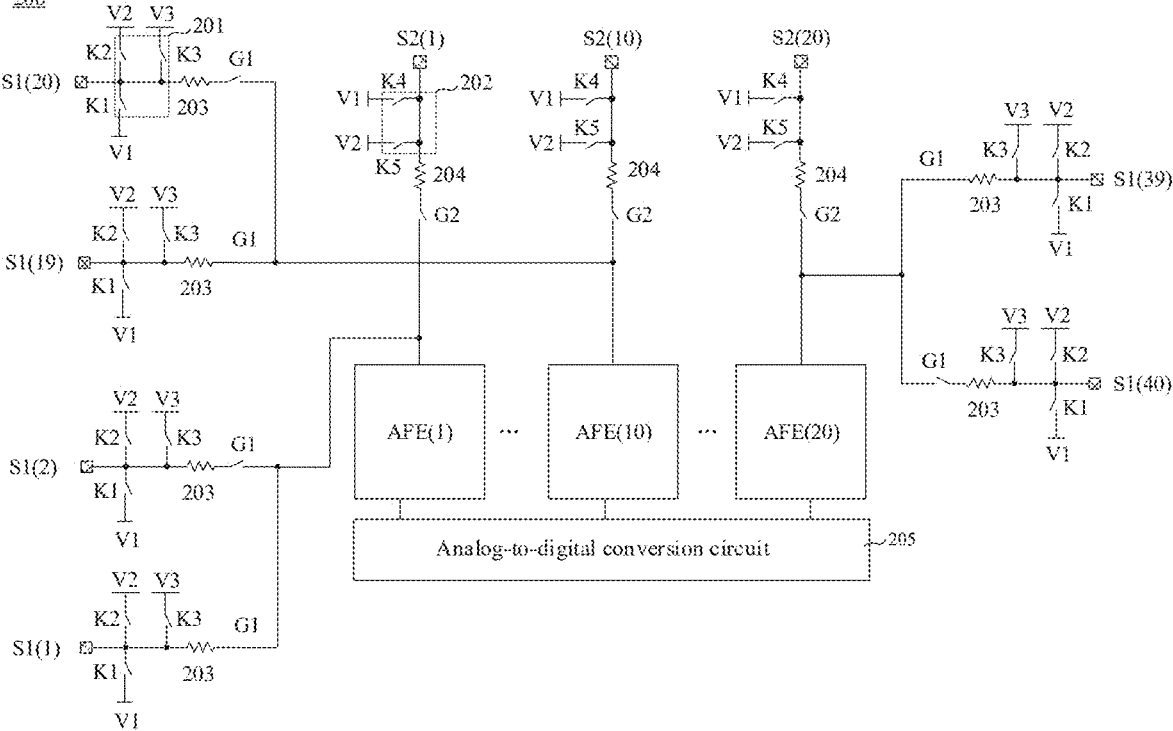
FIG. 23 is another equivalent circuit diagram of a touch driving circuit in a mutual capacitance detection phase, in accordance with some embodiments.
Figure 24:
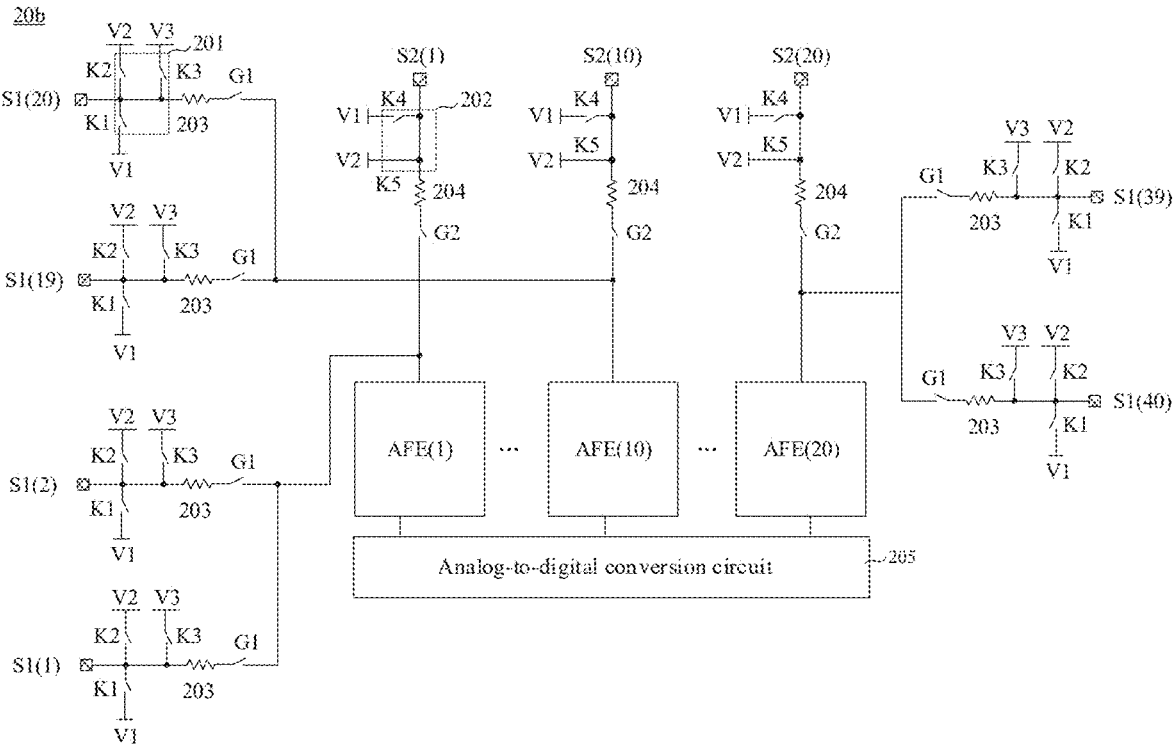
FIG. 24 is an equivalent circuit diagram of a touch driving circuit in a self-capacitance detection phase, in accordance with some embodiments.
Figure 25:
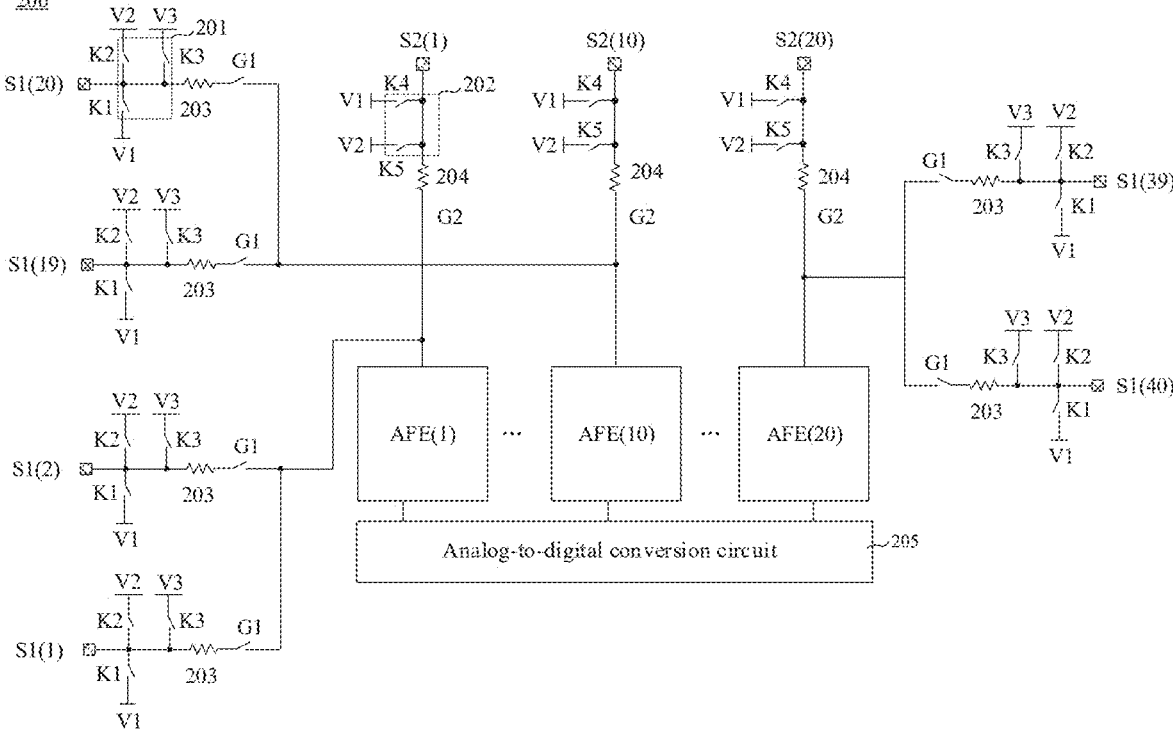
FIG. 25 is another equivalent circuit diagram of a touch driving circuit in a self-capacitance detection phase, in accordance with some embodiments.
Figure 26:
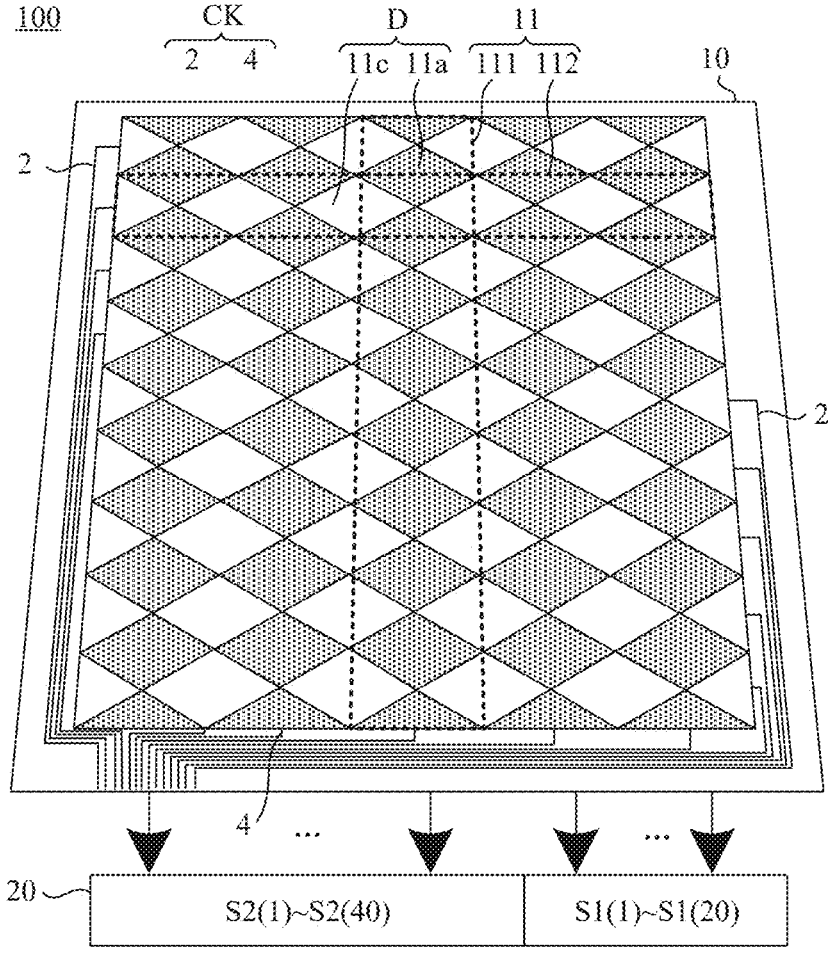
FIG. 26 is a plan structural diagram of a display device, in accordance with some embodiments.
Figure 27:
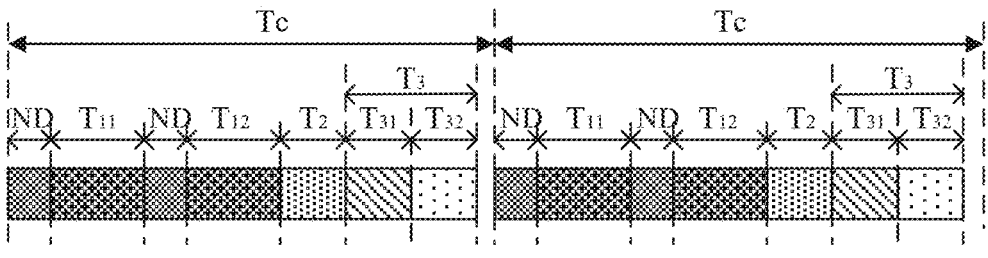
FIG. 27 is a driving timing diagram of a touch driving circuit, in accordance with some embodiments.
Figure 28:
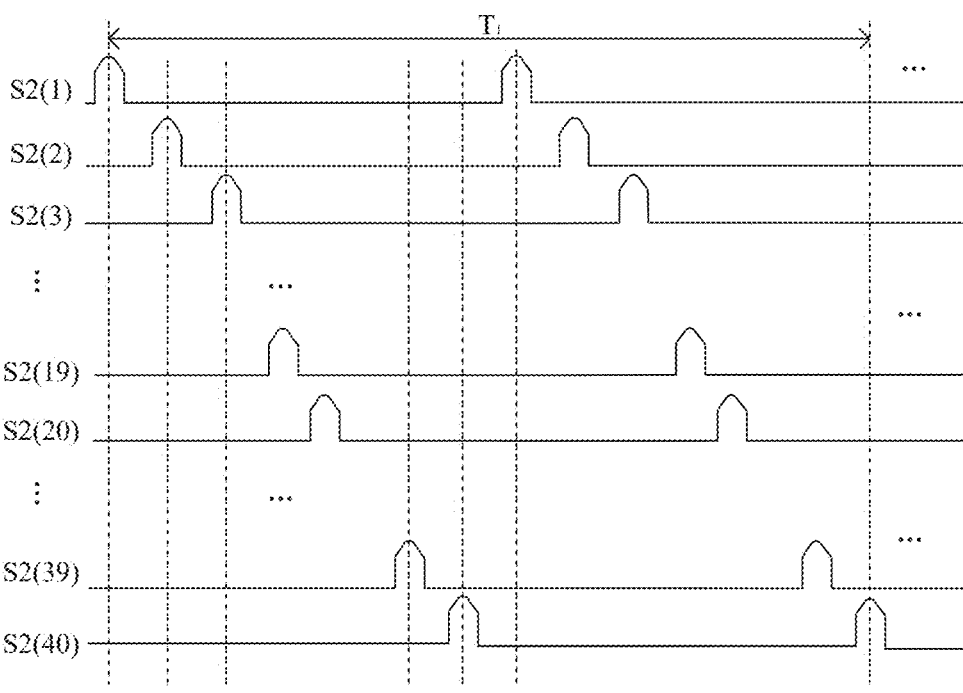
FIG. 28 is a timing diagram of a first touch signal terminal of a touch driving circuit, in accordance with some embodiments.
Figure 29:
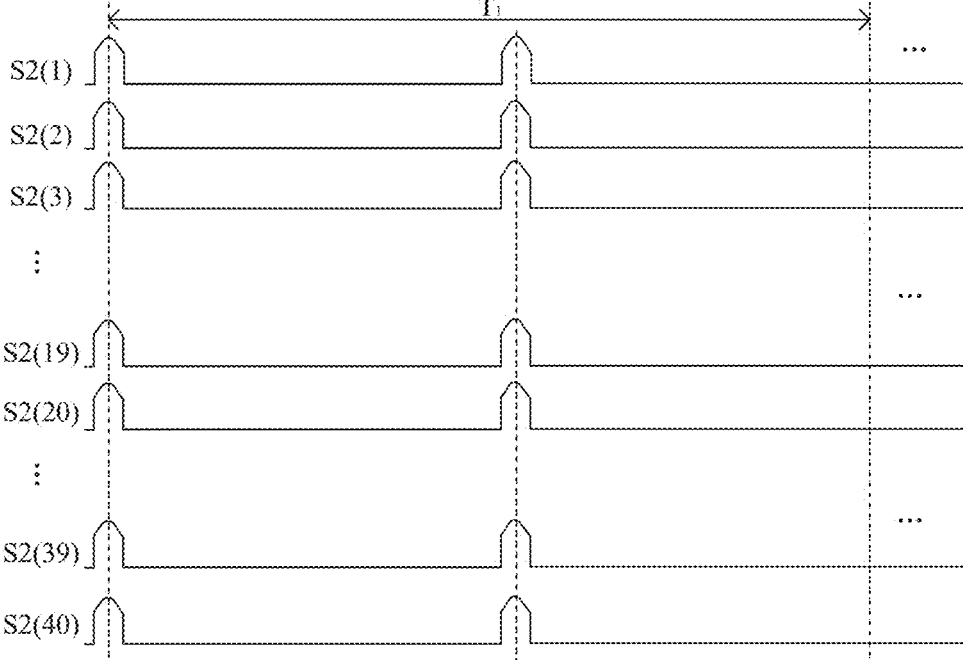
FIG. 29 is a timing diagram of a first touch signal terminal of another touch driving circuit, in accordance with some embodiments.

As shown in FIGS. 14 and 20, in the fourth driving phase $t_{42}$, in the first output circuit 201, the first switch K1 and the second switch K2 are turned off, the third switch K3 is turned on, and the third voltage provided by the third voltage signal terminal V3 is transmitted to the corresponding first touch signal terminal S1 through the third switch K3, so that the voltage at the first touch signal terminal S1 jumps from the first voltage to the third voltage. The first control switch G1 is turned off, and the first touch signal terminal S1 is disconnected from the corresponding analog front-end circuit AFE.

As shown in FIGS. 14 and 20, in the fourth driving phase $t_{42}$, in the second output circuit 202, the fourth switch K4 and the fifth switch K5 are turned off, and the second output circuit 202 does not transmit a voltage signal to the second touch signal terminal S2. The second control switch G2 is turned on, the second touch signal terminal S2 is conductive to the corresponding analog front-end circuit AFE to transmit a charge signal of the second touch electrode 11$c$ received by the second touch signal terminal S2 to the corresponding analog front-end circuit AFE.

Correspondingly, in the fourth driving phase $t_{42}$, a voltage of each first touch electrode 11$a$ in the first touch channel 111 in the display panel 10 jumps from the first voltage to the third voltage. When the voltage of the first touch electrode 11$a$ jumps, the voltage of the second touch electrode 11$c$ also jumps accordingly. In the process, an electrical signal corresponding to a voltage value of each second touch electrode 11$c$ in the second touch channel 112 is transmitted to the corresponding analog front-end circuit AFE through the second touch signal terminal S2, so as to determine the touch position based on the second touch detection signal.

For example, as shown in FIG. 14, in the fourth driving phase $t_{42}$, the voltage at the first touch signal terminal S1 jumps from 0 to LVDD, and accordingly, the voltage of the first touch electrode 11$a$ in the display panel 10 jumps from 0 to LVDD. The second output circuit 202 does not transmit a voltage signal to the second touch signal terminal S2, and thus the second touch signal terminal S2 does not transmit a voltage signal to the connected second touch channel 112. Based on this, when there is no touch operation, the voltage of the second touch electrode 11$c$ jumps from −HVDD to (−HVDD+LVDD), and the value of the basic capacitance generated in the touch structure 11 in the display panel 10 remains at |HVDD|.

Based on this, in the fourth driving phase $t_{42}$, when there is no touch operation, the voltage of the second touch electrode 11$c$ jumps from −HVDD to (−HVDD+LVDD), and the value of the basic capacitance generated in the touch structure 11 in the display panel 10 remains at |HVDD|. When a touch operation is performed, during touching the display panel 10, the value of the mutual capacitance generated by the touch structure 11 at the touch position will change, and the voltage of the second touch electrode 11$c$ corresponding to the touch position will deviate from (−HVDD+LVDD).

The second touch channels 112 in the display panel 10 transmit electrical signals corresponding to voltage values of all the second touch electrodes 11$c$ to the corresponding analog front-end circuits AFE, thereby determining the touch position based on the detected voltage values of all the second touch electrodes $11c$ in the display panel $10$.

In the mutual capacitance detection phase $T_1$, the above driving phases $t_1$ to $t_4$ are repeated to detect the touch position in the display panel $10$.

In some embodiments, as shown in FIG. $11$, the touch detection cycle Tc further includes self-capacitance detection phases (e.g., $T_2$ and $T_3$ shown in FIG. $11$). The driving method for the touch driving circuit $20b$ further includes a first self-capacitance detection phase $T_2$, and the first self-capacitance detection phase $T_2$ includes the following driving processes Q2 and Q3.

In Q2, as shown in FIGS. $21$, $22$ and $23$, in the first self-capacitance detection phase $T_2$, the first output circuit $201$ applies a first driving signal to the first touch signal terminal S1; and at least two first touch signal terminals S1 connected to the same analog front-end circuit AFE transmit first touch detection signals to the corresponding analog front-end circuit AFE in a time-sharing mode based on the capacitance change of the touch structure $11$ in the display panel $10$.

For example, in the first self-capacitance detection phase $T_2$, as shown in FIG. $21$, the second switch K2 is turned on to transmit the second voltage provided by the second voltage signal terminal V2 to the first touch signal terminal S1. Correspondingly, a voltage of each first touch electrode $11a$ in the display panel $10$ is the second voltage (e.g., HVDD), a basic capacitance is generated between the first touch electrode $11a$ and the ground, and the same basic capacitance (self-capacitance) is generated at each position in the touch structure $11$. When a finger touches the display panel $10$, the capacitance of the touch structure $11$ at the touch position of the finger will change. Each first touch electrode $11a$ in the display panel $10$ transmits a first touch detection signal to a corresponding analog front-end circuit AFE. The change in capacitance generated between the first touch electrode $11a$ and the ground may be obtained based on the first touch detection signal.

Next, as shown in FIGS. $22$ and $23$, a first control switch G1 is turned on, and the first touch electrode $11a$ transmits a first touch detection signal to the corresponding analog front-end circuit AFE through the first control switch G1, thereby determining the touch position based on the first touch detection signal.

As shown in FIGS. $11$, $22$ and $23$, multiple (two or more) first control switches G1 connected to the same analog front-end circuit AFE are turned on in a time-sharing mode, and multiple first touch signal terminals S1 connected to the same analog front-end circuit AFE transmit first touch detection signals to the analog front-end circuit AFE in a time-sharing mode.

For example, as shown in FIG. $11$, the first self-capacitance detection phase $T_2$ includes a first phase $T_{21}$ and a second phase $T_{22}$. As shown in FIG. $22$, in the first phase $T_{21}$, a first control switch G1 between an odd-numbered first touch signal terminal S1 and the corresponding analog front-end circuit AFE is turned on, and the odd-numbered first touch signal terminal S1 transmits a first touch detection signal to the corresponding analog front-end circuit AFE through the turned-on first control switch G1. As shown in FIG. $23$, in the second phase $T_{22}$, a first control switch G1 between an even-numbered first touch signal terminal S1 and the corresponding analog front-end circuit AFE is turned on, and the even-numbered first touch signal terminal S1 transmits a first touch detection signal to the corresponding analog front-end circuit AFE through the turned-on first control switch G1.

In Q3, as shown in FIGS. $24$ and $25$, in the second self-capacitance detection phase $T_3$, the second output circuit $202$ applies a second driving signal to the second touch signal terminal S2; and the second touch signal terminal S2 transmits a second touch detection signal to the connected analog front-end circuit AFE based on the capacitance change of the touch structure $11$ in the display panel $10$.

For example, in the second self-capacitance detection phase $T_3$, as shown in FIG. $24$, the fifth switch K5 is turned on to transmit the second voltage provided by the second voltage signal terminal V2 to the second touch signal terminal S2. Correspondingly, a voltage of each second touch electrode $11c$ in the display panel $10$ is the second voltage (e.g., HVDD), a basic capacitance is generated between the second touch electrodes $11c$ and the ground, and the same basic capacitance (self-capacitance) is generated at each position in the touch structure $11$. When a finger touches the display panel $10$, the capacitance of the touch structure $11$ at the touch position of the finger will change. Each second touch electrodes $11c$ in the display panel $10$ transmits a second touch detection signal to a corresponding analog front-end circuit AFE. The change in capacitance generated between the second touch electrodes $11c$ and the ground may be obtained based on the second touch detection signal.

Next, as shown in FIG. $25$, the second control switch G2 is turned on, and the second touch electrode $11c$ transmits a second touch detection signal to the corresponding analog front-end circuit AFE through the second control switch G2, thereby determining the touch position based on the second touch detection signal.

For example, in a case where the touch detection cycle Tc includes the mutual capacitance detection phase $T_1$ and the self-capacitance detection phase, an order of the mutual capacitance detection phase and the self-capacitance detection phase is not limited and may be designed accordingly as required, which is not limited in the present disclosure.

FIG. $26$ is a plan structural diagram of a display device in accordance with some embodiments. To facilitate clear description of some embodiments of the present disclosure, FIG. $26$ only shows the touch structure $11$ and part of touch leads CK, and the display device $100$ further includes other structures.

FIG. $27$ is a touch driving timing diagram in accordance with some embodiments. The duration of each phase in the figure is only for schematic illustration but is not intended to limit the driving duration of each phase in the actual driving process.

In some embodiments, as shown in FIGS. $26$ and $27$, for example, the first touch electrode $11a$ is a touch transmitting electrode, and the second touch electrode $11c$ is a touch sensing electrode.

In the self-capacitance detection phase ($T_2$ or $T_3$), only the first touch electrode $11a$ or the second touch electrode $11c$ is connected to the touch driving signal (the first driving signal or the second driving signal), and transmits a sensing signal (the first touch detection signal or the second touch detection signal) to the corresponding touch driving circuit based on the capacitance change of the touch structure $11$. In this case, only the first touch electrode $11a$ or the second touch electrode $11c$ in the touch structure $11$ participates in the touch driving process. Therefore, the duration of a single self-capacitance detection phase ($T_2$ or $T_3$) is relatively short, and the touch response speed is relatively fast.

In the mutual capacitance detection phase $T_1$, the first touch electrode $11a$ receives the first driving signal, and the second touch electrode $11c$ transmits a second touch detection signal to the corresponding second touch signal terminal S2 based on the capacitance change in the touch structure $11$. In this case, all the touch electrodes D in the touch structure $11$ participate in the touch driving process. Therefore, the duration of the mutual capacitance detection phase $T_1$ is longer than that of a single self-capacitance detection phase. However, the touch position detection through mutual capacitance driving has rather high accuracy, and multi-point touch control of the display device $100$ may be achieved.

In a case where the numbers of the first touch signal terminals S1 and the second touch signal terminals S2 are the same, if the touch detection cycle Tc includes the mutual capacitance detection phase $T_1$ and the self-capacitance detection phase, within the touch detection cycle Tc, while the touch position is detected by mutual capacitance driving, the touch position is also detected by self-capacitance driving. Therefore, the detection of the control position has rather high accuracy. Alternatively, in a case where the touch detection cycle Tc may include only the mutual capacitance detection phase $T_1$, since the self-capacitance detection phase is not required, the duration of the touch detection cycle Tc is rather short, the reporting rate of the display panel $10$ is high, and the response rate of the display panel $10$ to the touch operation is rather high.

In some cases, for example, in a case where there are water drops at some positions of the display device $100$ (e.g., in a region corresponding to the touch electrode D), capacitance will also be generated between the water drop and the touch electrode D (the first touch electrode $11a$ and/or second touch electrode $11c$). Therefore, the capacitance at some positions of the touch structure $11$ will deviate from the basic capacitance, thereby reducing the accuracy of touch position detection.

Alternatively, in a case where the display device $100$ is touched by a finger wearing gloves, due to the presence of the gloves, the capacitance change of the touch structure $11$ at the touch position when the display device $100$ is touched will decrease compared with the capacitance change of the touch structure $11$ when the display device $100$ is directly touched by the finger. In this way, the touch operation cannot be recognized, thereby affecting the accuracy of the touch position detection.

The touch detection cycle Tc includes the mutual capacitance detection phase $T_1$ and the self-capacitance detection phase. The touch position is detected and identified by two touch detection methods, so that an influence of external factors (e.g., the aforementioned water drops and gloves) on the touch detection accuracy may be reduced and the accuracy of the touch position detection may be improved.

Such a design may avoid the influence of water and gloves on touch detection, and the display device $100$ also has waterproof touch and glove touch functions.

The order of the first self-capacitance detection phase $T_2$ and the second self-capacitance detection phase $T_3$ may be adaptively designed as required, which is not limited in the present disclosure.

In the driving method for the touch driving circuit $20b$ provided by some embodiments of the present disclosure, the touch detection cycle Tc may include only the mutual capacitance detection phase $T_1$; alternatively, as shown in FIG. $11$, the touch detection cycle Tc may include the mutual capacitance detection phase $T_1$ and the self-capacitance detection phase. The adaptive design may be made specifically as required, and limitation is not made in the present disclosure.

Some embodiments of the present disclosure further provided another driving method for a touch driving circuit. The driving method for the touch driving circuit may be applied to the touch driving circuit $20b$ provided in any of the aforementioned embodiments. In a case where the first touch signal terminal S1 in the touch driving circuit $20b$ is a touch sensing signal terminal and the second touch signal terminal S2 in the touch driving circuit $20b$ is a touch transmitting signal terminal, in the display panel $10$, the first touch electrode $11a$ is a touch sensing electrode Rx and the second touch electrode $11c$ is a touch driving electrode Tx.

As shown in FIGS. $26$ and $27$, when the touch driving circuit $20b$ performs touch driving on the display panel $10$, within the touch detection cycle Tc, the touch driving circuit $20b$ applies a first driving signal to the corresponding touch driving electrode (i.e., the second touch electrode $11c$) through the touch transmitting signal terminal, and detects the touch position based on the capacitance change of the touch structure $11$ in the display panel $10$.

For example, as shown in FIG. $27$, the touch detection cycle Tc includes a mutual capacitance detection phase $T_1$. The driving method of the touch driving circuit $20b$ includes the mutual capacitance detection phase $T_1$, and the mutual capacitance detection phase $T_1$ includes the following driving process.

In S01, as shown in FIGS. $26$, $28$, $29$ and $30$, in the mutual capacitance detection phase $T_1$, the second output circuit $202$ applies a second driving signal to the second touch signal terminal S2, and at least two first touch signal terminals S1 connected to the same analog front-end circuit AFE transmit first touch detection signals to the respective connected analog front-end circuits AFE in a time-sharing mode based on the capacitance change of the touch structure $11$ in the display panel $10$.

For example, as shown in FIG. $28$, in the mutual capacitance detection phase $T_1$, a plurality of second output circuits $202$ may apply second driving signals to the corresponding second touch signal terminals S2 sequentially; alternatively, as shown in FIG. $29$, in the mutual capacitance detection phase $T_1$, the plurality of second output circuits $202$ apply the second driving signals to the corresponding second touch signal terminals S2 simultaneously.

Based on this, no matter the plurality of second output circuits $202$ apply the second driving signals to the corresponding second touch signal terminals S2 sequentially or simultaneously, the duration of the mutual capacitance detection phase $T_1$ may be the same. The adaptive design may be made specifically as actual required. The content here is merely an illustrative description of some possible implementations and is not intended to limit the present disclosure.

For example, as shown in FIG. $27$, the mutual capacitance detection phase $T_1$ includes a first mutual capacitance detection phase $T_{11}$ and a second mutual capacitance detection phase $T_{12}$. As shown in FIG. $30$, in the first mutual capacitance detection phase $T_{11}$, a first control switch G1 between an odd-numbered first touch signal terminal S1 and the corresponding analog front-end circuit AFE is turned on, and the odd-numbered first touch signal terminal S1 transmits a first touch detection signal to the corresponding analog front-end circuit AFE through the turned-on first control switch G1. In the second mutual capacitance detection phase $T_{12}$, a first control switch G1 between an even-numbered first touch signal terminal S1 and the corresponding analog front-end circuit AFE is turned on, and the even-numbered first touch signal terminal S1 transmits a first touch detection signal to the corresponding analog front-end circuit AFE through the turned-on first control switch G1.

Figure 31:
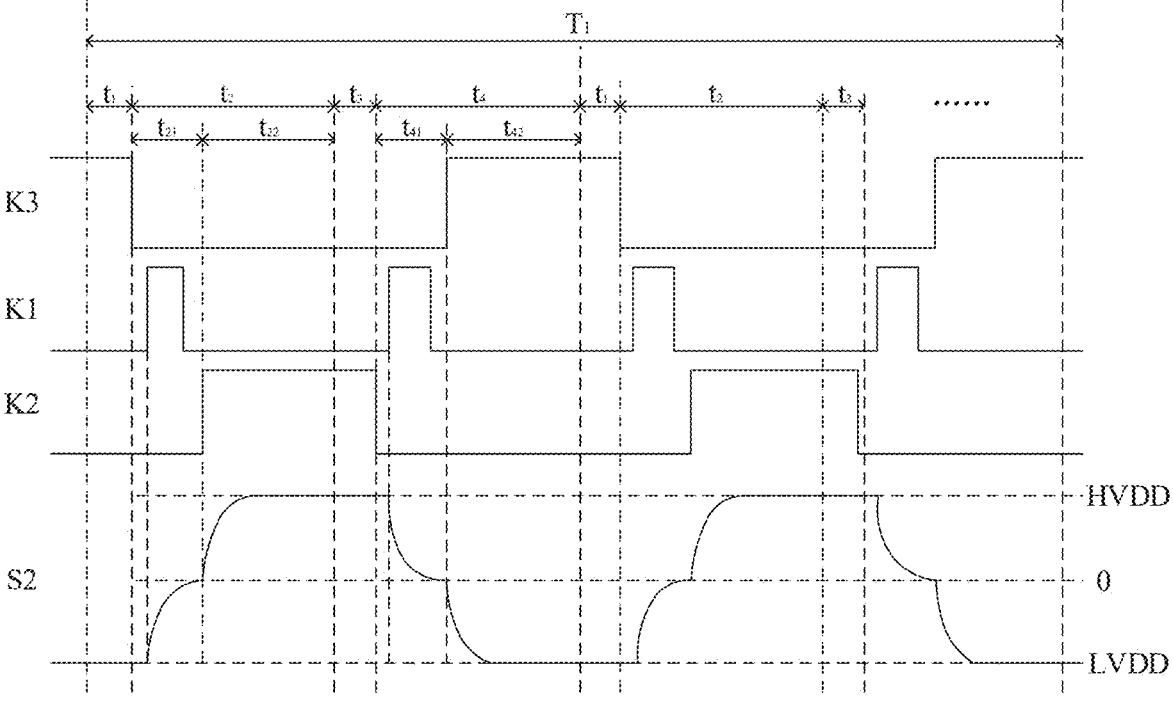
FIG. 31 is a timing diagram of a touch driving circuit, in accordance with some embodiments.

As shown in FIG. 31, the mutual capacitance detection phase $T_1$ includes the following phases $t_1$ to $t_4$.

Figure 30:
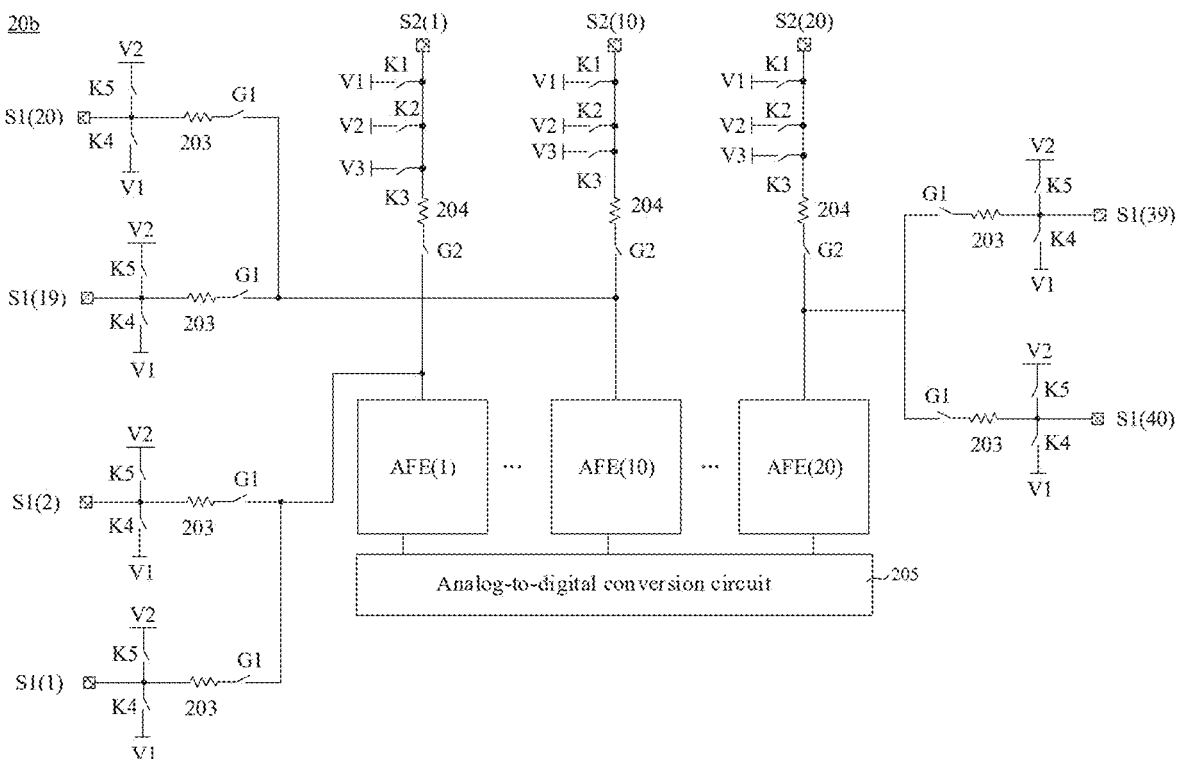
FIG. 30 is an equivalent circuit diagram of a touch driving circuit, in accordance with some embodiments.

In the phase $t_1$, as shown in FIGS. 30 and 31, the first switch K1 and the second switch K2 are turned off, the third switch K3 is turned on, and the third voltage provided by the third voltage signal terminal V3 is transmitted to the corresponding second touch signal terminal S2 through the third switch K3, so that the voltage at the second touch signal terminal S2 is stably maintained at the third voltage. The second control switch G2 is turned off, and the second touch signal terminal S2 is disconnected from the corresponding analog front-end circuit AFE.

In the phase $t_1$, as shown in FIGS. 30 and 31, the fifth switch K5 is turned off, the fourth switch K4 is turned on, and the first voltage provided by the first voltage signal terminal V1 is transmitted to the corresponding first touch signal terminal S1 through the fourth switch K4, so that the voltage at the first touch signal terminal S1 is stabilized at the first voltage. The first control switch G1 is turned off, and the first touch signal terminal S1 is disconnected from the corresponding analog front-end circuit AFE.

Correspondingly, in the phase $t_1$, in the display panel 10, a voltage of each first touch electrode 11a in the first touch channel 111 connected to the first touch signal terminal S1 is stably maintained at the first voltage. A voltage of each second touch electrode 11c in the second touch channel 112 connected to the second touch signal terminal S2 is stably maintained at the third voltage. The value of the basic capacitance (mutual capacitance) generated in the touch structure 11 (between the first touch electrodes 11a and the second touch electrodes 11c that are adjacent) in the display panel 10 is an absolute value of a difference between the first voltage and the third voltage.

In the phase $t_2$, a first touch signal terminal S1 transmits a first touch detection signal to the connected analog front-end circuit AFE based on the capacitance change of the touch structure 11 in the display panel 10. For example, as shown in FIG. 31, the phase $t_2$ includes a first driving phase $t_{21}$ and a second driving phase $t_{22}$.

In the first driving phase $t_{21}$, as shown in FIGS. 30 and 31, the second switch K2 and the third switch K3 are turned off, the first switch K1 is turned on, and the first voltage provided by the first voltage signal terminal V1 is transmitted to the corresponding second touch signal terminal S2 through the first switch K1, so that the voltage at the second touch signal terminal S2 jumps from the third voltage to the first voltage. The second control switch G2 is turned off, and the second touch signal terminal S2 is disconnected from the corresponding analog front-end circuit AFE.

In the first driving phase $t_{21}$, as shown in FIGS. 30 and 31, the fourth switch K4 and the fifth switch K5 are turned off, the first control switch G1 is turned on, and the first output circuit 201 is conductive to the corresponding analog front-end circuit AFE to transmit a charge signal of the first touch electrode 11a received by the first touch signal terminal S1 to the corresponding analog front-end circuit AFE.

Correspondingly, in the first driving phase $t_{21}$, a voltage of each second touch electrode 11c in the second touch channel 112 in the display panel 10 jumps from the third voltage to the first voltage. When the voltage at the second touch signal terminal S2 jumps, the voltage of the second touch electrode 11c also jumps accordingly. In the process, an electrical signal corresponding to a voltage value of each first touch electrode 11a in the first touch channel 111 is transmitted to the corresponding analog front-end circuit AFE through the first touch signal terminal S1, so as to determine the touch position based on the first touch detection signal. The first touch detection signal includes an electrical signal corresponding to a voltage value of the first touch electrode 11a.

In the second driving phase $t_{22}$, as shown in FIGS. 30 and 31, the first switch K1 and the third switch K3 are turned off, the second switch K2 is turned on, and the second voltage provided by the second voltage signal terminal V2 is transmitted to the corresponding second touch signal terminal S2 through the second switch K2, so that the voltage at the second touch signal terminal S2 jumps from the first voltage to the second voltage. The second control switch G2 is turned off, and the second touch signal terminal S2 is disconnected from the corresponding analog front-end circuit AFE.

In the second driving phase $t_{22}$, as shown in FIGS. 30 and 31, the fourth switch K4 and the fifth switch K5 are turned off, the first control switch G1 is turned on, and the first touch signal terminal S1 is conductive to the corresponding analog front-end circuit AFE to transmit a charge signal of the first touch electrode 11a received by the first touch signal terminal S1 to the corresponding analog front-end circuit AFE.

Correspondingly, in the second driving phase $t_{22}$, a voltage of each second touch electrode 11c in the second touch channel 112 in the display panel 10 jumps from the first voltage to the second voltage. When the voltage of the second touch electrode 11c jumps, the voltage of the first touch electrode 11a also jumps accordingly. In the process, an electrical signal corresponding to a voltage value of each first touch electrode 11a in the first touch channel 111 is transmitted to the corresponding analog front-end circuit AFE through the first touch signal terminal S1, so as to determine the touch position based on the first touch detection signal.

In the phase $t_3$, as shown in FIGS. 30 and 31, the first switch K1 and the third switch K3 are turned off, the second switch K2 is turned on, and the second voltage provided by the second voltage signal terminal V2 is transmitted to the corresponding second touch signal terminal S2 through the second switch K2, so that the voltage at the second touch signal terminal S2 is stably maintained at the second voltage. The second control switch G2 is turned off, and the second touch signal terminal S2 is disconnected from the corresponding analog front-end circuit AFE.

In the phase $t_3$, as shown in FIGS. 30 and 31, the fifth switch K5 is turned off, the fourth switch K4 is turned on, and the first voltage provided by the first voltage signal terminal V1 is transmitted to the corresponding first touch signal terminal S1 through the fourth switch K4, so that the voltage at the first touch signal terminal S1 is stabilized at the first voltage. The first control switch G1 is turned off, and the first touch signal terminal S1 is disconnected from the corresponding analog front-end circuit AFE.

Correspondingly, in the phase $t_3$, in the display panel 10, a voltage of each second touch electrode 11c in the second touch channel 112 connected to the second touch signal terminal S2 is stably maintained at the second voltage. A voltage of each first touch electrode 11a in the first touch channel 111 connected to the first touch signal terminal S1 is stably maintained at the first voltage. The value of the basic capacitance (mutual capacitance) generated in the touch structure 11 (between the first touch electrodes 11a and the second touch electrodes 11c that are adjacent) in the display panel 10 is an absolute value of a difference between the first voltage and the second voltage.

In the phase $t_4$, the first touch signal terminal S1 transmits a first touch detection signal to the connected analog front-end circuit AFE based on the capacitance change of the touch structure 11 in the display panel 10.

For example, as shown in FIG. 31, the phase $t_4$ includes a third driving phase $t_{41}$ and a fourth driving phase $t_{42}$.

In the third driving phase $t_{41}$, as shown in FIGS. 30 and 31, the second switch K2 and the third switch K3 are turned off, the first switch K1 is turned on, and the first voltage provided by the first voltage signal terminal V1 is transmitted to the corresponding second touch signal terminal S2 through the first switch K1, so that the voltage at the second touch signal terminal S2 jumps from the second voltage to the first voltage. The second control switch G2 is turned off, and the second touch signal terminal S2 is disconnected from the corresponding analog front-end circuit AFE.

In the third driving phase $t_{41}$, as shown in FIGS. 30 and 31, the fourth switch K4 and the fifth switch K5 are turned off, the first control switch G1 is turned on, and the first touch signal terminal S1 is conductive to the corresponding analog front-end circuit AFE to transmit a charge signal of the first touch electrode 11a received by the first touch signal terminal S1 to the corresponding analog front-end circuit AFE.

Correspondingly, in the third driving phase $t_{41}$, a voltage of each second touch electrode 11c in the second touch channel 112 in the display panel 10 jumps from the second voltage to the first voltage. When the voltage of the second touch electrode 11c jumps, the voltage of the first touch electrode 11a also jumps accordingly. In the process, an electrical signal corresponding to a voltage value of each first touch electrode 11a in the first touch channel 111 is transmitted to the corresponding analog front-end circuit AFE through the first touch signal terminal S1, so as to determine the touch position based on the first touch detection signal.

In the fourth driving phase $t_{42}$, as shown in FIGS. 30 and 31, the first switch K1 and the second switch K2 are turned off, the third switch K3 is turned on, and the third voltage provided by the third voltage signal terminal V3 is transmitted to the corresponding second touch signal terminal S2 through the third switch K3, so that the voltage at the second touch signal terminal S2 jumps from the first voltage to the third voltage. The second control switch G2 is turned off, and the second touch signal terminal S2 is disconnected from the corresponding analog front-end circuit AFE.

In the fourth driving phase $t_{42}$, as shown in FIGS. 30 and 31, the fourth switch K4 and the fifth switch K5 are turned off, the first control switch G1 is turned on, and the first touch signal terminal S1 is conductive to the corresponding analog front-end circuit AFE to transmit a charge signal of the first touch electrode 11a received by the first touch signal terminal S1 to the corresponding analog front-end circuit AFE.

Correspondingly, in the fourth driving phase $t_{42}$, a voltage of each second touch electrode 11c in the second touch channel 112 in the display panel 10 jumps from the first voltage to the third voltage. When the voltage of the second touch electrode 11c jumps, the voltage of the first touch electrode 11a also jumps accordingly. In the process, an electrical signal corresponding to a voltage value of each first touch electrode 11a in the first touch channel 111 is transmitted to the corresponding analog front-end circuit AFE through the first touch signal terminal S1, so as to determine the touch position based on the first touch detection signal.

In the mutual capacitance detection phase $T_1$, the above driving phases $t_1$ to $t_4$ are repeated to detect the touch position in the display panel 10.

In some embodiments, as shown in FIG. 31, the touch detection cycle Tc further includes self-capacitance detection phases (e.g., $T_2$ and $T_3$ shown in FIG. 31). The driving method for the touch driving circuit 20b further includes self-capacitance detection phases, and the self-capacitance detection phases include the following driving processes S02 and S03.

In S02, as shown in FIGS. 30 and 31, the first output circuit 201 applies a first driving signal to the first touch signal terminal S1; and at least two first touch signal terminals S1 connected to the same analog front-end circuit AFE transmit first touch detection signals to the connected analog front-end circuit AFE in a time-sharing mode based on the capacitance change of the touch structure 11 in the display panel 10.

For example, as shown in FIGS. 30 and 31, in the first self-capacitance detection phase $T_2$, the second switch K2 is turned on to transmit the second voltage provided by the second voltage signal terminal V2 to the second touch signal terminal S2. Correspondingly, a voltage of each second touch electrode 11c in the display panel 10 is the second voltage (e.g., HVDD).

Next, as shown in FIGS. 30 and 31, the second control switch G2 is turned on, and the second touch electrode 11c transmits a second touch detection signal to the corresponding analog front-end circuit AFE through the second control switch G2, thereby determining the touch position based on the second touch detection signal.

In S03, as shown in FIGS. 30 and 31, the second output circuit 202 applies a second driving signal to the second touch signal terminal S2; and the second touch signal terminal S2 transmits a second touch detection signal to the connected analog front-end circuit AFE based on the capacitance change of the touch structure 11 in the display panel 10.

In the second self-capacitance detection phase $T_3$, the fifth switch K5 is turned on to transmit the second voltage provided by the second voltage signal terminal V2 to the first touch signal terminal S1. Correspondingly, a voltage of each first touch electrode 11a in the display panel 10 is the second voltage (e.g., HVDD).

Next, as shown in FIGS. 30 and 31, multiple (two or more) first control switches G1 connected to the same analog front-end circuit AFE are turned on in a time-sharing mode, and multiple first touch signal terminals S1 connected to the same analog front-end circuit AFE transmit first touch detection signals to the analog front-end circuit AFE in a time-sharing mode.

For example, as shown in FIG. 31, the second self-capacitance detection phase $T_3$ includes a first phase $t_{31}$ and a second phase $t_{32}$. As shown in FIG. 30, in the first phase $t_{31}$, a first control switch G1 between an odd-numbered first touch signal terminal S1 and the corresponding analog front-end circuit AFE is turned on, and the odd-numbered first touch signal terminal S1 transmits a first touch detection signal to the corresponding analog front-end circuit AFE through the turned-on first control switch G1. In the second phase $t_{32}$, a first control switch G1 between an even-numbered first touch signal terminal S1 and the corresponding analog front-end circuit AFE is turned on, and the even-numbered first touch signal terminal S1 transmits a first touch detection signal to the corresponding analog front-end circuit AFE through the turned-on first control switch G1.

The order of the first self-capacitance detection phase $T_2$ and the second self-capacitance detection phase $T_3$ may be adaptively designed as required, which is not limited in the present disclosure.

For example, in a case where the touch detection cycle Tc includes the mutual capacitance detection phase $T_1$ and the self-capacitance detection phase, the order of the mutual capacitance detection phase and the self-capacitance detection phase is not limited and may be designed accordingly as required, which is not limited in the present disclosure.

In a case where the numbers of the first touch signal terminals S1 and the second touch signal terminals S2 are the same, if the touch detection cycle Tc only includes the mutual capacitance detection phase $T_1$, the duration of the touch detection cycle Tc is relatively short, the reporting rate of the display panel 10 is high, and the response rate of the display panel 10 to the touch operation is high. Alternatively, if the touch detection cycle Tc may include the mutual capacitance detection phase $T_1$ and the self-capacitance detection phase, within the touch detection cycle Tc, while the touch position is detected by mutual capacitance driving, the touch position is also detected by self-capacitance driving. Therefore, the detection of the control position has rather high accuracy.

Figure 32:
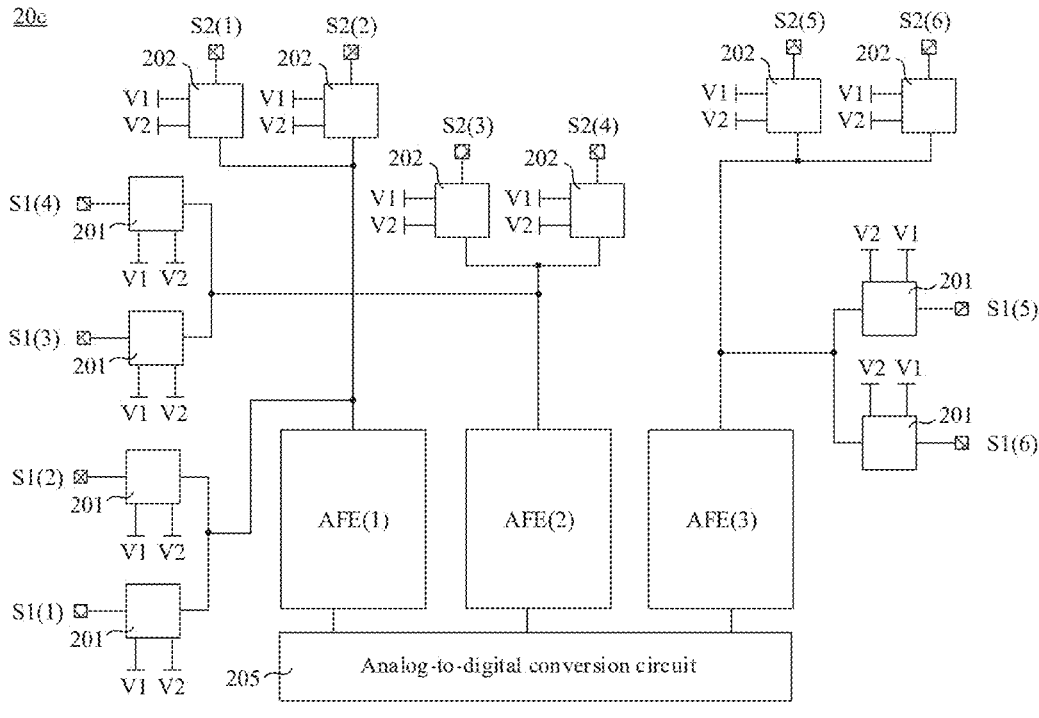
FIG. 32 is an equivalent circuit diagram of a touch driving circuit, in accordance with some embodiments.

Some embodiments of the present disclosure further provide a touch driving circuit 20c. As shown in FIG. 32, the touch driving circuit 20c includes a plurality of first touch signal terminals S1, a plurality of second touch signal terminals S2 and a plurality of analog front-end circuits AFE. The number of the analog front-end circuits AFE is less than the number of the first touch signal terminals S1 and less than the number of the second touch signal terminals S2.

Each analog front-end circuit AFE in at least one analog front-end circuit AFE is connected to at least two first touch signal terminals S1, and the analog front-end circuit AFE connected to the at least two first touch signal terminals S1 is configured to receive first touch detection signals from the at least two first touch signal terminals S1 in a time-sharing mode.

Each analog front-end circuit AFE in at least one analog front-end circuit AFE is connected to at least two second touch signal terminals S2, and the analog front-end circuit AFE connected to the at least two second touch signal terminals S2 is configured to receive second touch detection signals from the at least two second touch signal terminals S2 in a time-sharing mode.

The present embodiments provide a touch driving circuit 20c. By multiplexing the analog front-end circuits AFE, the number of the analog front-end circuits AFE is less than the number of the first touch signal terminals S1 and less than the number of the second touch signal terminals S2, so as to reduce the number of the analog front-end circuits AFE in the touch driving circuit 20c, thereby reducing the cost and the size of the touch driving chip.

In some embodiments, as shown in FIG. 32, the number of the first touch signal terminals S1 is equal to the number of the second touch signal terminals S2, and each analog front-end circuit AFE is connected to at least two first touch signal terminals S1 and to at least two second touch signal terminals S2.

For example, the touch driving circuit 20c includes six first touch signal terminals S1 and six second touch signal terminals S2, and correspondingly, further includes three analog front-end circuits AFE. An analog front-end circuit AFE is connected to two first touch signal terminals S1 and two second touch signal terminals S2.

In this way, the analog front-end circuit AFE, the first touch signal terminal S1 and the second touch signal terminal S2 are all multiplexed, so that the number of the analog front-end circuits AFE in the touch driving circuit 20c may further be reduced.

It will be noted that in the touch driving circuit 20c, an analog front-end circuit AFE may alternatively be connected to three or more first touch signal terminals S1 and/or second touch signal terminals S2, and the adaptive design may be made specifically as required.

In some embodiments, as shown in FIG. 32, the touch driving circuit 20c further includes an analog-to-digital conversion circuit 205, and the analog-to-digital conversion circuit 205 is connected to the analog front-end circuits AFE, and the analog front-end circuit AFE is further configured to send a processed analog signal to the analog-to-digital conversion circuit 205.

The analog-to-digital conversion circuit 205 in the present embodiments may be an analog-to-digital converter ADC. The connection relationship between the analog-to-digital conversion circuit 205 and the remaining structures in the touch driving circuit 20c and specific operation process may refer to the description of the touch driving circuit 20b hereinbefore, and details are not repeated here.

Embodiments of the present disclosure further provide a display device 100. A touch driving circuit 20 connected to a display panel 10 in the display device 100 may be the touch driving circuit 20c provided in the above embodiments.

Some embodiments of the present disclosure further provide a driving method for a touch driving circuit. The driving method for the touch driving circuit may be applied to the touch driving circuit 20c provided in any of the aforementioned embodiments. The driving method includes a mutual capacitance detection phase (e.g., the first mutual capacitance detection phase $T_{11}$ and the second mutual capacitance detection phase $T_{12}$ in FIG. 33). In the touch driving circuit 20c, the first touch signal terminal S1 is a touch transmitting signal terminal, and the second touch signal terminal S2 is a touch sensing signal terminal.

Based on this, the mutual capacitance detection phase includes the following process.

In S001, the first output circuit 201 applies a first driving signal to a first touch signal terminal S1; and at least two second touch signal terminals S2 connected to the same analog front-end circuit AFE transmit second touch detection signals to the connected analog front-end circuit AFE in a time-sharing mode based on the capacitance change of the touch structure 11 in the display panel 10.

Some embodiments of the present disclosure will be described by taking an example where the first touch signal terminal S1 is a touch transmitting signal terminal, and the second touch signal terminal S2 is a touch sensing signal terminal.

Figure 33:
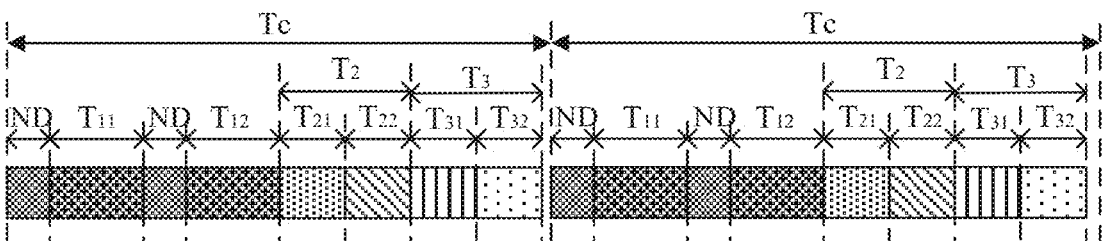
FIG. 33 is a driving timing diagram of a touch driving circuit, in accordance with some embodiments.
Figure 34:
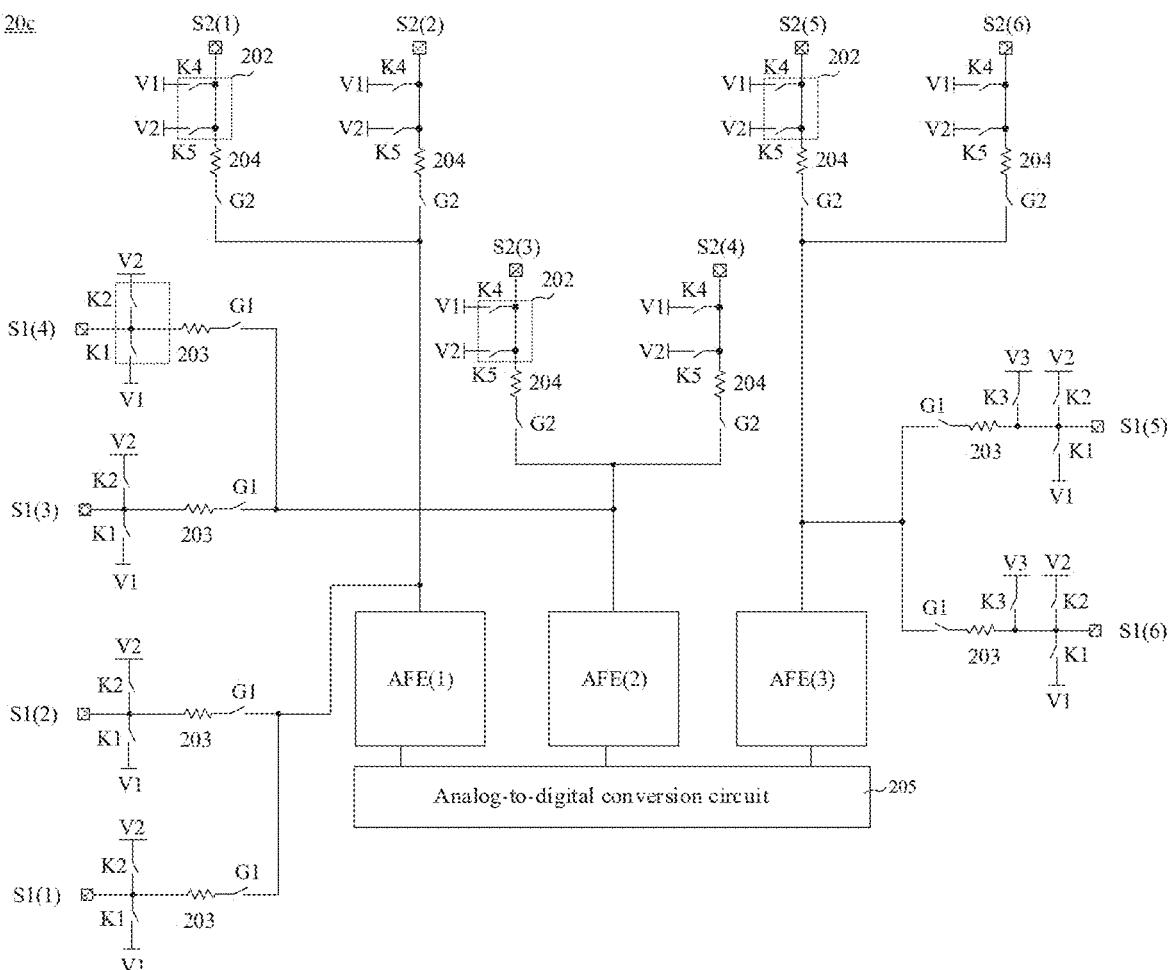
FIG. 34 is an equivalent circuit diagram of a touch driving circuit, in accordance with some embodiments.

As shown in FIGS. 33 and 34, in the mutual capacitance detection phase $T_1$, the first touch signal terminal S1 applies a first driving signal to the connected first touch channel 111, and the second touch signal terminal S2 receives a second touch detection signal sent by the connected second touch channel 112 and sends the second touch detection signal to the connected analog front-end circuit AFE.

As shown in FIG. 32, the two second touch signal terminals S2 are connected to the same analog front-end circuit AFE, and second touch detection signals transmitted by the second touch signal terminals S2 are different.

Therefore, the two second touch signal terminals S2 need to be conductive to the analog front-end circuit AFE in a time-sharing mode to transmit the second touch detection signals to the analog front-end circuit AFE in a time-sharing mode.

The specific circuit operation process may refer to the description of the touch driving circuit 20b hereinbefore, and details are not repeated here.

In some embodiments, the driving method for the touch driving circuit further includes a self-capacitance detection phase, and the self-capacitance detection phase includes the following processes.

In S002, the first output circuit 201 applies a first driving signal to the first touch signal terminal S1; and at least two first touch signal terminals S1 connected to the same analog front-end circuit AFE transmit first touch detection signals to the corresponding analog front-end circuit AFE in a time-sharing mode based on the capacitance change of the touch structure 11 in the display panel 10.

In S003, the second output circuit 202 applies a second driving signal to the second touch signal terminal S2; and at least two second touch signal terminals S2 connected to the same analog front-end circuit AFE transmit second touch detection signals to the corresponding analog front-end circuit AFE in a time-sharing mode based on the capacitance change of the touch structure 11 in the display panel 10.

The specific circuit operation process may refer to the description of the touch driving circuit 20b hereinbefore, and details are not repeated here.

In some other embodiments, in the touch driving circuit 20c, the first touch signal terminal S1 is a touch sensing signal terminal, and the second touch signal terminal S2 is a touch transmitting signal terminal. Based on this, the mutual capacitance detection phase includes: the second output circuit 202 applying a second driving signal to the second touch signal terminal S2; and at least two first touch signal terminals S1 connected to the same analog front-end circuit AFE transmitting first touch detection signals to the connected analog front-end circuit AFE in a time-sharing mode based on the capacitance change of the touch structure 11 in the display panel 10.

The self-capacitance detection phase includes the following driving processes.

The first output circuit 201 applies a first driving signal to the first touch signal terminal S1; and at least two first touch signal terminals S1 connected to the same analog front-end circuit AFE transmit first touch detection signals to the corresponding analog front-end circuit AFE in a time-sharing mode based on the capacitance change of the touch structure 11 in the display panel 10.

The second output circuit 202 applies a second driving signal to the second touch signal terminal S2; and at least two second touch signal terminals S2 connected to the same analog front-end circuit AFE transmit second touch detection signals to the corresponding analog front-end circuit AFE in a time-sharing mode based on the capacitance change of the touch structure 11 in the display panel 10.

The specific circuit operation process may refer to the description of the touch driving circuit 20b hereinbefore, and details are not repeated here.

Some embodiments of the present disclosure further provide a touch driving circuit 20d. The touch driving circuit 20d includes a plurality of first touch signal terminals S1, a plurality of second touch signal terminals S2 and a plurality of analog front-end circuits AFE. The number of the first touch signal terminals S1 is greater than or equal to the number of the second touch signal terminals S2, and the number of the analog front-end circuits AFE is less than the number of the first touch signal terminals S1. Each analog front-end circuit AFE in at least one analog front-end circuit AFE is connected to at least two first touch signal terminals S1.

Based on this, in a case where the number of the first touch signal terminals S1 is equal to the number of the second touch signal terminals S2, each analog front-end circuit AFE in at least one analog front-end circuit AFE is connected to at least two second touch signal terminals S2.

In a case where the number of the first touch signal terminals S1 is greater than the number of the second touch signal terminals S2, and the number of the analog front-end circuits AFE is less than or equal to the number of the second touch signal terminals S2, each analog front-end circuit AFE in at least one analog front-end circuit AFE is connected to at least two second touch signal terminals S2, or an analog front-end circuit AFE is connected to a second touch signal terminal S2.

In a case where the number of the analog front-end circuits AFE is greater than the number of the second touch signal terminals S2, each analog front-end circuit AFE in at least one analog front-end circuit AFE is connected to a second touch signal terminal S2, and each analog front-end circuit AFE in another at least one analog front-end circuit AFE is not connected to the second touch signal terminal S2.

For example, the first touch signal terminal S1 is a touch transmitting signal terminal, and the second touch signal terminal is a touch sensing signal terminal. Based on this, in the touch structure 11, the first touch electrode 11a is a touch driving electrode Tx, and the second touch electrode 11c is a touch sensing electrode Rx. In the mutual capacitance detection phase, the first touch signal terminal S1 sends a touch driving signal to the first touch channel 111 of the touch structure 11, and the second touch channel 112 transmits a touch sensing signal to a second touch signal terminal S2 based on a capacitance change of the touch structure 11, so as to detect the touch position.

Alternatively, the first touch signal terminal S1 may be a touch sensing signal terminal, and the second touch signal terminal may be a touch transmitting signal terminal. Based on this, in the touch structure 11, the first touch electrode 11a is a touch sensing electrode Rx, and the second touch electrode 11c is a touch driving electrode Tx. In the mutual capacitance detection phase, the second touch signal terminal S2 sends a touch driving signal to a second touch channel 112 of the touch structure 11, and the first touch channel 111 transmits a touch sensing signal to a first touch signal terminal S1 based on a capacitance change of the touch structure 11, so as to detect the touch position.

In some embodiments, in the touch driving process of the touch driving circuit 20d, self-capacitance detection may be performed using the first touch channel 111 of the touch structure. In the self-capacitance detection phase, after a first driving signal is applied to the first touch channel 111 in the display panel 10 through the first touch signal terminal S1, the first touch channel 111 sends a first touch detection signal to the corresponding first touch signal terminal S1 based on the capacitance change of the touch structure 11. Next, the first touch signal terminal S1 sends the received first touch detection signal to the corresponding analog front-end circuit AFE.

An analog front-end circuit AFE is connected to a plurality of (two or more) first touch signal terminals S1, the plurality of first touch signal terminals S1 are connected to the analog front-end circuit AFE in a time-sharing mode, and the analog front-end circuit AFE receives first touch detection signals from all first touch signal terminals S1 connected thereto in a time-sharing mode.

In some embodiments, in the touch driving process of the touch driving circuit 20d, self-capacitance detection may be performed using the second touch channel 112 of the touch structure 11. In the self-capacitance detection phase, after a second driving signal is applied to the second touch channel 112 in the display panel 10 through the second touch signal terminal S2, the second touch channel 112 sends a second touch detection signal to the corresponding second touch signal terminal S2 based on the capacitance change of the touch structure 11. Next, the second touch signal terminal S2 sends the received second touch detection signal to the corresponding analog front-end circuit AFE.

In a case where an analog front-end circuit AFE is connected to a second touch signal terminal S2, the second touch signal terminal S2 sends the second touch detection signal to the analog front-end circuit AFE.

In a case where an analog front-end circuit AFE is connected to multiple (two or more) second touch signal terminals S2, the multiple second touch signal terminals S2 are conductive to the analog front-end circuit AFE in a time-sharing mode, and the analog front-end circuit AFE receives the second touch detection signals from all the second touch signal terminal S2 connected thereto in a time-sharing mode.

In some embodiments, the touch driving circuit 20d includes m first touch signal terminals S1, n second touch signal terminals S2 and k analog front-end circuits AFE; where m, n, k are all positive integers, and m is greater than or equal to n (m≥n).

For example, m is greater than k, and k is greater than n (m>k>n). Taking m≤2n as an example, in the touch driving circuit 20d, each analog front-end circuit AFE in (m−k) analog front-end circuits AFE is connected to two first touch signal terminals S1, and each analog front-end circuit AFE in the remaining (2k−m) analog front-end circuits AFE is connected to a first touch signal terminal S1. Each analog front-end circuit AFE in the n analog front-end circuits AFE is connected to a second touch signal terminal S2, and each analog front-end circuit AFE in the remaining (k−n) analog front-end circuits AFE is not connected to a second touch signal terminal S2.

Alternatively, m is greater than or equal to n, and n is greater than or equal to k (m≥n≥k), which includes the following cases.

For example, m is greater than n, and n is greater than k (m>n>k). Taking m≤2n as an example, in the touch driving circuit 20d, each analog front-end circuit AFE in (2k−m) analog front-end circuits AFE is connected to a first touch signal terminal S1, and each analog front-end circuit AFE in the remaining (m−k) analog front-end circuits AFE is connected to two first touch signal terminals S1. Each analog front-end circuit AFE in the (2k−n) analog front-end circuits AFE is connected to a second touch signal terminal S2, and each analog front-end circuit AFE in the remaining (n−k) analog front-end circuits AFE is connected to two second touch signal terminal S2.

As another example, m is greater than n, and n is equal to k (m>n=k). Taking m≤2n as an example, in the touch driving circuit 20d, the connection method between the first touch signal terminals S1, the second touch signal terminals S2 and the analog front-end circuits AFE may refer to the description of the touch driving circuit 20b hereinbefore, and details are not repeated here.

As another example, m is equal to n, and n is greater than k (m=n>k), in the touch driving circuit 20d, the connection method between the first touch signal terminals S1, the second touch signal terminals S2 and the analog front-end circuits AFE may refer to the description of the touch driving circuit 20c hereinbefore, and details are not repeated here.

As another example, m is equal to n, and n is equal to k (m=n=k), in the touch driving circuit 20d, an analog front-end circuit AFE is connected to a first touch signal terminal S1 and a second touch signal terminal S2.

In some embodiments, the touch driving circuit 20d includes 76 first touch signal terminals S1 and 51 second touch signal terminals S2.

Then, the touch driving circuit 20d may include 60 analog front-end circuits AFE. Each analog front-end circuit AFE in 16 analog front-end circuits AFE is connected to two first touch signal terminals S1, and each analog front-end circuit AFE in the remaining 44 analog front-end circuits AFE is connected to a first touch signal terminal S1. Each analog front-end circuit AFE in 51 analog front-end circuits AFE is connected to a second touch signal terminal S2, and the remaining 9 analog front-end circuits AFE are not connected to a second touch signal terminal S2.

Alternatively, the touch driving circuit 20d may include 45 analog front-end circuits AFE. Each analog front-end circuit AFE in 31 analog front-end circuits AFE is connected to two first touch signal terminals S1, and each analog front-end circuit AFE in the remaining 14 analog front-end circuits AFE is connected to a first touch signal terminal S1. Each analog front-end circuit AFE in 6 analog front-end circuits AFE is connected to two second touch signal terminals S2, and each analog front-end circuit AFE in the remaining 39 analog front-end circuits AFE is connected to a second touch signal terminal S2.

In some other embodiments, the touch driving circuit 20d includes 8 first touch signal terminals S1 and 8 second touch signal terminals S2.

Then, the touch driving circuit 20b may include 8 analog front-end circuits AFE. Each analog front-end circuit AFE is connected to a first touch signal terminal S1 and a second touch signal terminal S2.

In this way, in the touch driving circuit 20d, at least part of the plurality of analog front-end circuits AFE are multiplexed. As a result, in a case where the numbers of the first touch signal terminals S1 and the second touch signal terminals S2 keep unchanged, the number of the analog front-end circuits AFE in the touch driving circuit 20d may be reduced, thereby reducing the size of the touch driving circuit 20d and reducing the size and the cost of the touch chip.

It will be noted that, in the touch driving circuit 20d, an analog front-end circuit AFE may be connected to three or more first touch signal terminals S1 and/or three or more second touch signal terminals S2, and the adaptive design may be made specifically as actual required. The driving process of the touch driving circuit 20d refers to the description of the touch driving circuit 20b and the touch driving circuit 20c hereinbefore, and details are not repeated here.

Figure 35:
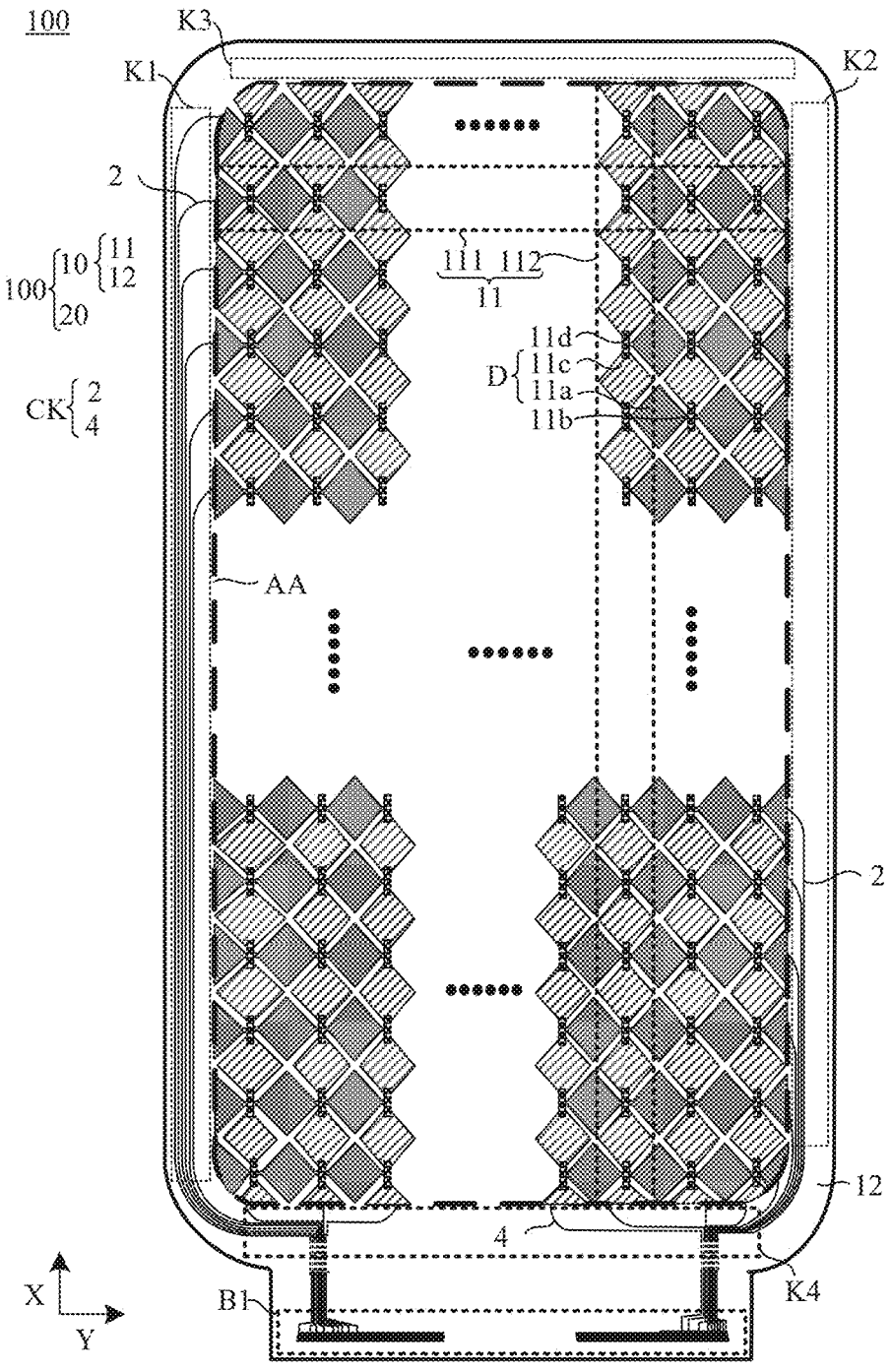
FIG. 35 is a plan structural diagram of a display device, in accordance with some embodiments.

Some embodiments of the present disclosure further provide a display panel 10. As shown in FIG. 35, the display panel 10 includes a display substrate 12 and a touch structure 11.

In some examples, the display panel 10 includes the display substrate 12 and a touch panel disposed on a side of the display substrate 12. The touch panel includes the touch structure 11, and the touch structure 11 is electrically connected to the display substrate 12. For example, the touch panel is disposed on a light exit side of the display substrate 12.

In this case, the display function of the display device 100 is implemented by the display substrate 12, and the touch function of the display device 100 is implemented by the touch panel mounted on the display substrate 12. The display panel 10 and the touch panel may be formed separately and then assembled. In this way, the display panel 10 and the touch panel may be formed together, thereby improving the manufacturing efficiency of the display device 100.

In some other examples, as shown in FIG. 1, the display panel 10 includes the display substrate 12 and the touch structure 11 disposed on a side of the display substrate 12. The touch structure 11 is disposed on the display substrate 12, and the touch structure 11 is electrically connected to the display substrate 12. The touch structure 11 is configured to achieve the touch control function, and the display substrate 12 is configured to achieve the display function. For example, the touch structure 11 is disposed on a light exit side of the display substrate 12.

In this case, the display panel 10 is a touch display panel, and a single display panel 10 may achieve both the display function and the touch function. In this way, in the manufacturing process of the display panel 10, the display substrate 12 may be formed and then the touch structure 11 is formed on the display substrate 12. Since the touch structure 11 may be formed on the display substrate 12, there is no need to provide a base substrate for the touch structure 11, thereby reducing a thickness of the display panel 10 and facilitating realization of a light and thin design of the display panel 10.

The display substrate 12 includes, for example, a substrate, and a driving circuit layer and other structures disposed on the substrate. The substrate may be made of a rigid material or a flexible material. The rigid material includes, but is not limited to, glass, printed circuit board (PCB), and the like, and the flexible material includes, but is not limited to, polyimide film (PI), flexible printed circuit (FPC), and the like.

Accordingly, the display panel 10 may be a rigid display panel or a flexible display panel, and the display device 100 may be a rigid display device (e.g., a flat or curved display, or an electronic device equipped with the flat or curved display) or a flexible display device (e.g., a foldable mobile phone, or a foldable flat display).

Figure 36:
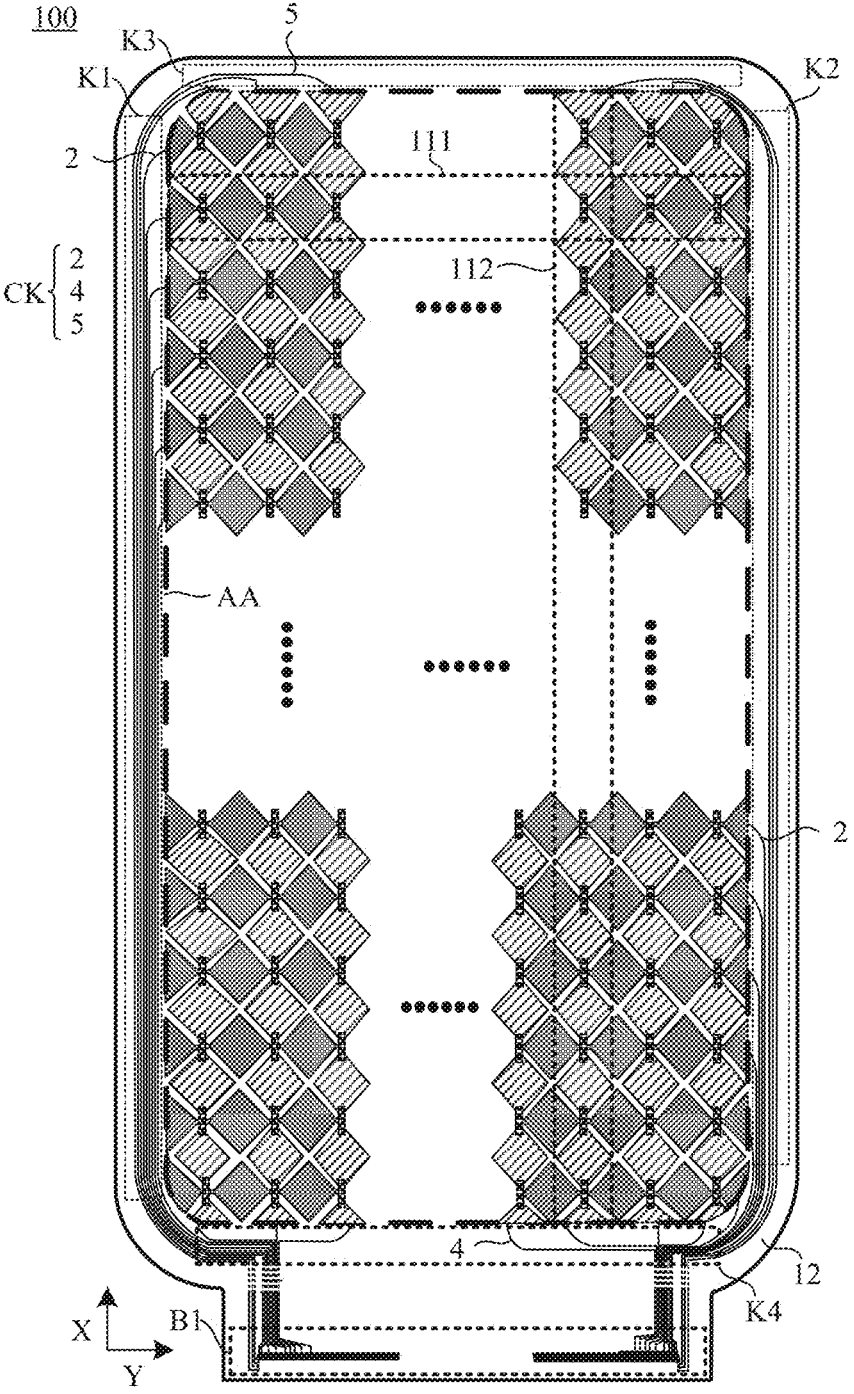
FIG. 36 is a plan structural diagram of another display device, in accordance with some embodiments.

In the embodiments of the present disclosure, FIGS. 35 and 36 are each a plan structural diagram of the display device 100. For convenience of clearly describing the connection method between the display panel 10 and the driving chip (not shown in the figures), a first bonding area B1 of the display panel 10 is provided on the same side of the display area AA in FIGS. 35 and 36. It will be noted that in the final display panel 10, the first bonding area B1 is bent to the other side of the display panel 10.

In some embodiments, as shown in FIGS. 35 and 36, the display panel 10 includes a display area AA and a first bonding area B1 located on a side of the display area AA for bonding the driving chip. The driving chip may be a touch driving chip or a touch and display driver integrated chip. A plurality of first touch pins and a plurality of second touch pins are provided in the first bonding area B1. Each first touch pin is connected to a first touch channel 111, and each second touch pin is connected to a second touch channel 112.

For example, the driving chip is provided thereon with the touch driving circuit 20 in any of the above embodiments (e.g., the touch driving circuit 20b or the touch driving circuit 20c). The driving chip has a plurality of first touch connection blocks and a plurality of second touch connection blocks, each first touch connection block is connected to a first touch signal terminal S1 in the touch driving circuit 20, and each second touch connection block is connected to a second touch signal terminal S2 in the touch driving circuit 20.

During manufacturing the display device 100, in a process of correspondingly connecting the driving chip to the display panel 10, for example, touch pins (e.g., first touch pins 31 and second touch pins 33) in the display panel 10 are correspondingly connected to the connection blocks (e.g., first touch connection blocks 71 and second touch connection blocks 73) in the driving chip using a bonding process.

For example, an anisotropic conductive film (ACF) is attached to the first bonding area B1 of the display panel 10, and then the driving chip is pressed onto the ACF by a thermo-compression process, so that the driving chip is correspondingly connected to the display panel 10.

In the touch driving circuit 20 provided in some embodiments of the present disclosure, the first touch signal terminal S1 may be a touch transmitting signal terminal, and the second touch signal terminal S2 may be a touch sensing signal terminal; alternatively, the first touch signal terminal S1 may be a touch sensing signal terminal, and the second touch signal terminal S2 may be a touch transmitting signal terminal.

Figure 45:
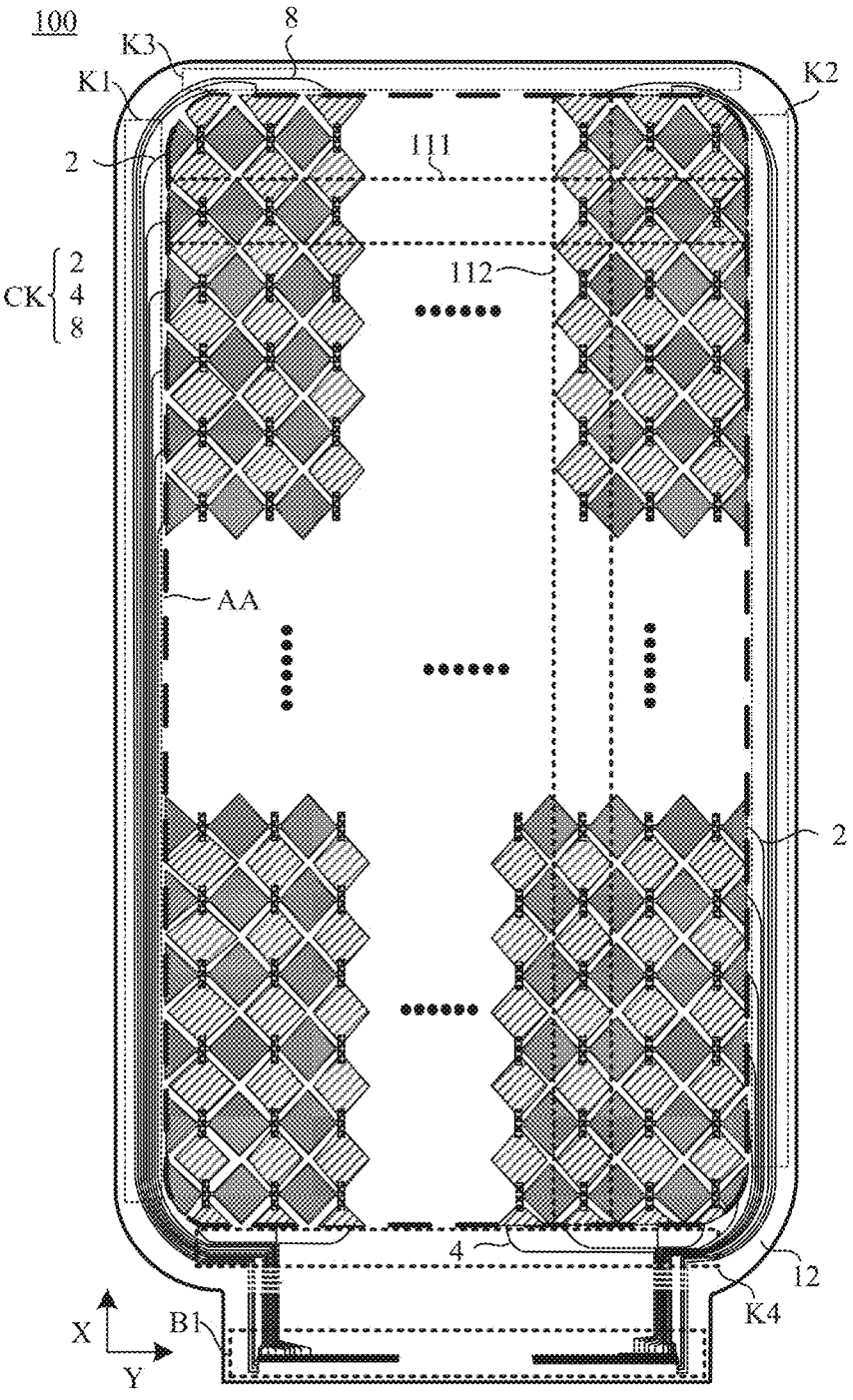
FIG. 45 is a plan structural diagram of a display device, in accordance with some embodiments.

Accordingly, as shown in FIGS. 35, 36 and 45, in the touch structure 11 in the display panel 10 connected to the touch driving circuit 20 correspondingly, the first touch channel 111 may be a touch driving channel, the first touch electrode 11a is a touch driving electrode Tx, the second touch channel 112 may be a touch sensing channel, and the second touch electrode 11c is a touch sensing electrode Rx. Alternatively, the first touch channel 111 may be a touch sensing channel, the first touch electrode 11a is a touch sensing electrode Rx, the second touch channel 112 may be a touch driving channel, and the second touch electrode 11c is a touch driving electrode Tx.

As shown in FIGS. 35, 36 and 45, a dimension of the display panel 10 in the first direction X is greater than a dimension of the display panel 10 in the second direction Y. Thus, a length of the first touch channel 111 of the touch structure 11 is less than a length of the second touch channel 112 of the touch structure 11.

The length of the second touch channel 112 is, for example, twice the length of the first touch channel 111. In the touch driving process, an electrical signal (e.g., the first driving signal or the second driving signal mentioned above, or the first touch detection signal or the second touch detection signal mentioned above) is transmitted sequentially from a second touch electrode 11c at an end of the second touch channel 112 to a second touch electrode 11c at the other end of the second touch channel 112. In a case of a long second touch channel 112, the second touch electrodes 11c at the two ends of the second touch channel 112 receiving an electrical signal or sending an electrical signal have a large time difference therebetween.

Based on this, in a case where the first touch electrode 11a is the touch driving electrode Tx and the second touch electrode 11c is the touch sensing electrode Rx, the display panel 10 may adopt a "1T2R" connection method, so that two ends of the touch sensing channel are connected to the driving chip by different touch leads, thereby reducing a signal delay caused by the long touch sensing channel.

For example, as shown in FIG. 36, each touch driving channel (the first touch channel 111) is connected to the driving chip by a first touch lead 2, and both ends of each touch sensing channel (the second touch channel 112) are connected to the driving chip by a second touch lead 4 and a third touch lead 5, respectively.

As another example, referring to FIG. 45, each touch driving channel (the first touch channel 111) is connected to the driving chip by a first touch lead 2, and both ends of each touch sensing channel (the second touch channel 112) are connected to the driving chip by a second touch lead 4 and a fourth touch lead 8, respectively.

In a case where the first touch electrode 11*a* is the touch sensing electrode Rx and the second touch electrode 11*c* is the touch driving electrode Tx, the display panel 10 may adopt a "2T1R" connection method, so that two ends of the touch driving channel are connected to the driving chip by different touch leads, thereby reducing a signal delay caused by the long touch driving channel.

For example, as shown in FIG. 36, both ends of each touch driving channel (the second touch channel 112) are connected to the driving chip by a second touch lead 4 and a third touch lead 5, respectively, and each touch sensing channel (the first touch channel 111) is connected to the driving chip by a first touch lead 2.

As another example, referring to FIG. 45, both ends of each touch driving channel (the second touch channel 112) are connected to the driving chip by a second touch lead 4 and a fourth touch lead 8, respectively, and each touch sensing channel (the first touch channel 111) is connected to the driving chip by a first touch lead 2.

The structure in an area (the first bonding area B1) of the display panel 10 for connecting the driving chip and the connection method between the touch leads CK and the touch structure 11 in the display panel 10 will be described below.

Figure 37:
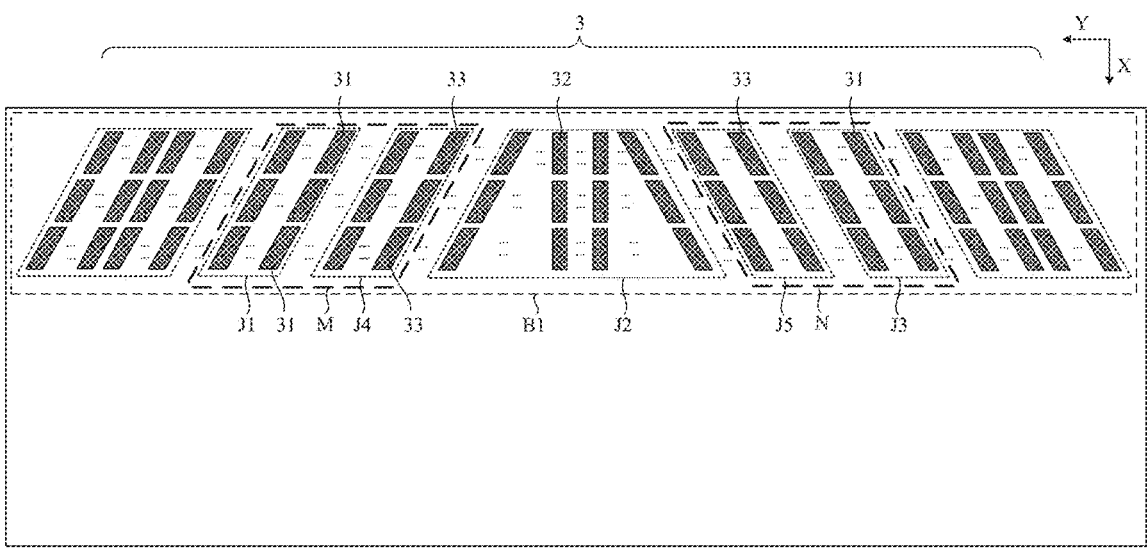
FIG. 37 is an enlarged structural view of a first bonding area B1 of a display device, in accordance with some embodiments.
Figure 38:
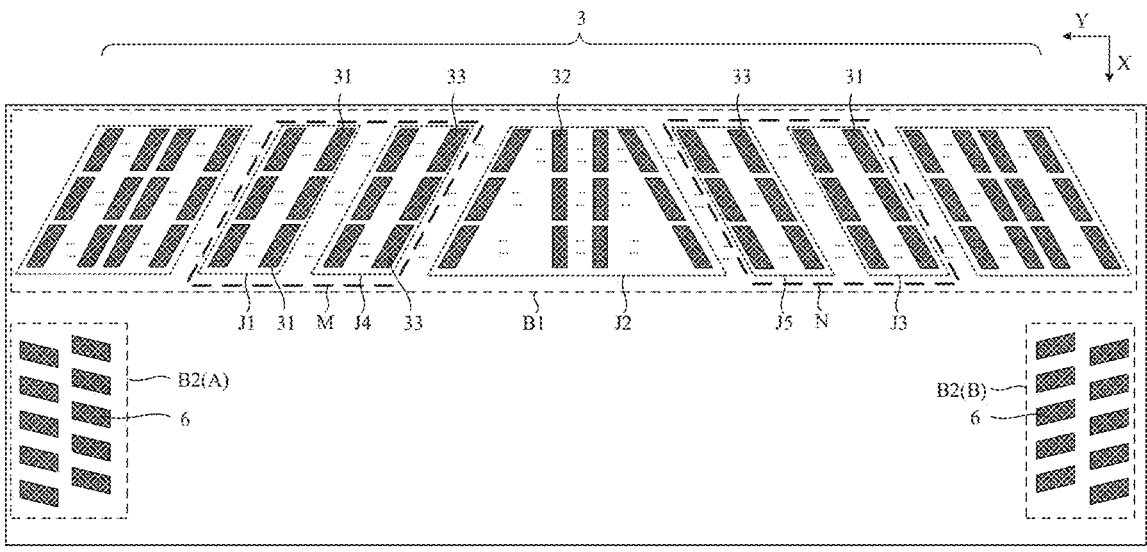
FIG. 38 is an enlarged structural view of a first bonding area B1 of another display device, in accordance with some embodiments.
Figure 39:
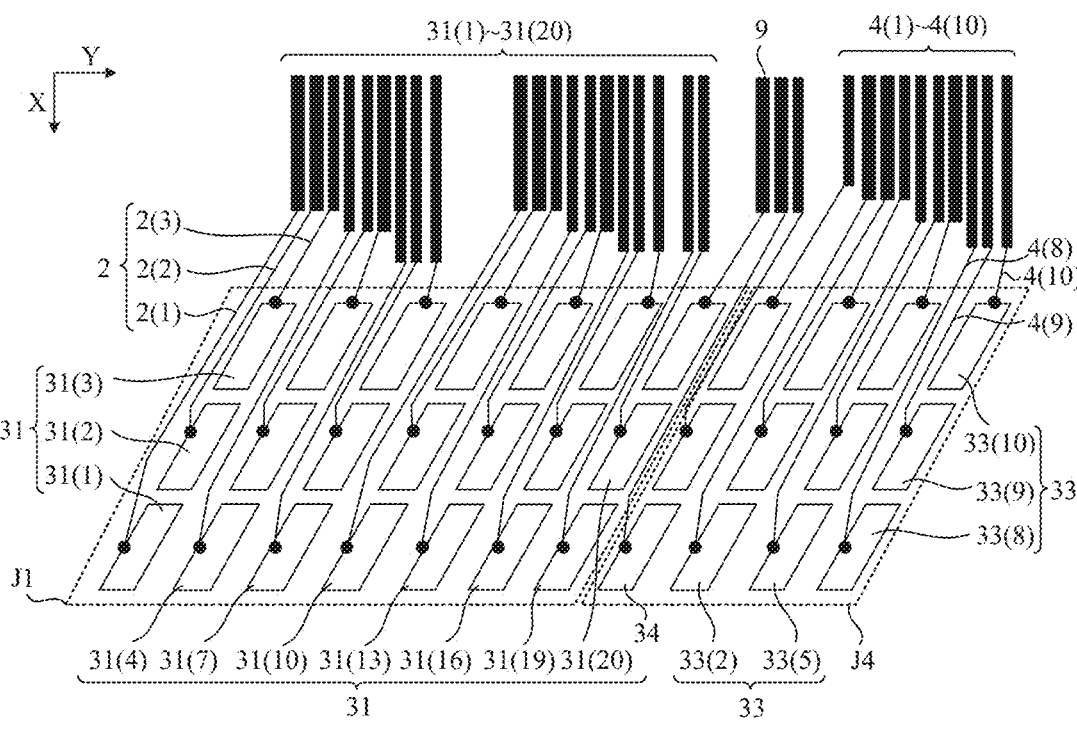
FIG. 39 is an enlarged structural view of an area M shown in FIG. 37 or 38.
Figure 40:
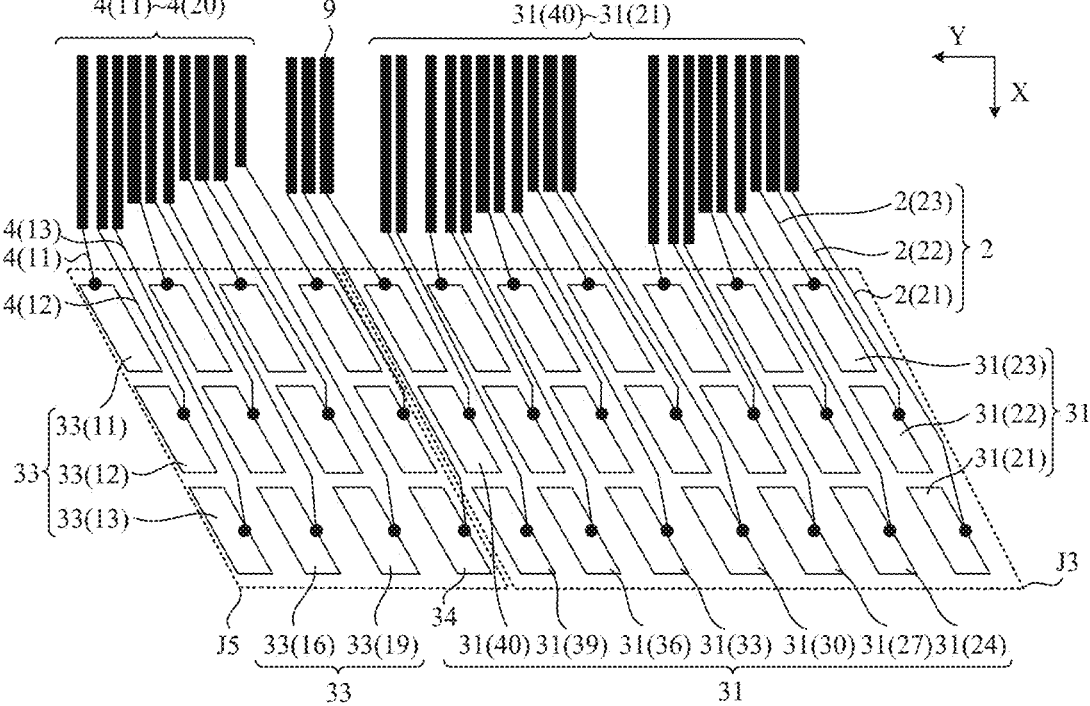
FIG. 40 is an enlarged structural view of an area N shown in FIG. 37 or 38.
Figure 41:
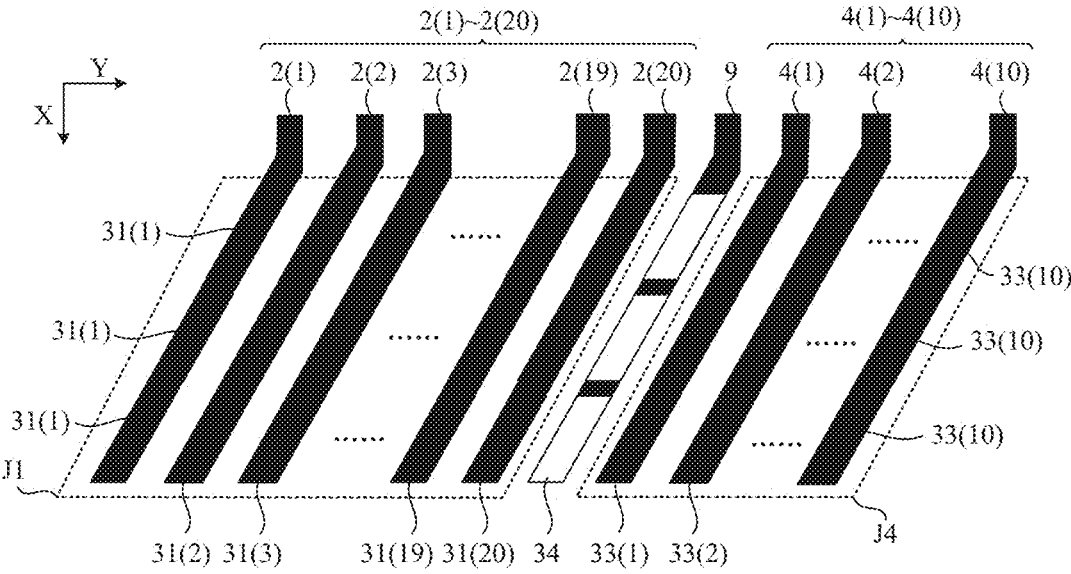
FIG. 41 is another enlarged structural view of an area M shown in FIG. 37 or 38.
Figure 42:
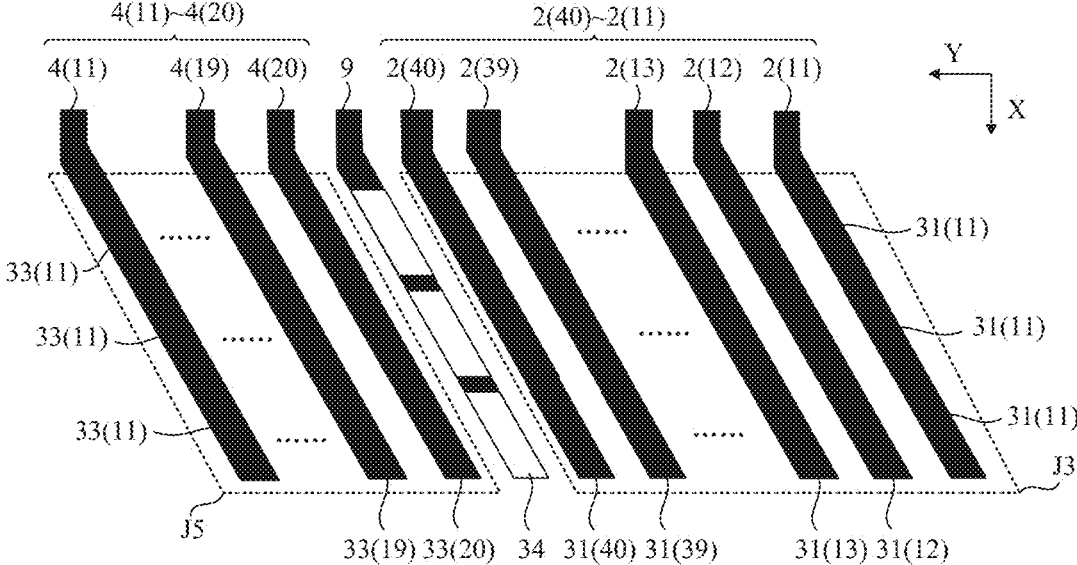
FIG. 42 is another enlarged structural view of an area N shown in FIG. 37 or 38.

FIGS. 37 and 38 are each an enlarged structural schematic diagram of the first bonding area B1 of the display panel 10. The extension directions and arrangement of some pins in the display panel 10 for connecting the driving chip are shown in the figures. It will be understood that the number of the pins in the display panel 10 used for connecting the driving chip is not limited to that shown in the figures.

FIGS. 39 to 44, 46 and 47 are enlarged structural diagrams of connection positions between the touch leads CK and the touch pins (e.g., first pins 3 and second pins 6). For convenience of clearly describing the arrangement of the pins (e.g., the first pins 3 and the second pins 6) in the first bonding area B1 of the display panel 10 used for connecting the driving chip and the connection method between the pins and the touch leads CK, only the touch leads CK and the pins connected to the driving chip are shown in the figures. It can be understood that the first bonding area B1 of the display panel 10 may further include other structures in addition to the structure shown in the figures.

FIGS. 39 to 44, 46 and 47 are illustrated by taking an example in which the touch structure 11 of the display panel 10 includes 40 first touch channels 111 and 20 second touch channels 112, and the touch driving circuit 20 includes 40 first touch signal terminals S1 and 20 second touch signal terminals S2. The number in a bracket in the drawing numeral is numbering. The first touch channel 111, the first touch lead 2 and the first touch signal terminal S1 with the same numbers are connected correspondingly, and the first touch channel 111, the first touch lead 2 and the first touch signal terminal S1 with the same numbers are connected correspondingly. For example, 31(1) refers to a first touch pin 31(1) numbered as 1, and 2(1) refers to a first touch lead 2(1) numbered as 1.

In some embodiments, as shown in FIGS. 35 and 36, the display panel 10 further includes a first frame area K1 and a second frame area K2 located at two opposite sides of the display area AA in the second direction Y, and a first bonding area B1 located in a non-display surface of the display panel 10 opposite to a display surface. The first bonding area B1 is located at a different side of the display area AA from the first frame area K1 and the second frame area K2.

In some embodiments, as shown in FIGS. 35 and 36, the display panel 10 further includes a third frame area K3 and a fourth frame area K4 located at two opposite sides of the display area AA in the first direction X. The first bonding area B1 and the fourth frame area K4 are located at the same side of the display area AA. The first bonding area B1 and the fourth frame area K4 being located at the same side of the display panel 10 refers to that the first bonding area B1 and the fourth frame area K4 are both located at a side of the display panel 10 for bonding the driving chip.

In some embodiments, the first direction X is perpendicular to the second direction Y. As shown in FIGS. 37 and 38, the first bonding area B1 includes a first pin region J1, a second pin region J2 and a third pin region J3 that are sequentially provided in the second direction Y and in a direction from the first frame area K1 to the second frame area K2.

For example, as shown in FIGS. 37 and 38, the first bonding area B1 is provided with a plurality of first pins 3 therein. The plurality of first pins 3 are arranged in N rows (N≥1) and multiple columns, and a column direction intersects or coincides with the second direction Y. The plurality of first pins 3 include a plurality of data pins 32 disposed in the second pin region J2. The data pin 32 is configured to receive a data signal required for displaying an image, and transmit the data signal to the display panel 10.

It will be noted that the number of rows in which the plurality of first pins 3 are arranged is related to the number of the first pins 3 and the size of the first bonding area B1. Some embodiments of the present disclosure will be described below by taking an example where the plurality of first pins 3 are arranged in three rows.

The plurality of first pins 3 are arranged in multiple columns, and the column direction intersects the second direction Y. The column direction refers to an arrangement direction of multiple first pins 3 arranged in a column. The arrangement directions of multiple columns of first pins 3 may be the same or not completely the same, that is, the column direction is not necessarily unique. There may be one, two or more column directions, which is determined according to the specific arrangement method of the plurality of first pins 3.

In some embodiments, an angle formed by an arrangement direction of each column of first pins 3 and the second direction Y is greater than or equal to 60° and less than or equal to 90°. The angle formed by the arrangement direction of each column of first pins 3 and the second direction Y may be 60°, 75° or 90°.

In some examples, the angle formed by the arrangement direction of each column of first pins 3 and the second direction Y is greater than or equal to 75° and less than or equal to 90°. The angle formed by the arrangement direction of each column of first pins 3 and the second direction Y may be 75°, 80° or 90°.

It will be noted that a range of the angle formed by the arrangement direction of each column of first pins 3 and the second direction Y may be adaptively adjusted depending on the specific design. The content here is merely an exemplary description and is not intended to limit the present disclosure.

In some embodiments, as shown in FIGS. 37 and 38, the plurality of first pins 3 further include a plurality of first touch pins 31 and a plurality of second touch pins 33.

For example, the plurality of first touch pins 31 are divided into two groups which are disposed in the first pin region J1 and the third pin region J3. The numbers of the two groups of first touch pins 31 may be the same or different, which may be designed depending on actual needs.

For example, the plurality of second touch pins 33 are divided into two groups which are disposed in a fourth pin region J4 and a fifth pin region J5. The numbers of the two groups of second touch pins 33 may be the same or different, which may be designed depending on actual needs.

In some embodiments, as shown in FIGS. 35 and 36, the touch leads CK include a plurality of first touch leads 2 and a plurality of second touch leads 4. The number of the first touch leads 2 is the same as the number of the first touch channels 111, and the number of the second touch leads 4 is the same as the number of the second touch channels 112. An end of each first touch lead 2 is connected to a first touch channel 111 of the touch structure 11, and the other end of each first touch lead 2 is connected to a first touch signal terminal S1 in the touch driving circuit 20. An end of each second touch lead 4 is connected to a second touch channel 112 of the touch structure 11, and the other end of each second touch lead 4 is connected to a second touch signal terminal S2 in the touch driving circuit 20.

In some embodiments, at least part of the plurality of first touch pins 31 are correspondingly connected to the plurality of first touch signal terminals S1. In this case, a first touch pin 31 correspondingly connected to a first touch signal terminal S1 is configured to receive a first touch signal and transmit the first touch signal to the touch structure 11 through a first touch lead 2 (the first touch signal mentioned here may be the first driving signal mentioned above).

First touch pins 31 in the plurality of first touch pins 31 not connected to the first touch signal terminals S1 may be used as virtual pins, and not be connected to any signal line or be connected to other signal lines as required, thereby increasing the design flexibility of the display panel 10. The specific access signal is designed accordingly depending on actual needs. The content here is merely an exemplary description of possible implementations and is not intended to limit the present disclosure.

As shown in FIGS. 35, 36, and 39 to 42, an end of a first touch lead 2 is connected to a first touch channel 111, and the other end of the first touch lead 2 is connected to a first touch pin 31.

For example, the plurality of first touch pins 31 connected to the plurality of first touch leads 2 are all located in the first pin region J1; alternatively, the plurality of first touch pins 31 connected to the plurality of first touch leads 2 are all located in the third pin region J3; alternatively, part of the plurality of first touch pins 31 connected to the plurality of first touch leads 2 are located in the first pin region J1, and the other part are located in the third pin region J3. The number of the first touch pins 31 in the first pin region J1 and the number of the first touch pins 31 in the third pin region J3 may be the same or different, and the adaptive design may be made specifically as required.

Based on this, as shown in FIGS. 35 and 36, the plurality of first touch leads 2 may be divided into two groups which are respectively led out from the first frame area K1 and the second frame area K2 and extend to the first pin region J1 and the third pin region J3 to be connected to corresponding first touch pins 31. Alternatively, the plurality of first touch leads 2 may all be led out from the first frame area K1, and extend to the first pin region J1 to be connected to corresponding first touch pins 31. Alternatively, the plurality of first touch leads 2 may all be led out from the second frame area K2, and extend to the third pin region J3 to be connected to corresponding first touch pins 31.

In a case where the plurality of first touch leads 2 are divided into two groups which are respectively led out from the first frame area K1 and the second frame area K2, the numbers of the first touch leads 2 in the two groups are the same or approximately the same. In this way, the plurality of first touch leads 2 have the same or approximately the same numbers of wirings in the first frame area K1 and the second frame area K2, which is conducive to ensuring that the non-display area is symmetrically and evenly distributed on two sides of the display area AA, thereby ensuring an aesthetic appearance and an image display effect of the display panel 10.

In some embodiments, at least part of the plurality of second touch pins 33 are correspondingly connected to the plurality of second touch signal terminals S2. In this case, a second touch pin 33 correspondingly connected to a second touch signal terminal S2 is configured to receive a second touch signal and transmit the second touch signal to the touch structure 11 through a second touch lead 4 (the second touch signal mentioned here may be the second driving signal mentioned above).

Second touch pins 33 in the plurality of second touch pins 33 not connected to the second touch signal terminals S2 may be used as virtual pins, and not be connected to any signal line or be connected to other signal lines as required, thereby increasing the design flexibility of the display panel 10. The specific access signal is designed accordingly depending on actual needs. The content here is merely an exemplary description of possible implementations and is not intended to limit the present disclosure.

As shown in FIGS. 35, 36, and 39 to 42, an end of a second touch lead 4 is connected to a second touch channel 112, and the other end of the second touch lead 4 is connected to a second touch pin 33.

The plurality of second touch pins 33 connected to the plurality of second touch leads 4 are all located in the fourth pin region J4; alternatively, the plurality of second touch pins 33 connected to the plurality of second touch leads 4 are all located in the fifth pin region J5; alternatively, part of the plurality of second touch pins 33 connected to the plurality of second touch leads 4 are located in the fourth pin region J4, and the other part are located in the fifth pin region J5. The number of the second touch pins 33 in the fourth pin region J4 and the number of the second touch pins 33 in the fifth pin region J5 may be the same or different, and the adaptive design may be made specifically as required.

Based on this, as shown in FIGS. 35 and 36, the plurality of second touch leads 4 may be led out from the fourth frame area K4, and extend to the fourth pin region J4 and/or the fifth pin region J5 to be connected to corresponding second touch pins 33. In this way, the second touch lead 4 does not pass through the remaining frame areas (e.g., the first frame area K1, the second frame area K2 and the third frame area K3) except the fourth frame area K4, so as to reduce a wiring area of the frame area, thereby reducing a frame width of the display panel 10, increasing an area ratio of the display area AA of the display panel 10, and further improving a viewing experience of the display image of the display panel 10.

In some embodiments, as shown in FIG. 38, the display panel 10 further includes two second bonding areas B2 which are located on a side of the first bonding area B1 away from the display area AA and are provided corresponding to two ends of the first bonding area B1. The display panel 10 further includes a plurality of second pins 6, and the plurality of second pins 6 are divided into two groups and are disposed in the two second bonding areas B2 (e.g., a second bonding area B2(A) and a second bonding area B2(B) shown in FIG. 38).

The number of the second pins 6 in the second bonding area B2(A) and the number of the second pins 6 in the second bonding area B2(B) may be the same or different, and the adaptive design may be made specifically as required.

In some embodiments, at least part of the second pins 6 are connected to the second touch signal terminals S2 in the touch driving circuit 20. The second pin 6 connected to the second touch signal terminal S2 is configured to receive a second touch signal and transmit the second touch signal to the touch structure 11.

Figures 43, 44:
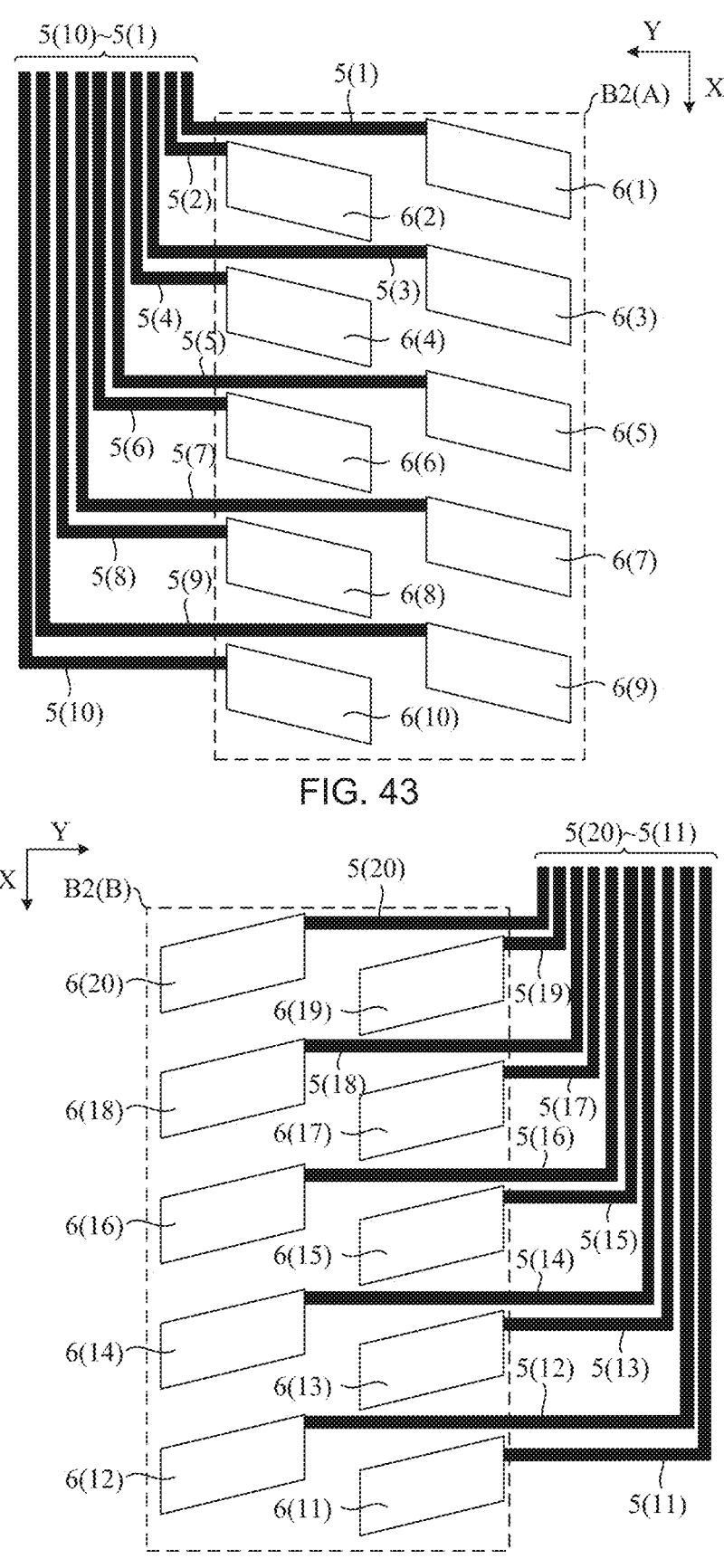
FIG. 43 is an enlarged structural view of a second bonding area B2 (A) of a display device, in accordance with some embodiments.
FIG. 44 is an enlarged structural view of a second bonding area B2 (B) of a display device, in accordance with some embodiments.

Based on this, as shown in FIGS. 36, 43 and 44, the touch leads CK further include a plurality of third touch leads 5, and the number of the third touch leads 5 is the same as the number of the second touch channels 112. An end of a third touch lead 5 is connected to a second touch channel 112 of the touch structure 11, and the other end of the third touch lead 5 is connected to a second touch signal terminal S2 in the touch driving circuit 20.

Second pin 6 in the plurality of second pins 6 not connected to the second touch signal terminals S2 may be used as virtual pins, and not be connected to any signal line or be connected to other signal lines as required, thereby increasing the design flexibility of the display panel 10. The specific access signal is designed accordingly depending on actual needs. The content here is merely an exemplary description of possible implementations and is not intended to limit the present disclosure.

As shown in FIGS. 36, 43 and 44, an end of a third touch lead 5 is connected to a second touch channel 112, and the other end of the third touch lead 5 is connected to a second pin 6.

The plurality of second pins 6 connected to the plurality of third touch leads 5 may all be located in the second bonding area B2(A); alternatively, the plurality of second pins 6 connected to the plurality of third touch leads 5 may all be located in the second bonding area B2(B); alternatively, part of the plurality of second pins 6 connected to the plurality of third touch leads 5 are located in the second bonding area B2(A), and the other part are located in the second bonding area B2(B).

Based on this, as shown in FIG. 36, the plurality of third touch leads 5 may be led out from the third frame area K3, and are divided into two groups which extend to the second bonding area B2(A) and the second bonding area B2(B) respectively through the first frame area K1 and the second frame area K2 to be connected to the corresponding second pins 6. Alternatively, the plurality of third touch leads 5 are led out from the third frame area K3, and all extend through the first frame area K1 to the second bonding area B2(A) to be connected to the corresponding second pins 6. Alternatively, the plurality of third touch leads 5 are led out from the third frame area K3, and all extend through the second frame area K2 to the second bonding area B2(B) to be connected to the corresponding second pins 6.

In a case where the plurality of third touch leads 5 are divided into two groups which extend to the first bonding area B1 respectively through the first frame area K1 and the second frame area K2, the numbers of the third touch leads 5 in the two groups are the same or approximately the same. In this way, the plurality of third touch leads 5 have the same or approximately the same numbers of wirings in the first frame area K1 and the second frame area K2, which is conducive to ensuring that the non-display area is symmetrically and evenly distributed on two sides of the display area AA, thereby ensuring an aesthetic appearance and an image display effect of the display panel 10.

In some embodiments, as shown in FIG. 36, in a case where the touch leads CK include a plurality of second touch leads 4 and a plurality of third touch leads 5, an end of each second touch channel 112 is connected to a second touch pin 33 by a second touch lead 4, and the other end thereof is connected to a second pin 6 by a third touch lead 5. In this way, the second touch signal terminal S2 in the touch driving circuit 20 transmits a signal to two ends of the second touch channel 112 by the second touch pin 33 and the second pin 6 respectively, so as to reduce a signal path loss of the second touch signal on a transmission path (e.g., signal distortion of the second touch signal during transmission generated due to the long transmission path), thereby ensuring the transmission reliability of the second touch signal.

In some embodiments, as shown in FIG. 38, the display panel 10 includes a plurality of second touch pins 33 and a plurality of second pins 6, and at least one of the second touch pins 33 and the second pins 6 is connected to the second touch signal terminal S2 in the touch driving circuit 20.

In a case where the second touch pin 33 is connected to the second touch signal terminal S2 in the touch driving circuit 20, and the second pin 6 is configured to be not connected to a touch signal line, as shown in FIG. 45, the display panel 10 may further include a plurality of fourth touch leads 8 connected to the touch structure 11. The plurality of fourth touch leads 8 may be led out from the third frame area K3, and are divided into two groups which extend to the fourth pin region J4 and the fifth pin region J5 respectively through the first frame area K1 and the second frame area K2 to be connected to the corresponding second touch pins 33. Alternatively, the plurality of fourth touch leads 8 are led out from the third frame area K3, and extend through the first frame area K1 to the fourth pin region J4 to be connected to the corresponding second touch pins 33. Alternatively, the plurality of fourth touch leads 8 are led out from the third frame area K3, and extend through the first frame area K1 and the second frame area K2 respectively to the fourth pin region J4 and the fifth pin region J5 to be connected to the corresponding second touch pins 33.

Figure 46:
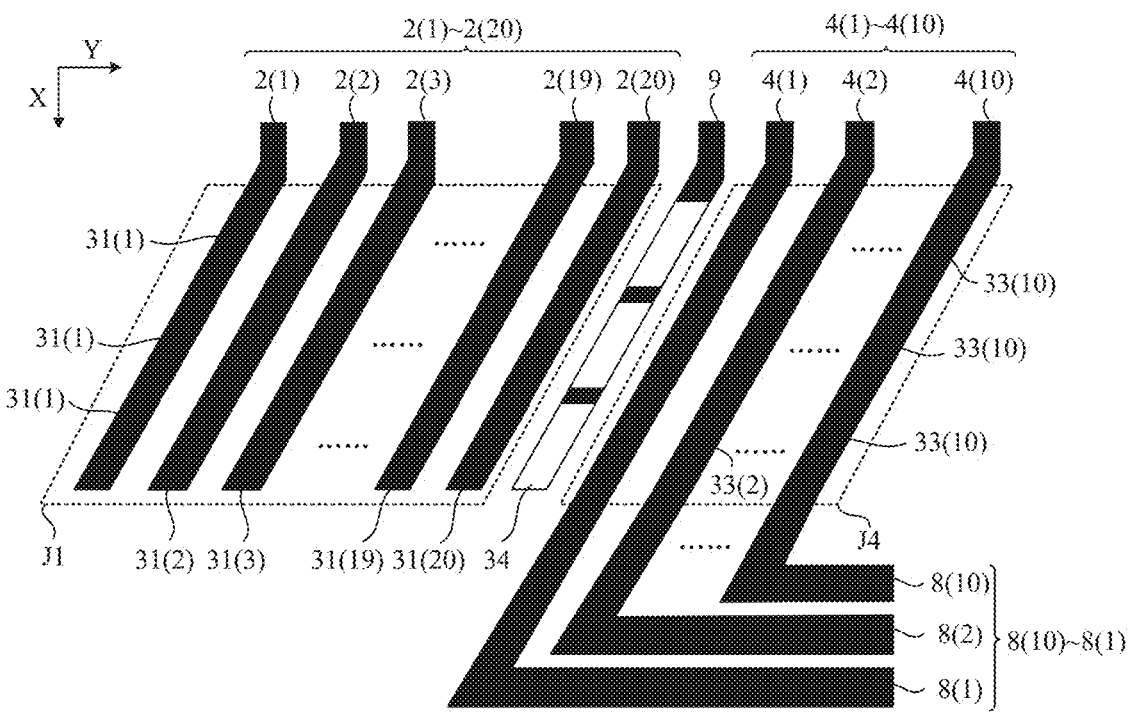
FIG. 46 is an enlarged structural view of an area M shown in FIG. 37 or 38.
Figure 47:
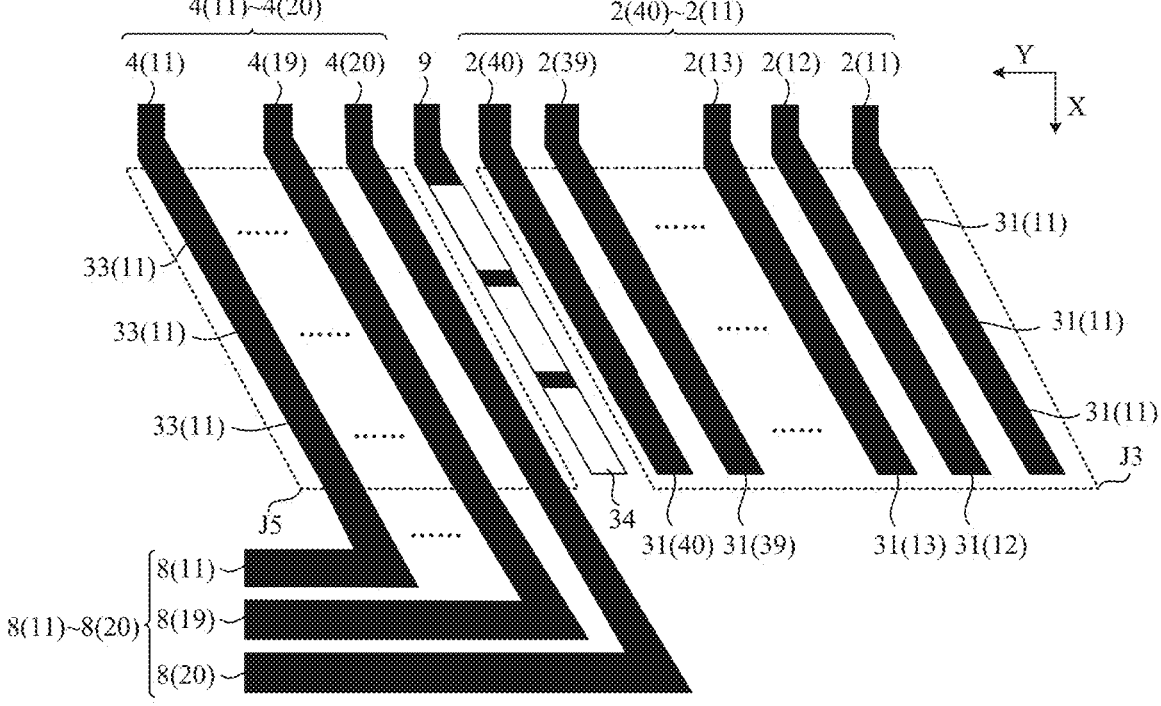
FIG. 47 is an enlarged structural view of an area N shown in FIG. 37 or 38.

In some embodiments, as shown in FIGS. 46 and 47, in a case where the display panel 10 includes a plurality of second touch leads 4 and a plurality of fourth touch leads 8, the same second touch channel 112 is connected to the same second touch pin 33 through a second touch lead 4 and a fourth touch lead 8.

In some embodiments, as shown in FIGS. 39 to 44, 46 and 47, the display panel 10 further includes shielding lines 9 located between the first touch lead 2 and the second touch lead 4 that are adjacent. The plurality of first pins 3 further include a plurality of shielding pins 34 each located between a first touch pin 31 and a second touch pin 33 that are adjacent. A shielding pin 34 is connected to a shielding line 9.

For example, the shielding pin 34 is configured to receive a shielding signal. The shielding signal is, for example, a constant voltage signal, such as a ground signal GND or a voltage signal VDD.

In a case where the first touch pin 31 is configured to receive a first touch signal and transmit the first touch signal to the touch structure 11, and the second touch pin 33 is configured to receive a second touch signal and transmit the second touch signal to the touch structure 11, by providing a shielding pin 34 between the first touch pin 31 and the second touch pin 33 that are adjacent, the adjacent first touch lead 2 and second touch lead 4 and the adjacent first touch pin 31 and second touch pin 33 are separated by the shielding signal transmitted by the shielding pin 34 and the shielding line 9, so as to avoid crosstalk between the first touch signal and the second touch signal, thereby ensuring the transmission stability and reliability of the touch signal (s) (e.g., the first touch signal and/or the second touch signal).

It can be understood that in a case where the second touch pin 33 is configured to not transmit a touch signal, the display panel 10 does not include a second touch lead 4, and the shielding pin 34 may be provided or not provided between the first touch pin 31 and the second touch pin 33 that are adjacent. In this case, the plurality of shielding pins 34 provided may receive shielding signals, or may be used as virtual pins without receiving signals. At least part of the shielding pins 34 used as virtual pins (not receiving the shielding signals) may also receive other signals as required. The specific access signal is designed accordingly depending on actual needs. The content here is merely an exemplary description of possible implementations and is not intended to limit the specific implementations of the present disclosure.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch driving circuit, comprising:
   a plurality of first touch signal terminals and a plurality of second touch signal terminals, a number of the first touch signal terminals being greater than a number of the second touch signal terminals;
   a plurality of analog front-end circuits, a number of the analog front-end circuits being equal to the number of the second touch signal terminals; wherein an analog front-end circuit is connected to a second touch signal terminal, and each analog front-end circuit in at least one analog front-end circuit is connected to at least two first touch signal terminals;
   a plurality of first control switches, wherein the analog front-end circuit connected to the at least two first touch signal terminals is connected to at least two first touch signal terminals by at least two first control switches; and the at least two first control switches are configured to be turned on in a time-sharing mode to transmit first touch detection signals from the at least two first touch signal terminals to the analog front-end circuit in time-sharing mode; and a plurality of second control switches, wherein each analog front-end circuit is connected to a second touch signal terminal by a second control switch.

2. The touch driving circuit according to claim 1, wherein each analog front-end circuit is connected to two first touch signal terminals and one second touch signal terminal.

3. The touch driving circuit according to claim 1, further comprising:
   a plurality of first output circuits, wherein each first output circuit is connected to a first touch signal terminal, and the first output circuit is configured to output a first driving signal to the first touch signal terminal; and
   a plurality of second output circuits, wherein each second output circuit is connected to a second touch signal terminal, and the second output circuit is configured to output a second driving signal to the second touch signal terminal.

4. The touch driving circuit according to claim 3, wherein a number of the first output circuits is greater than a number of the second output circuits, and the number of the second output circuits is equal to the number of the analog front-end circuits.

5. The touch driving circuit according to claim 3, wherein the first touch signal terminal is one of a touch transmitting signal terminal and a touch sensing signal terminal, and the second touch signal terminal is another of the touch transmitting signal terminal and the touch sensing signal terminal.

6. The touch driving circuit according to claim 5, wherein in the first output circuit and the second output circuit, an output circuit connected to the touch transmitting signal terminal includes:
   a first switch and a second switch, wherein a first end of the first switch is connected to a first voltage signal terminal, and a second end of the first switch is connected to the corresponding touch transmitting signal terminal; and a first end of the second switch is connected to a second voltage signal terminal, and a second end of the second switch is connected to the corresponding touch transmitting signal terminal.

7. The touch driving circuit according to claim 6, wherein in the first output circuit and the second output circuit, the output circuit connected to the touch transmitting signal terminal further includes:
   a third switch, wherein a first end of the third switch is connected to a third voltage signal terminal, and a second end of the third switch is connected to the corresponding touch transmitting signal terminal; wherein
   a voltage value of one of a second voltage signal provided by the second voltage signal terminal and a third voltage signal provided by the third voltage signal terminal is greater than a voltage value of a first voltage signal provided by the first voltage signal terminal, and a voltage value of another of the second voltage signal provided by the second voltage signal terminal and the third voltage signal provided by the third voltage signal terminal is less than the voltage value of the first voltage signal.

8. The touch driving circuit according to claim 5, wherein in the first output circuit and the second output circuit, an output circuit connected to the touch sensing signal terminal includes:
   a fourth switch and a fifth switch, wherein a first end of the fourth switch is connected to a first voltage signal terminal, and a second end of the fourth switch is connected to the corresponding touch sensing signal terminal; and a first end of the fifth switch is connected to a second voltage signal terminal, and a second end of the fifth switch is connected to the corresponding touch sensing signal terminal.

9. The touch driving circuit according to claim 1, further comprising:
  a plurality of first electrostatic protection units, each first electrostatic protection unit being connected between a first touch signal terminal and a first control switch; and
  a plurality of second electrostatic protection units, each second electrostatic protection unit being connected between the second touch signal terminal and the second control switch.

10. A display device, comprising: a display panel and a touch driving circuit connected to the display panel, wherein
  the touch driving circuit is the touch driving circuit according to claim 1; and
  the display panel includes:
  a plurality of first touch channels arranged in parallel and at intervals in a first direction, wherein each first touch channel extends in a second direction, the first direction intersects the second direction; and a first touch channel is connected to a first touch signal terminal of the touch driving circuit; and
  a plurality of second touch channels arranged in parallel and at intervals in the second direction, wherein each second touch channel extends in the first direction; and a second touch channel is connected to a second touch signal terminal of the touch driving circuit.

11. A driving method for a touch driving circuit, applied to the touch driving circuit according to claim 1, wherein the touch driving circuit further includes a first output circuit connected to a first touch signal terminal and a second output circuit connected to a second touch signal terminal; in the touch driving circuit, the first touch signal terminal is a touch transmitting signal terminal, and the second touch signal terminal is a touch sensing signal terminal;
  the driving method comprises a self-capacitance detection phase, and the self-capacitance detection phase includes:
  applying, by the first output circuit, a first driving signal to the first touch signal terminal; and transmitting, by at least two first touch signal terminals connected to a same analog front-end circuit, first touch detection signals to the corresponding analog front-end circuit in a time-sharing mode based on a capacitance change of a touch structure in a display panel; and
  applying, by the second output circuit, a second driving signal to the second touch signal terminal; and transmitting, by the second touch signal terminal, a second touch detection signal to an analog front-end circuit connected to the second touch signal terminal based on the capacitance change of the touch structure in the display panel.

12. The driving method according to claim 11, further comprising a mutual capacitance detection phase, wherein the mutual capacitance detection phase includes:
  applying, by the first output circuit, the first driving signal to the first touch signal terminal; and transmitting, by the second touch signal terminal, the second touch detection signal to the analog front-end circuit connected to the second touch signal terminal based on the capacitance change of the touch structure in the display panel.

13. A driving method for a touch driving circuit, applied to the touch driving circuit according to claim 1, wherein the touch driving circuit further includes a second output circuit connected to a second touch signal terminal; in the touch driving circuit, a first touch signal terminal is a touch sensing signal terminal, and the second touch signal terminal is a touch transmitting signal terminal;
  the driving method comprises a mutual capacitance detection phase, and the mutual capacitance detection phase includes:
  applying, by the second output circuit, a second driving signal to the second touch signal terminal; and transmitting, by at least two first touch signal terminals connected to a same analog front-end circuit, first touch detection signals to the analog front-end circuit connected to the at least two first touch signal terminals in a time-sharing mode based on a capacitance change of a touch structure in a display panel.

14. The driving method according to claim 13, wherein the touch driving circuit further includes a first output circuit connected to a first touch signal terminal; the driving method further comprises a self-capacitance detection phase, and the self-capacitance detection phase includes:
  applying, by the first output circuit, a first driving signal to the first touch signal terminal; and transmitting, by the at least two first touch signal terminals connected to the same analog front-end circuit, the first touch detection signals to the analog front-end circuit connected to the at least two first touch signal terminals in a time-sharing mode based on the capacitance change of the touch structure in the display panel; and
  applying, by the second output circuit, a second driving signal to the second touch signal terminal; and transmitting, by the second touch signal terminal, a second touch detection signal to an analog front-end circuit connected to the second touch signal terminal based on the capacitance change of the touch structure in the display panel.

15. A touch driving circuit, comprising:
  a plurality of first touch signal terminals and a plurality of second touch signal terminals;
  a plurality of analog front-end circuits, a number of the analog front-end circuits being less than a number of the first touch signal terminals and less than a number of the second touch signal terminals; wherein each analog front-end circuit in at least one analog front-end circuit is connected to at least two first touch signal terminals, and each analog front-end circuit in the at least one analog front-end circuit is connected to at least two second touch signal terminals; and
  a plurality of first control switches, wherein the analog front-end circuit connected to the at least two first touch signal terminals is connected to the at least two first touch signal terminals by at least two first control switches; and the at least two first control switches are configured to be turned on in a time-sharing mode to transmit first touch detection signals from the at least two first touch signal terminals to the analog front-end circuit in time-sharing mode.

16. The touch driving circuit according to claim 15, wherein the number of the first touch signal terminals is equal to the number of the second touch signal terminals, and each analog front-end circuit is connected to at least two first touch signal terminals and at least two second touch signal terminals.

17. A driving method for a touch driving circuit, applied to the touch driving circuit according to claim 15, wherein the touch driving circuit further includes a first output circuit connected to a first touch signal terminal; in the touch driving circuit, the first touch signal terminal is a touch transmitting signal terminal, and a second touch signal terminal is a touch sensing signal terminal;

the driving method comprises a mutual capacitance detection phase, and the mutual capacitance detection phase includes:

applying, by the first output circuit, a first driving signal to the first touch signal terminal; and transmitting, by at least two second touch signal terminals connected to a same analog front-end circuit, second touch detection signals to the analog front-end circuit connected to the at least two second touch signal terminals in a time-sharing mode based on a capacitance change of a touch structure in a display panel.

18. The driving method according to claim 17, wherein the touch driving circuit further includes a second output circuit connected to a second touch signal terminal; the driving method further comprises a self-capacitance detection phase, and the self-capacitance detection phase includes:

applying, by the first output circuit, the first driving signal to the first touch signal terminal; and transmitting, by at least two first touch signal terminals connected to a same analog front-end circuit, first touch detection signals to the corresponding analog front-end circuit in a time-sharing mode based on the capacitance change of the touch structure in the display panel; and applying, by the second output circuit, a second driving signal to the second touch signal terminal; and transmitting, by the at least two second touch signal terminals connected to the same analog front-end circuit, the second touch detection signals to the corresponding analog front-end circuit in a time-sharing mode based on the capacitance change of the touch structure in the display panel.

19. A display device, comprising: a display panel and a touch driving circuit connected to the display panel, wherein the touch driving circuit is the touch driving circuit according to claim 15; and the display panel includes:

a plurality of first touch channels arranged in parallel and at intervals in a first direction, wherein each first touch channel extends in a second direction, the first direction intersects the second direction; and a first touch channel is connected to a first touch signal terminal of the touch driving circuit; and a plurality of second touch channels arranged in parallel and at intervals in the second direction, wherein each second touch channel extends in the first direction; and a second touch channel is connected to a second touch signal terminal of the touch driving circuit.

* * * * *